United States Patent [19]

Tolle

[11] Patent Number: 4,583,164
[45] Date of Patent: Apr. 15, 1986

[54] SYNTACTICALLY SELF-STRUCTURING CELLULAR COMPUTER

[76] Inventor: Donald M. Tolle, 34F Stratford Hills Apts., Chapel Hill, N.C. 27514

[21] Appl. No.: 294,390

[22] Filed: Aug. 19, 1981

[51] Int. Cl.$^4$ .......................... G06F 7/38; G06F 3/00; G06F 13/00
[52] U.S. Cl. .................................. 364/200; 364/300
[58] Field of Search .................. 364/200, 900, 300

[56] References Cited

U.S. PATENT DOCUMENTS

| | | | |
|---|---|---|---|
| 3,962,706 | 6/1976 | Dennis et al. | 364/200 |
| 4,075,689 | 2/1978 | Berkling | 364/200 |
| 4,130,885 | 12/1978 | Dennis | 364/200 |
| 4,149,240 | 4/1979 | Misunas et al. | 364/200 |
| 4,251,861 | 2/1981 | Mago | 364/200 |

OTHER PUBLICATIONS

International Journal of Computer & Information Sciences 8, 5 (Oct. 1979) and 8, 6 (Dec. 1979) "A Network of Microprocessors to Execute Reduction Languages" Mago.
Communications of the ACM 21, 8 (Aug. 1978) pp. 613–641 Backus "Can Programming be Liberated from the Von Neuman Style".
AFIPS Conference Proceedings, vol. 48, 1979 NCC Davis, "A Data Flow Evaluation System Based on the concept of Recursive Locality".

*Primary Examiner*—Gareth D. Shaw
*Assistant Examiner*—Jameson Lee
*Attorney, Agent, or Firm*—J. E. Leonarz

[57] ABSTRACT

A design is disclosed for a cellular computer consisting of many processors, of two kinds, connected in the form of a tree. The computer is intended for the highly parallel execution of programs written in an applicative programming language. The program is stored in the leaf cells of the tree. The computer uses the syntactic structure of the program to guide the embedding of a network of "syntactic nodes" in the tree of machine cells, and execution of the program is accomplished through operations performed by the embedded network of nodes. This computer can execute many user programs simultaneously, it can take advantage of all the parallelism expressed in each user program (storage space permitting), and it can perform in parallel many operations below the level expressed in the user programs.

8 Claims, 79 Drawing Figures

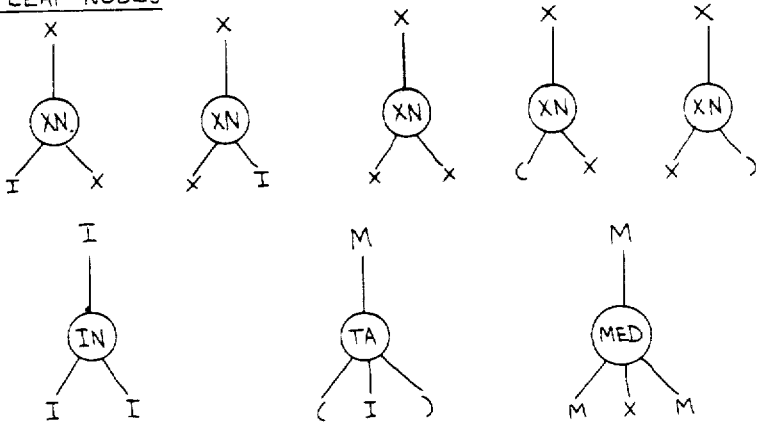
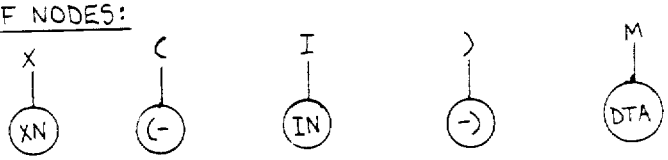
FIG. 11

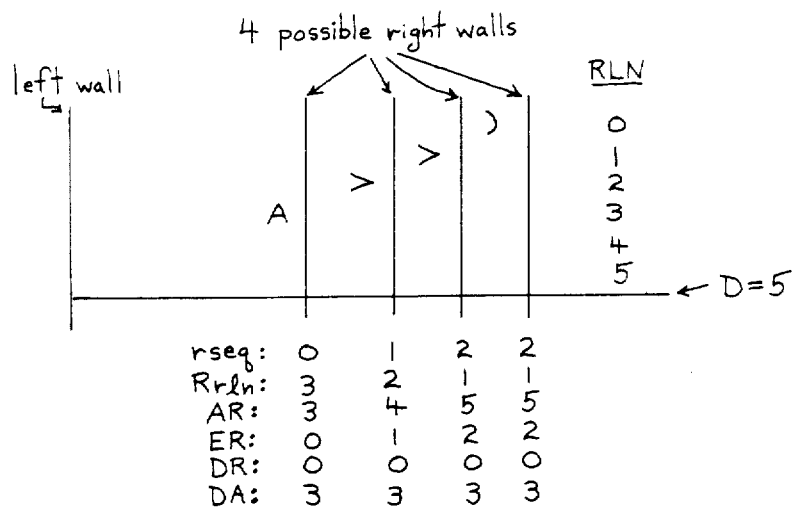
FIG. 24
NON-LEAF NODES:
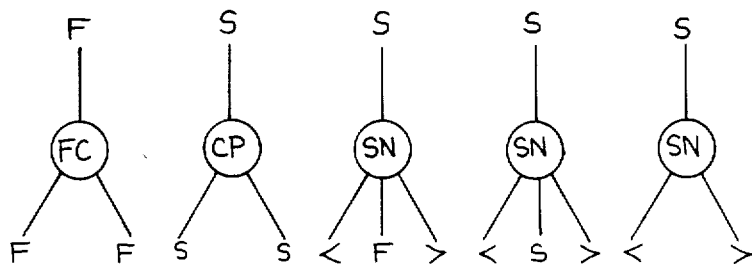
LEAF NODES:
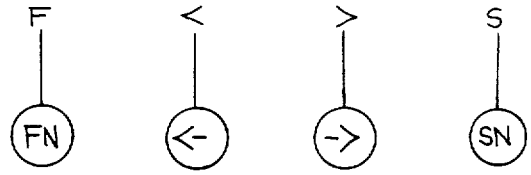
FIG. 25

$$\underbrace{<<}_{1}\underbrace{\prec<}_{1}\underbrace{f\ f\ \ldots\ f}_{28}\underbrace{f>}_{1}\underbrace{<A}_{1}\underbrace{Q}_{1}\underbrace{<g}_{1}\underbrace{g\ \ldots\ g}_{8}\underbrace{g>}_{1}$$

FIG. 73

< < | Insert ∫ | | Insert [ f 30 ] | | Insert <A | Q | Insert [ g 10 ] |

FIG. 74

| S   | UPROG1 | UPROG1 | UPROG1 | UPROG1 | UPROG1 |
|-----|--------|--------|--------|--------|--------|
| S#  | 1      | 2      | 3      | 4      | 5      |
| Cell# | 14   | 15     | 16     | 17     | 18     |

FIG. 75

SYNTACTICALLY SELF-STRUCTURING CELLULAR COMPUTER

TABLE OF CONTENTS

Background of the Invention
1. Formal Functional Programming Languages (FFPs)
2. Prior Art
   2.1 The Magó Machine
   2.2 DDM1
   2.3 CORAL
   2.4 The Expression Processor
Summary of the Present Invention
Brief Description of the Drawings
Description of a Preferred Embodiment of the Invention
1. The Overall Structure of the Computer
2. A Compact Representation of the FFP Text
3 Partitioning
   3.1 Introduction
   3.2 The Nodes and Channels of the TA-Mediator Network
   3.3 Embedding the Leaf Nodes of the TA-Mediator Network
   3.4 The Partitioning Algorithm
   3.5 An Example
   3.6 Properties of the TA-Mediator Network
   3.7 Storing Information in the IN Nodes
      3.7.1 Mtext, Ltext, and Rtext
      3.7.2 Relative Offsets
   3.8 Some Implications of Partitioning
   3.9 Another Example of Partitioning, with Relative Offsets
4. Overview of Execution
5. Embedding the SN-CP Network
   5.1 Introduction
   5.2 The Downsweep: Computing the RLNs
   5.3 The Nodes and Channels of the RA's SN-CP Network
   5.4 The Upsweep: Building the SN-CP Network for the RA
      5.4.1 A Simple Example of an SN-CP Network
      5.4.2 Embedding the Leaf Nodes of the SN-CP Network
      5.4.3 Embedding the non-Leaf Nodes of the SN-CP Network
      5.4.4 An Example
      5.4.5 Characterization of the SN-CP Network
      5.4.6 Storing Syntactic Information in the Nodes
      5.4.7 Storing Information about the Syntactic Father
   5.5 Some Implications of the SN-CP Network
6. The Syntax Tree Language (STL)
   6.1 Three Language Levels: FFP, STL, and MCL
   6.2 Libraries of Operator Definitions
   6.3 The STL and the Microprogramming Language of Machine I
   6.4 Overview of the STL Execution Scheme
   6.5 Storage and Transmission of Data in the SN-CP Network
      6.5.1 Registers
      6.5.2 Streams and s-queues
         6.5.2.1 Creation of s-queues by CALL-SONS
         6.5.2.2 Creation of s-queues by pipe operators
   6.6 Reducing the RA: REDUCE
   6.7 Operations in FN and FC nodes
   6.8 Requesting Storage
7. Storage Management
   7.1 Overtime
   7.2 Finding the molten zones
   7.3 User-program removal
   7.4 Compaction of brackets (an option deferred)
   7.5 Insertion or denial decisions
      7.5.1 Insertion decisions
      7.5.2 Denial decisions
   7.6 Destination computation
      7.6.1 The upsweep: embedding the BN network
      7.6.2 the downsweep: computing BL and BR
      7.6.3 The destination computation in the leaf BN nodes
   7.7 Text movement
   7.8 New user-program insertion
   7.9 Partitioning and parsing
Claims

BACKGROUND OF THE INVENTION

This invention is a computer composed of numerous processor/memory units connected in the form of a tree, and intended for the efficient execution of applicative programming languages. In recent years, it has become possible to put one or more processing units and memory units on a single chip of silicon and to make numerous identical copies of such a chip at a small unit price. Given this technology, it is natural to try to combine many processors and memory units to obtain a powerful general-purpose computer. It is not obvious, though, how they should be connected, nor how they can be organized to cooperate with each other.

One promising approach is that proposed recently by Magó in U.S. Pat. No. 4,251,861 and in "A network of microprocessors to execute reduction languages," two parts, *International Journal of Computer and Information Sciences* 8, 5 (October 1979) and 8, 6 (December 1979). His computer architecture is designed specifically to execute an applicative programming language such as the Formal Functional Programming (FFP) languages introduced by Backus in "Can programming be liberated from the von Neumann style? A functional style and its algebra of programs," *Communications of the ACM* 21, 8 (August 1978), 613–641. These documents by Magó and by Backus are incorporated here by reference. An FFP language is defined by a small set of syntactic and semantic rules, with useful mathematical properties for reasoning about programs written in the language. FFPs are applicative (expression-oriented) rather than imperative (statement-oriented). There are no variables and no statements. Powerful operators can be built from simpler operators in a uniform style not possible in conventional programming languages. Most importantly, parallelism is easily and naturally expressed.

The machine disclosed here, like Magó's machine, can execute many programs simultaneously, and it can perform in parallel many operations below the level expressed in the program, since a single "primitive" FFP operation may be composed of more basic machine operations, some of which can be executed in parallel.

The machine disclosed here has been previously described in Tolle's Ph.D. dissertation, "Coordination of Computation in a Binary Tree of Processors: an Architectural Proposal," Department of Computer Science, the University of North Carolina at Chapel Hill, April 1981. That document is incorporated here by reference.

Since the invention described here is related to Magó's machine, it is necessary to discuss some of the details of his design. Before that is possible, the FFP languages must be described.

1. Formal Functional Programming Languages (FFPs)

This section covers FFPs only to the extent necessary to indicate the requirements of a machine to execute such a language. For a complete treatment, see the paper by Backus, previously referenced.

An FFP program is an expression. Every FFP expression e has a unique meaning, which is also an expression. The meaning of the expression e is denoted by mu(e); mu is called the meaning function. Execution of a program e consists in evaluating e, that is, finding mu(e).

The most elementary kind of expression is an atom. The choice of set A of atoms, in conjunction with the syntactic rules, determines what expressions are in the particular FFP language. Typically, A is chosen to include alphanumeric character strings and special symbols such as +, −, and *.

There are three other kinds of expressions: the sequence, the application, and bottom. Let x1, ..., xn be expressions. Then $<x1,...,xn>$ is an expression, called a sequence (of length n), and xi is the i-th element of the sequence. Backus uses 0 to represent the empty sequence (the sequence of length 0), but here $<\ >$ is used instead. If x and y are expressions, then (x:y) is an expression, called an application; x is its operator and y its operand. Both are elements of the expression. Bottom, denoted by $\bot$, plays a special error-indicating role in the language. It is not an atom, a sequence or an application. If $x = <x1,...,xn>$ and one of the elements of x is $\bot$, then $x = \bot$. That is, $<...,\bot,...> = \bot$. All expressions are formed by finite use of these rules. The symbols '<' and '>' are called sequence brackets and the symbols '(' and ')' application brackets. All four are referred to as syntactic brackets.

The subexpressions of an expression e are e itself and the subexpressions of the elements of e. An object is an expression that has no application as a subexpression. Thus $\bot$ is an object, an atom is an object, and a sequence is an object if and only if each of its elements is an object. The meaning mu(e) of an expression e is always an object. If e itself is an object, then mu(e) = e; the objects are precisely the fixed points of the meaning function mu. If $e = <e1,...,en>$, then $mu(e) = <mu(e1),...,mu(en)>$.

Execution of an FFP program (expression) e consists in finding mu(e). If e is an object—i.e., contains no applications—then mu(e) is simply e. If e does contain applications, then mu(e) is found by repeatedly replacing the innermost applications (the applications that have no other applications as subexpressions) by other expressions with the same meanings. If this process is non-terminating, then $mu(e) = \bot$. If this process does terminate, the resulting object is mu(e). FFP languages have the Church-Rosser property: the meaning of an expression is independent of the order in which the innermost applications are evaluated. If the right machinery were available, all of them could be evaluated simultaneously.

The meaning of an innermost application (x:y) depends on the function represented by the operator x. This function is determined as follows:

1. If x is an atom, then there may be some FFP definition associated with that atom. An FFP definition must be an object—i.e., an expression with no applications. In this case the definition is substituted for the atom it defines, yielding a new application whose meaning is the same as that of the original application. Suppose, for instance, that the atom DDBL is associated with the definition $<COMP,DBL,DBL>$. Then evaluation of (DDBL:Q) begins by substituting the definition in place of DDBL, yielding $(<COMP,DBL,DBL>:Q)$.

2. The second possibility is that x is an atom that is associated with some primitive ("built in") function. For instance, the atom DBL might be associated with a primitive function that "doubles" its operand, in the following sense: (DBL:U)$\rightarrow <U,U>$. (The arrow notation "$\rightarrow$" here is not part of the FFP. It is used to show a transition from one FFP expression to another, in accordance with the rules of the language.) Thus, executing the program (DBL:(DBL:A)) would yield the following transitions: (DBL:(DBL:A)$\rightarrow$(DBL:$<A,A>$) $\rightarrow <<A,A>,<A,A>>$.

3. Another possibility is that x is an atom that is neither primitive nor defined. This is considered to be an error, and the meaning of the application is taken to be $\bot$.

4. If x itself is $\bot$, then this is also considered to be an error: $mu(\bot:y) = \bot$.

5. If $x = <\ >$, then $(<\ >:y)\rightarrow y$. That is, $<\ >$ represents the identity function.

6. The final possibility is that x is a non-empty sequence containing no applications. (Recall the assumption that (x:y) is an innermost application.) Thus (x:y) is of the form $(<x1,...,xn>:y)$, were $n >= 1$ and each xi is an object. Then the function represented by $<x1,...,xn>$ is given (recursively) by the metacomposition rule:

$$(<x1,...,xn>:y)\rightarrow(x1:<<x1,...,xn>,y>).$$

According to this rule, the expression $(<AA,DBL>:<A,B,C>)$ will yield $$(AA:<<AA,DBL>,<A,B,C>>)$$

which will then be evaluated by using the function associated with AA. (Backus uses AA to represent the primitive function "Apply to All," which applies its parameter to each element of the original operand. The parameter in the above example is DBL, and the next step of the evaluation yields $$<(DBL:A),(DBL:B),(DBL:C)>,$$

which then yields $$<<A,A>,<B,B>,<C,C>>.)$$

The association of primitive functions and FFP definitions with atoms is made prior to execution of the FFP program, and is accomplished by means external to the FFP language. The intention is for the FFP programmer to be able to construct his own FFP definitions—indeed, the programming process consists in writing FFP operator definitions. The primitive operators, on the other hand, are not intended to be changed by the FFP programmer—they are "built in" to the language, and changing them presumably requires the services of a systems programmer.

The process of replacing an innermost application according to the rules above is called reducing the application. Thus an innermost application is referred to as an RA (Reducible Application). Notice that "reducing" can be a misleading term in some circumstances: the new text may contain many new applications and may be either longer or shorter than the old.

2. Prior Art

2.1 The Magó Machine

This section introduces the basic ideas and terminology associated with Magó's machine, giving only that information needed for understanding the invention disclosed here. For the definitive treatment, see Magó's paper and patent disclosure, previously referenced. Although Magó designed the machine to execute Reduction languages, the precursors of FFPs, his machine will be discussed here as if it were designed for FFPs. This involves primarily a minor notational change.

The Magó machine is essentially a binary tree of microprocessors, with additional connections between adjacent leaf cells. The leaf cells are called L cells (for Leaf, or Linear), and collectively are known as the L array. The internal cells are called T cells (for Tree). All the L cells are identical; all the T cells are identical except for the root cell, which acts as an I/O port for the machine. (Since this would be too tight a bottleneck in a large machine, Magó suggests the possibility of allowing more I/O ports—all the T cells at some particular level of the tree, say.)

The FFP program text resides in the L cells, one symbol per cell, in left to right order. The text is not required to occupy contiguous L cells; empty L cells may be interspersed among the occupied ones. The colon used to separate the operator and operand of an application is syntactically superfluous and is not stored in the machine. For the same reason, the commas separating the elements of a sequence are not stored. The right application bracket and the right sequence bracket, ')' and '>', are not explicitly stored either; the structural information they convey is represented in the L array by absolute level numbers (ALNs) attached to the symbols of the FFP text. The ALN of a symbol represents the symbol's nesting level in the FFP program. The program (DBL:<A,<B,C>>), for instance, might appear in the L array as follows:

| Symbol | ( | DBL | < |   | A | < | B | C |
|--------|---|-----|---|---|---|---|---|---|
| ALN    | 0 | 1   | 1 |   | 2 | 2 | 3 | 3 |
| Cell # | 6 | 7   | 8 | 9 | 10| 11| 12| 13|

The machine works by sending ("sweeping") information up and down the tree network, combining or copying it upward and broadcasting or selectively distributing it downward. The operation is asynchronous, each cell operating at its own speed and accepting input from neighboring cells only when it is ready. Some functions of the machine require the cooperation of all the cells; others can be done locally, by one cell or by a group of cells.

The overall operation can be described in terms of states that the cells pass through, corresponding to the various activities that go on in the machine. The state changes sweep up and down the tree, usually in constant time, but in data-dependent time for some activities. A basic machine cycle, sufficient to execute a simple RA, goes through 14 states, corresponding roughly to 14 sweeps (7 up and 7 down).

The hardware requirements for each cell are modest. An L cell consists of a CPU, a "microprogram" store (see below), a state control unit, and several registers. The T cell has similar requirements, but it does not need a microprogram store.

Execution is accomplished through the various internal mechanisms of the machine, which provide a framework of fixed services such as syntactic analysis and storage management, and through the microprogramming language, which expresses the detailed actions the cells should take to execute each FFP primitive operator.

The major activities of the machine are:

1. Finding the RAs and allocating to them disjoint areas of the network within which to work. This process is called partitioning. An RA's area consists of the L cells in which its text resides and a binary tree of T cells (or parts of T cells) above the RA. An individual T cell may serve as many as four RAs at once. Partitioning is done in parallel throughout the machine and is accomplished in one upsweep and one downsweep, in time proportional to the height of the tree network.

2. Supplying microprograms to the RAs, on the basis of their operators, to control their execution. A microprogram defines an FFP primitive operator. A microprogram consists of instructions to be executed by the individual L cells holding the text of the RA. Corresponding to each microinstruction is a destination expression specifying the relative level number of the subexpression to which the instruction should be given. (The relative level number of a symbol in an RA is the difference between the symbol's ALN and the ALN of the application bracket of the RA.)

The microprograms for the primitive FFP operators are stored outside the machine and are brought in through the root of the machine upon request by the top cells of the areas. A microprogram is distributed through the T cells of the area to the L cells of the RA using a directory previously computed and stored in the T cells. The directory in a T cell is a synopsis of the high-level structure of the FFP text beneath the T cell. The distribution process matches up the microinstructions and the FFP expressions from left to right. All the RAs found by the partitioning process get their microprograms during a particular sweep of states through the machine. The time spent in distributing microprograms is proportional to the total length of all the distinct microprograms requested by the RAs.

3. Syntactically analyzing the RA. This is done in two phases. The first is the computation of the directory (see above), which analyzes the entire RA down to three levels relative to the application bracket, for the purpose of guiding the distribution of the microprograms. This requires a single upsweep, taking time proportional to the height of the tree.

The second phase of syntactic analysis is done in response to a Mark instruction in the microprogram. Each Mark instruction causes its FFP expression to be analyzed to an additional two levels. The results of this analysis are stored in the L cells holding the expression, so that each symbol of the marked expression knows such things as: the marker (e.g., 'X') that it is marked with; the number of top-level subexpressions in the expression; which top-level subexpression this symbol is a part of; how many symbols are in the expression; the sequence number (1-origin) of this symbol among all the symbols of the expression. Marking requires two upsweeps and two downsweeps, each taking time proportional to the height of the tree.

Marking allows reference by the microprogram to FFP expressions nested to a depth of five levels relative to the application bracket, so that different parts of the RA can communicate with each other on the basis of syntactic structure.

4. Providing storage (L cells) where needed. If an RA needs additional space to store its results, the space is made available through the mechanism of storage management. As soon as each L cell in the machine knows how many empty cells to request on its right and left (on the basis of the size of the expression(s) to be inserted there), storage management preparation takes place. This consists of two upsweeps and two downsweeps (taking time proportional to the height of the tree) to compute how far each symbol in the L array needs to move right or left to provide empty cells where they are needed. Then the storage management itself takes place: each symbol is moved directly from L cell to neighboring L cell, until it reaches its destination, leaving behind it a trail of cell markers in the "empty" cells. The cell marker in an "empty" L cell is later used by the cell during execution of the microprogram to determine which incoming symbol to accept and store. The time required for moving the symbols to their destinations and setting the cell markers is proportional to the longest distance any symbol has to travel. (The unit of distance here is the distance between two adjacent L cells.) This can be as small as one or as large as one less than the number of L cells in the machine, depending on how much storage space is requested and where the full and empty L cells happen to lie. Immediately after storage management, the entire machine has to go through partitioning again, since storage management generally makes the old areas obsolete. After partitioning, the old RAs (those that already have microprograms) can resume execution. The new RAs (those created as a result of the latest set of reductions) get their microprograms.

5. Executing the microprogram. Typical microinstructions do things such as these: erase the symbol in the L cell; replace the symbol with a literal symbol specified by the microprogram; replace the symbol with some symbol received from the father T cell; send the symbol to the father T cell to be combined with other symbols using some operator; insert at the left (or right) of this symbol the expression marked with 'X'; mark with 'X' the FFP expression containing this symbol; if this symbol is the last one in its FFP expression, then erase, else do nothing.

The process of sending data up into the tree—to be combined with other data or simply to be copied—and then broadcasting it back down to the entire RA is called data movement. The time it takes to move an expression this way is linear in the amount of data moved through the root of the area, whereas all the other microprogram operations require time proportional merely to the height of the machine. (As has been noted, though, the internal mechanisms of microprogram distribution and storage management can also take time that is independent of and much greater than the height of the tree.) This great difference makes it undesirable to require the machine to wait for all the "slow" RAs to finish executing before looking for new RAs. Hence a mechanism is provided which interrupts all the RAs that are moving a lot of data, just prior to storage management. Each data item in the tree at the time of interruption is pushed back down to where it came from in L, and its special status is noted there. After storage management and partitioning, these interrupted RAs can resume data movement from wherever they left off, and continue until the next interruption, or until they finish.

Data movement can be going on in parts of the machine concurrently with certain other activities taking place elsewhere in the machine: directory building, microprogram distribution, marking, and storage management preparation. However, the entire machine has to participate in storage management itself and in partitioning. No other activities can proceed in parallel with either of these.

2.2 DDM1

U.S. Pat. No. 3,978,452 discloses a data driven network of uniform processing or function modules and local storage units which may be partitioned to accommodate various concurrent operations. The same machine is also described in "The architecture and system method of DDM1: a recursively structured data driven machine," by A. L. Davis, *Conference Proceedings of the 5th Annual Symposium on Computer Architecture*, April 1978, pp. 210-215, and also in "A data flow evaluation system based on the concept of recursive locality," by A. L. Davis, *AFIPS Conference Proceedings*, Volume 48, NCC, 1979, pp. 1079-1086. DDM1, the machine described in these references, is a tree machine that executes programs expressed in the form of graphs called DDNs: data-driven nets. Davis considers DDNs to be too low-level for direct use as a programming language.

DDM1 differs in some important respects from Magó's machine and from the present invention. DDM1 is not cellular, in that the individual PSEs ("processor storage elements") of DDM1 are capable of executing any DDN, given sufficient storage, whereas a cellular computer in the sense of Magó and Tolle has the property that each cell performs but a small part of any applicative computation—i.e., the cells cooperate in performing the primitives of the applicative language.

Furthermore, decomposition of the DDN program—when it occurs at all—is done top-down, both in terms of the movement of information among the PSEs and in terms of the parsing of the DDN; thus DDM1 has to decide which subtrees should be given which parts of the decomposed net. By contrast, in both Magó3 s (in both senses), and there is no question of how best to decompose the program.

A DDN, furthermore, is such a general kind of graph that mapping it onto the tree of PSEs requires a complex compilation process to be performed by a separate machine before the graph can be entered into DDM1. No such compilation is needed by Magó's machine or by the present invention. That compilation process yields an inflexibly static tree structure that is then decomposed, top-down, and parcelled out in pieces to various PSEs. In the compiled tree structure, certain nodes represent operations to be performed on data that (conceptually) flows to them along their input arcs. Although at first glance this may seem similar to the idea of the SN-CP networks of the present invention, there are in fact significant differences: a node of an SN-CP network corresponds not to a fixed operator, but to a syntactically-defined collection of data stored in the leaf nodes below the node in question, and any of a wide variety of operators may at run-time be associated with the node, quite dynamically. Each operator node of a DDN corresponds to a fixed operator, determined at compile-time. Furthermore, the SN-CP networks are re-built when the underlying program text is modified in the course of execution, whereas the DDN nets are built once and for all at compile-time.

2.3 CORAL

The machine proposed in "A binary tree multiprocessor: CORAL," by Yoshizo Takahashi, Naoki Wakabayashi, and Yoshihiro Nobutomo, in *Journal of Information Processing*, Vol. 3, No. 4, February 1981, pp. 230–237, consists of 100 or more processors connected in the form of a binary tree. The device is not cellular in construction. It does not contemplate the execution of language primitives by the cooperation of a group of processors. It does not execute programs of an applicative language. The authors state that they have no general method of decomposing a job into programs for the individual processors to execute. The device does not embed syntactic networks corresponding to the syntactic structure of programs or data.

2.4 The Expression Processor

In a paper entitled "The expression processor: a pipelined, multiple-processor architecture," published in *IEEE Transactions on Computers*, Vol. C-30, No. 8, August 1981, pp. 525–536, Jerry R. VanAken and Gregory L. Zick discuss a machine that includes a number of processing elements (PEs) together with a single central control unit and a single main memory containing data and program code. The PEs can be configured either as an SIMD (single instruction, multiple datastream) array or as a binary tree network, called X-pipe. The machine is not cellular in nature; as the authors indicate, the expression processor can be compared to a conventional von Neumann machine, with the X-pipe taking the place of the arithmetic-logical unit. The machine does not execute programs of an applicative language. Programs have to be compiled before being entered into the machine; the compiler is responsible for determining a mapping of the parse trees onto the binary tree of PEs. No such compilation is needed by the present invention. Execution of a program is accomplished under control of a single central control unit that feeds operands and instructions to the PEs through an alignment network of switching elements at the base of X-pipe. All movement of information in X-pipe is from the leaves upward toward the root, the results eventually flowing out of the root PE back to the main memory.

In the compiled parse tree structure, certain nodes represent operations to be performed on data that (conceptually) flows to them along their input arcs. Although at first glance this may seem similar to the idea of the SN-CP networks of the present invention, there are in fact significant differences: a node of an SN-CP network corresponds not to a fixed operator, but to a syntactically-defined collection of data stored in the leaf nodes below the node in question, and any of a wide variety of operators may at run-time be associated with the node, quite dynamically. Each operator node in a parse tree in the X-pipe corresponds to a fixed operator determined at compile-time. Furthermore, all data flows in one direction in the parse trees in X-pipe, whereas data can be streamed up and down repeatedly and combined in sophisticated ways in the present invention. Furthermore, the SN-CP networks are re-built when the underlying program text is modified in the course of execution, whereas the parse trees of X-pipe are built once and for all at compile-time. Furthermore, the program text does not reside in X-pipe, but in a central memory, from which portions of the parse trees have to be fed into X-pipe by the central control unit.

3. Summary of the Present Invention

Magó's architecture is a first solution to the problem of mapping an FFP computation into a cellular computer and achieving highly concurrent execution. It is an undertaking of some difficulty. FFPs are elegant, abstract, and far-removed from the realities of hardware. Backus's computational model for their execution is mathematical—it includes no concept of storage space or data movement or processor. It does support concurrency in one vital respect: all innermost applications can be reduced simultaneously. The question is how to achieve this in hardware.

The challenge is to design a scheme for coordinating the activities of a large number of cells. The difficulty does not lie in a lack of power—the cells can be general-purpose processor/memory units. The difficulty lies in controlling that power, in putting it to good use. How can the computational tasks and the data be parcelled out to the the processors? How can the processors know what their responsibilities are and what to expect of their neighbors in the way of cooperation?

Magó's work brings to light the interesting possibilities of a binary tree of processors operating on very small components (e.g., one symbol) of an FFP expression. There are advantages to the cellular approach. There are advantages to a language-based design, and to FFPs as the language. There are advantages to the binary tree interconnection pattern and the spreading thin of the FFP text so that communication paths between symbols will be short and so that concurrency can be had at the level of operations on individual symbols.

During the actual execution of an RA in Magó's machine, the T cells are used only for the transmission of messages between L cells and for simple combining operations on the data in certain of those messages. The complexity and the power reside principally in the L cells. Can the T cells be used to better effect? Can they be organized to cooperate in more sophisticated tasks than those possible in Magó's machine?

The invention disclosed here results from the realization that the binary tree of cells offers possibilities for combining and distributing information that were only hinted at in Magó's design. The central theme of this work can be stated in a single sentence: The syntactic structure of an innermost application of an applicative program can be used to impose a structure on the T cells and L cells of the machine—i.e., to embed a network of nodes corresponding to the subexpressions of the application—and the reduction of the application can be expressed in terms of operations performed by those embedded nodes.

The embedded structure, corresponding as it does to the syntactic structure of the RA, and being distributed over a number of L cells and T cells, gives a natural allocation of computing resources, connected in a useful way. The problem of programming the nodes admits of a natural, hierarchical solution corresponding to the hierarchical syntactic structure of the RA.

Magó's machine will be referred to as Machine I. The present invention will be referred to as Machine II.

Although the present invention is described in terms of execution of FFP language programs, it should be understood that only minor modifications are required to make it suitable for executing any similar applicative language. It should be further understood that the techniques described here for embedding syntactic networks and for performing computations in such networks are useful for any suitably structured data, and not only for expressions of an applicative language.

This invention provides:

1. A new representation of the program text, at the syntactic level. Explicit ')' and '>' are used, eliminating the use of ALNs. This makes syntactic analysis simpler and faster. Also, the representation allows the packing of one or more syntactic brackets into an L cell (along with an atom), reducing the number of L cells needed to hold a program. This representation, furthermore, makes it possible to perform certain frequently-occurring operations without having to do storage management. This is an important advantage.
2. A new means of finding the RAs. With the explicit closing brackets, one upsweep suffices to locate the RAs, associate with each RA a TA (Top of Area), and build a tree of storage management mediators above the TAs. This TA-Mediator network is used to control the storage management.
3. A means for building a syntax tree for each RA. Once the TA-Mediator network has been built, another upsweep is used to embed in the T cells above each RA a network of syntax nodes reflecting the syntactic structure of the RA's text. This network is used to accomplish the execution of the RA.
4. A means for reducing an RA, using the embedded network of syntax nodes. This involves the execution of a Syntax Tree Language (STL) program. The STL expresses the actions to be taken by an RA's syntax nodes in order to execute each primitive FFP operator. Thus, the role of the STL in Machine II is similar to that of the microprogramming language in Machine I. In Machine I, the microprogramming instructions are directed principally to the L cells—the T cells are used for some simple combining operations, but primarily for routing of data. In Machine II, by contrast, the computational power resides in the RA's network of syntax nodes, which is embedded in both the L cells and the T cells.
5. A new technique for storage management. The complexity of executing the STL makes it difficult to interrupt an RA for storage management. An executing RA may have complex information stored in the tree, information which is not simply a copy of data in L, but which is a non-trivial combination of that data. Such information cannot gracefully be stored back into the L array in the midst of execution as in Machine I. Thus, Machine II does not interrupt executing RAs to perform global storage management. Instead, the TA-Mediator network is used to perform local storage management in those areas willing to participate.

Furthermore, in Machine II the storage management algorithm moves data through the tree rather than directly from L cell to L cell. This technique is sometimes radically faster than Machine I's, never very much slower, and probably somewhat faster on the average. Using the tree for storage management also eliminates the need for direct connections between adjacent L cells, thus simplifying the physical layout problem as well as reducing the amount of hardware needed.

Other features and advantages of the invention will be apparent from the following drawings and detailed description of a preferred embodiment.

BRIEF DESCRIPTION OF THE DRAWINGS

FIG. 11 is a schematic representation of all the possible channels that can come into and out of the nodes of the TA-Mediator network.

FIG. 24 is a schematic representation of several examples of rseq, Rrln, AR, ER, and DR in an L cell.

FIG. 25 is a schematic representation of all the possible channels that can come into and out of the interior nodes of an SN-CP network.

FIG. 73 shows schematically the 43 L cells required when the insertion requests of FIG. 72 are expanded.

FIG. 74 is a schematic representation of some FFP text and some approved insertion requests.

FIG. 75 shows the text that should appear in L cells 14 through 18, assuming that UPROG1 has a destination range of [14,18] and a sequence range of [1,5].

DESCRIPTION OF A PREFERRED EMBODIMENT OF THE INVENTION

For ease of understanding, this description is divided into chapters.

1. The Overall Structure of the Computer

Figure 1:
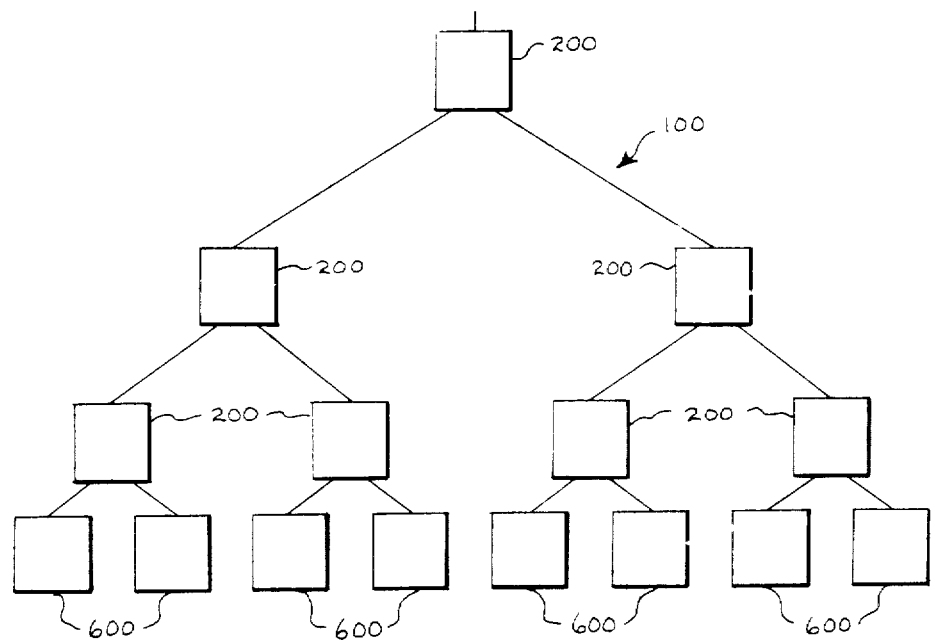
FIG. 1 is a schematic representation of the interconnection of the cells of the present invention.

The preferred embodiment of the present invention is a full binary tree of two kinds of cells, as indicated in FIG. 1. The leaf cells 600 are referred to as L cells, and the entire collection of L cells is sometimes referred to as L. The non-leaf cells 200 are referred to as T cells, and the entire collection of T cells is sometimes referred to as T. In this description, it is assumed that the root cell of T acts as the I/O port of the processor, but it should be understood that other arrangements, such as having all the cells at some level of the tree act as I/O ports, are possible.

The program text is stored in the L cells in a representation decribed in the next chapter. The machine 100 operates by sweeping information upward and downward through the binary tree of machine cells, thereby locating the reducible applications, determining the operators to be executed, and reducing the applications. The succeeding chapters describe in detail how these things are accomplished. As is discussed in those chapters, networks of nodes are embedded in the tree of machine cells. Those networks of nodes correspond in well-defined ways to portions of the program text stored in L.

Each node corresponds to a particular portion of program text. A node acts as a processor, performing computations related to its portion of program text. Each node is connected to certain other nodes via two-way channels, which are capable of carrying information between the nodes. By embedding a network of nodes and channels in the machine, we mean the process of configuring the resources of the cells in such a way that the network is represented somehow in the totality of cells.

Any given cell, in general, embeds only a small part of the network—a few nodes and a few channels—and the network is spread across many cells. Later chapters specify in detail the abstract rules for building each kind of network required in the machine. In the present chapter we discuss the relationship between the abstract notion of a network of nodes and channels and the physical hardware required in the cells to represent ("embed") such a network. Various means of representing the embedded networks of nodes are possible; two alternatives are here described.

A network is a graph, and many well-known techniques are suitable for representing and manipulating graphs in a conventional computer. See, for instance, *The Art of Computer Programming, Volume 1, Fundamental Algorithms*, Second Edition, by Donald E. Knuth, Addison-Wesley, 1973; *Combinatorial Algorithms: Theory and Practice*, by Edward M. Reingold, Jurg Nievergelt, and Narsingh Deo, Prentice-Hall, Inc., 1977; and *The Design and Analysis of Computer Algorithms*, by Alfred V. Aho, John E. Hopcroft, and Jeffrey D. Ullman, Addison-Wesley, 1974.

Figure 2:
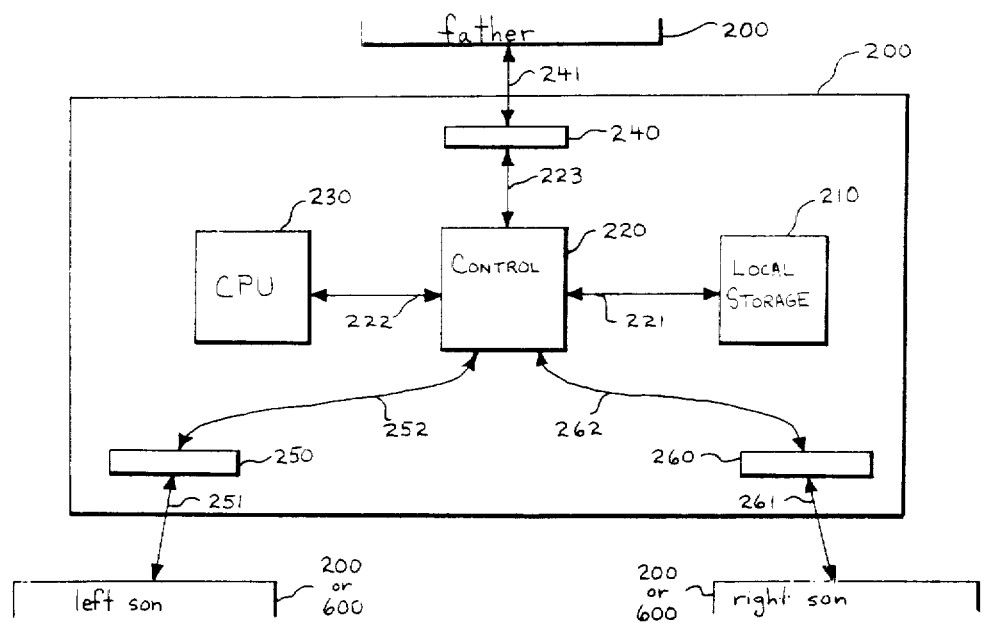
FIG. 2 is a schematic block diagram of a first alternative structure for a T cell of the present invention.

We may, therefore, as a first alternative structure for a T cell, use the one shown in FIG. 2. According to this alternative, the T cell is connected to its left son, its right son, and its father by communication paths 251, 261, and 241, respectively. These communication paths have identical capabilities, and can carry information in both directions simultaneously. Each communication path, in fact, can serve as several channels of the various embedded networks, and each channel can independently carry information in both directions simultaneously. Each channel may have separate physical resources, or the effect of separate channels may be achieved by time-multiplexing over a single physical path. These communication paths connect to communication ports 250, 260, and 240, respectively, in the T cell 200. It is assumed that the cells of the present invention operate asynchronously. The communication ports, therefore, have the necessary logic for asynchronous communication, as well as for handling multiple two-way channels.

These communication ports are connected via communication paths 252, 262, and 223 to a control module 220, which has the ability to perform the partitioning algorithm described in chapter 3, the parsing algorithm described in chapter 5, and the algorithm that embeds the BN network as described in chapter 7. The control module 220 is connected by a communication path 222 to a CPU 230, which is capable of executing STL programs as described in chapter 6 and of performing processing related to storage management as described in chapters 4 and 7. The control module 220 is connected by a communication path 221 to a local storage unit 210, which contains (1) definitions of STL-defined operators; (2) storage used to represent the portions of the networks embedded in the cell; and (3) storage used by the embedded nodes during execution of STL operators as described in chapter 6. In this first alternative structure of a T cell, the embedded networks are presented in the local storage unit 210 using conventional data structures and programming techniques such as those described in the books referenced above. In this first alternative structure of a T cell (and in the corresponding one for an L cell, discussed below), the effect of having a node act as a processor is achieved by time-sharing the CPU among all the anodes represented in the local storage unit.

Figure 3:
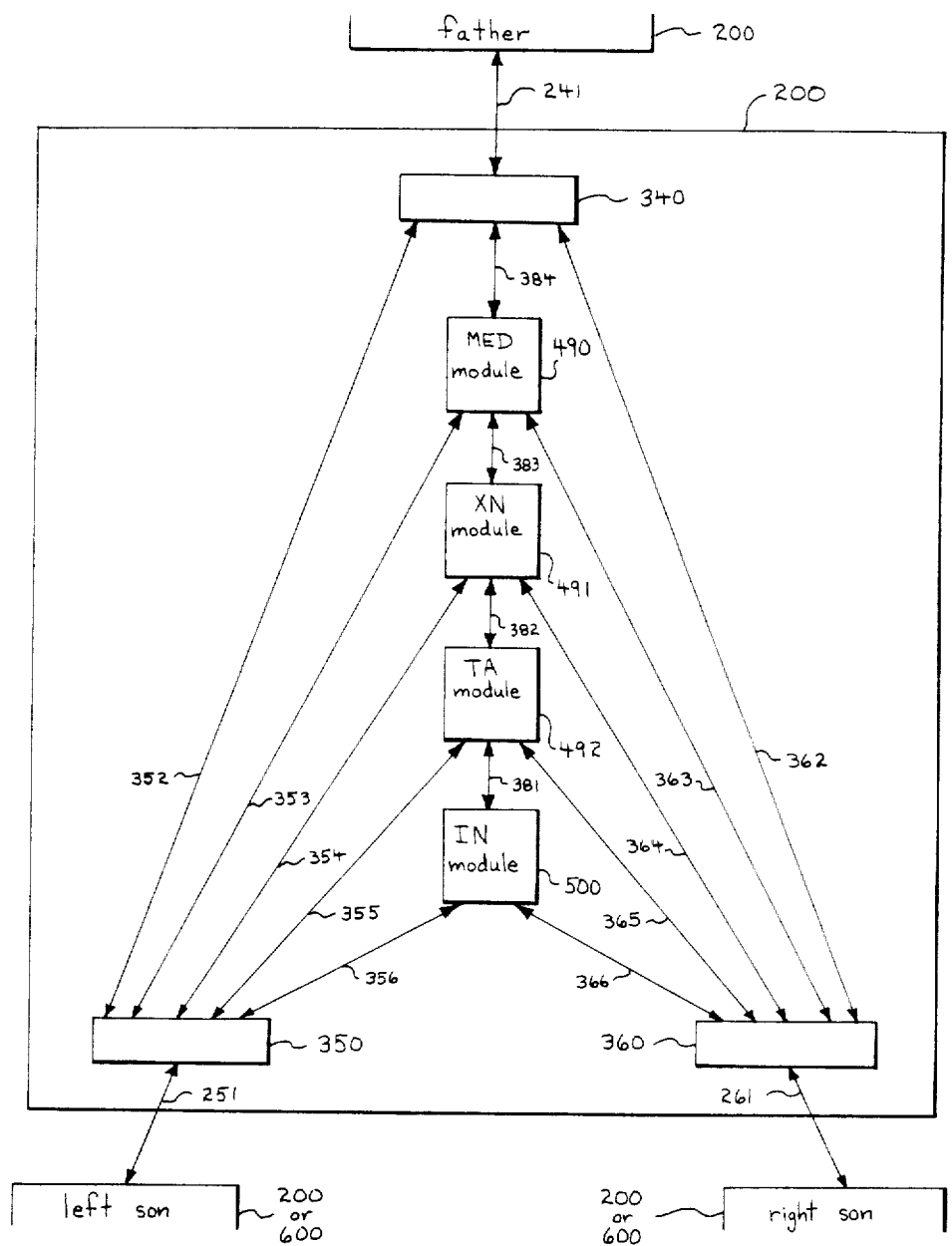
FIG. 3 is a schematic block diagram of a second alternative structure for a T cell of the present invention.

FIG. 3 indicates a second alternative structure for a T cell 200 of the present invention. As in the first alternative, the T cell is connected to its left son, its right son, and its father by communication paths 251, 261, and 241, respectively. These communication paths connect to communication ports 350, 360, and 340, respectively. Communication port 350 is connected via communication paths 352, 353, 354, 355, and 356 to communication port 340, to a MED module 490, to an XN module 491, to a TA module 492, and to an IN module 500, respectively. Symmetrically, communication port 360 is connected via communication paths 362 through 366 to the same entities. The IN module 500 is connected via communication path 381 to the TA module 492, which is connected via communication path 382 to the XN module 491, which is connected via communication path 383 to the MED module 490, which is connected via communication path 384 to the communication port 340. In this alternative structure for the T cell, the MED module 490, the XN module 491, and the TA module 492 are capable of embedding the portion of the TA-Mediator network (described in Chapter 3) corresponding to the MED nodes, the XN nodes, and the TA nodes, respectively. The IN module 500 is capable of embedding the IN nodes described in Chapter 3 and the SN-CP network described in Chapter 5.

Figure 4:
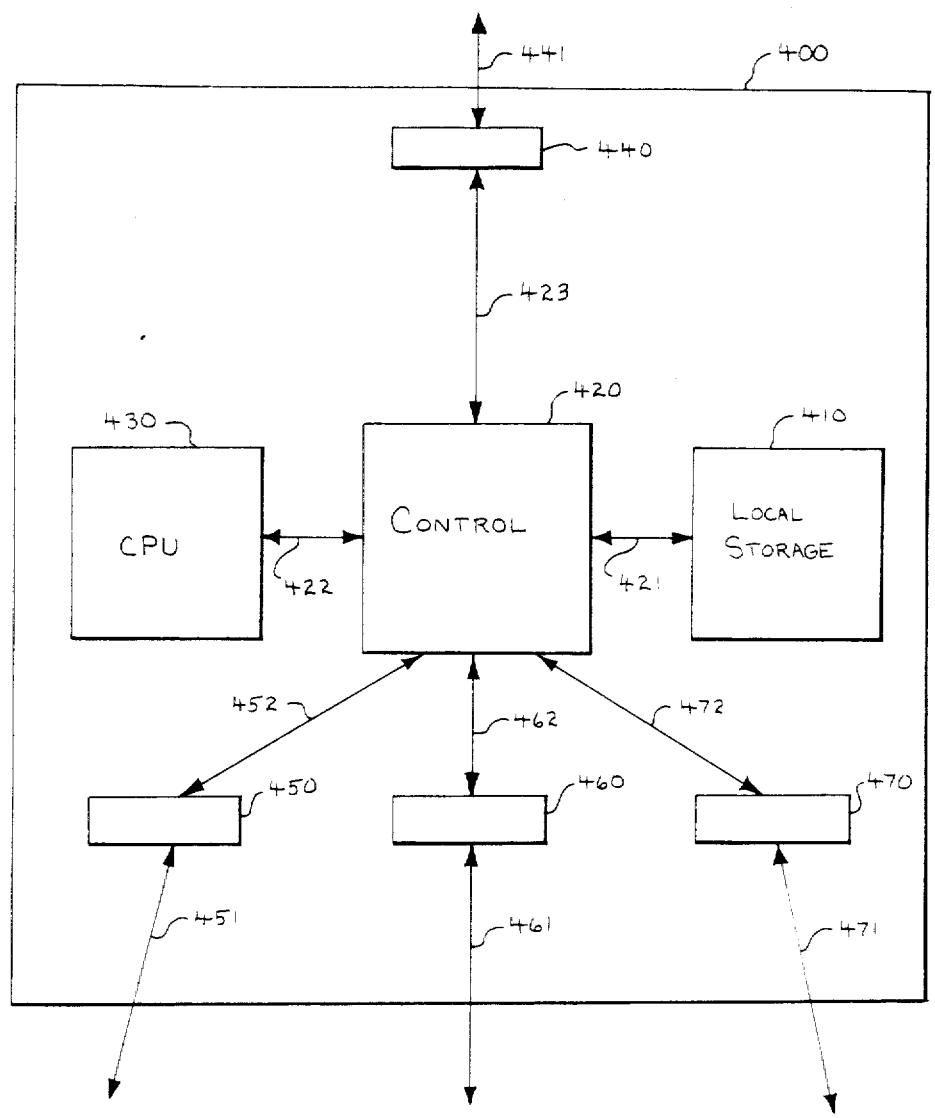
FIG. 4 is a schematic block diagram of a multi-purpose module that can be configured to serve as a MED module, an XN module, a TA module, an SN-CP module, or an SN-FC module in a cell of the present invention.

The MED module 490, the XN module 491, and the TA module 492 are all specific instances of a multi-purpose module 400, shown in FIG. 4. The multi-purpose module 400 can serve as a MED module, an XN module, a TA module, an SN-CP module (see below), or an SN-FC module (see below), according to the specific logic built in to its control module 420. The multi-purpose module 400 has communication paths 451, 461, 471, and 441, which connect to communication ports 450, 460, 470, and 440, respectively, in the multi-purpose module 400. These communication ports are connected to a control module 420 by communication paths 452, 462, 472, and 423, respectively. The control module has the ability to embed either the MED nodes, the XN nodes, the TA node and two CP nodes, one syntactic level of SN and CP nodes, or one syntactic level of SN and FC nodes (together with associated channels), depending on the role to be served by the particular instance of the multi-purpose module 400. The portions of embedded networks are represented in the local storage unit 410 using conventional data structures and programming techniques such as those described in the books referenced above. The control module 420 is connected by communication path 422 to a CPU 430, which is capable either of executing STL operators or of performing processing related to storage management, depending on the role served by the particular instance of the multi-purpose module 400. The control module 420 is connected by a communication path 421 to a local storage unit 410, which contains (1) storage used to represent the portions of the networks embedded in the cell; and, if this instance of the multi-purpose module 400 is to be used as an SN-CP module or as an SN-FC module, (2) definitions of STL-defined operators; and (3) storage used by the embedded nodes during execution of STL operators as described in chapter 6.

Figure 5:
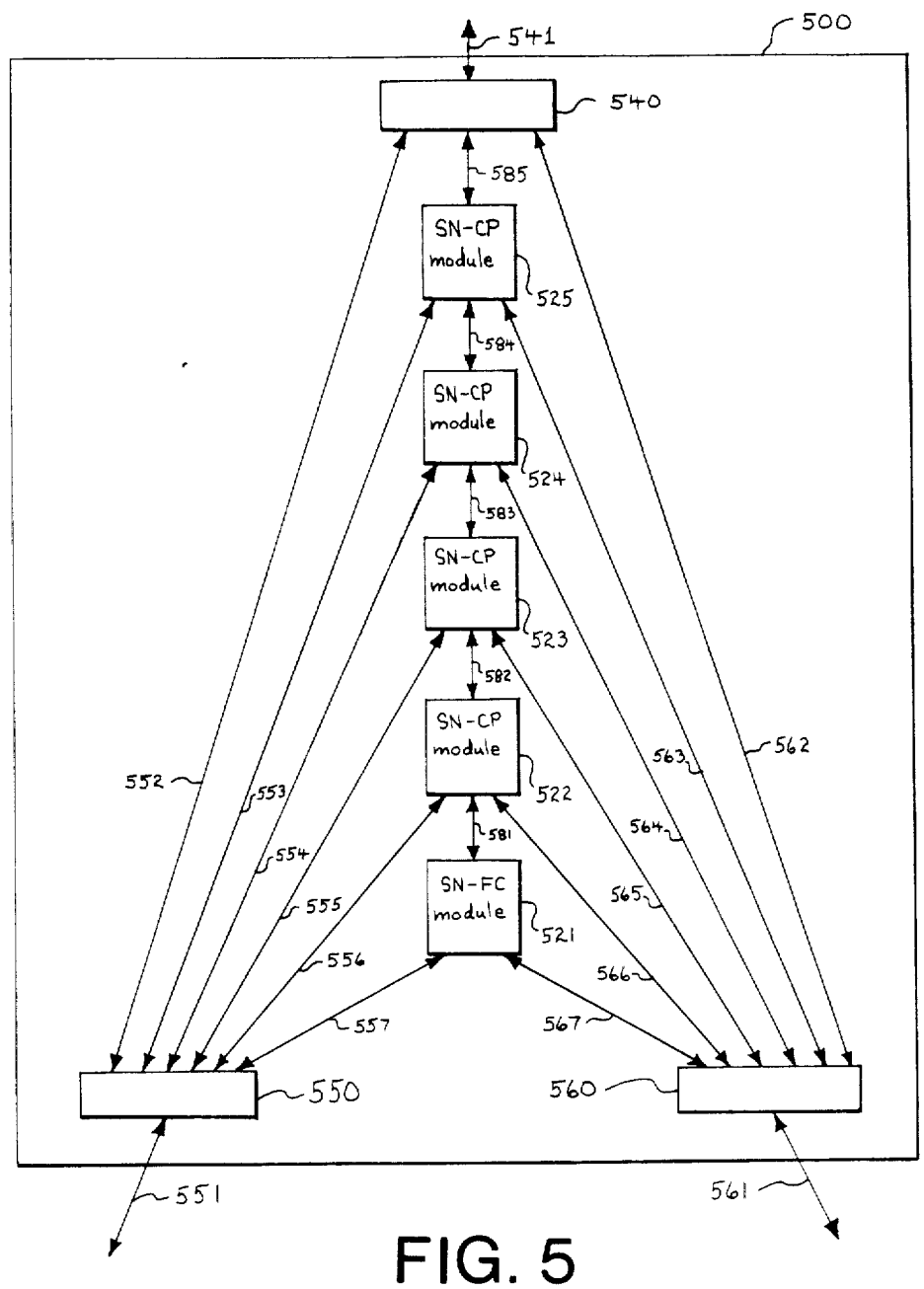
FIG. 5 is a schematic block diagram of an IN module of the present invention.

FIG. 5 shows the structure of an IN module 500, as shown in FIG. 3. The IN module 500 has a left communication path 551, a right communication path 561, and a top communication path 541, which correspond respectively to communication paths 356, 366, and 381 of FIG. 3. These communication paths connect to communication ports 550, 560, and 540, respectively, in the IN module 500. Communication port 550 is connected via communication path 552 to communication port 540, and via communication paths 553, 554, 555, and 556 to SN-CP modules 525, 524, 523, and 522, respectively, and via communication path 557 to SN-FC module 521. Symmetrically, communication port 560 is connected via communication paths 562 through 567 to the same entities. The SN-FC module 521 is connected via communication path 581 to SN-CP module 522, which is connected via communication path 582 to SN-CP module 523, which is connected via communication path 583 to SN-CP module 524, which is connected via communication path 584 to SN-CP module 525, which is connected via communication path 585 to the communication port 540. The SN-FC module and each of the SN-CP modules is an instance of the multi-purpose module 400 shown in FIG. 4. Although FIG. 5 shows exactly four SN-CP modules, the intention is that in any particular embodiment of the invention, in accordance with said second alternative structure of the T cell, the IN module 500 shall have a plurality of SN-CP modules, the exact number of which shall determine the parsing depth, D, of the machine, as described in Chapter 5. Each SN-CP module has the capability of embedding one SN node and two CP nodes, and of executing STL operators as described in Chapter 6. The SN-FC module has the capability of embedding one SN node and one FC node, and of executing STL operators as described in Chapter 6.

Figure 6:
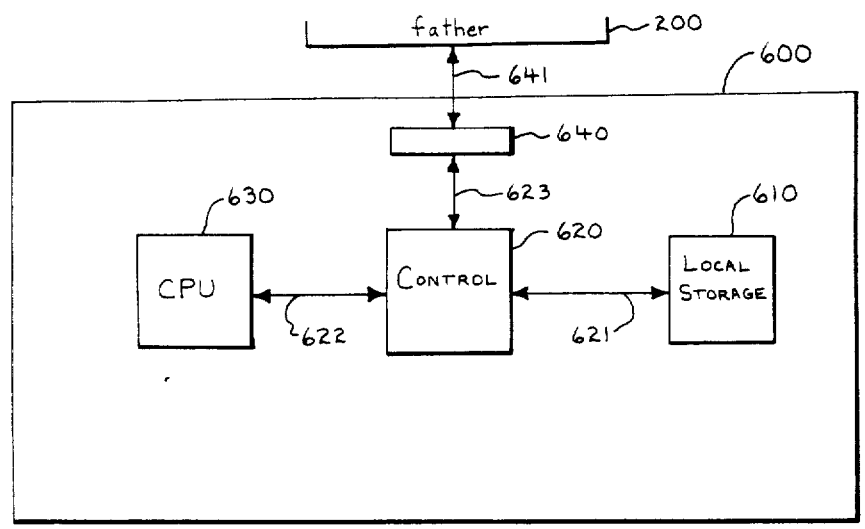
FIG. 6 is a schematic block diagram of a first alternative structure for an L cell of the present invention.

FIG. 6 indicates a first alternative structure for an L cell 600 of the present invention. According to this alternative, the L cell is connected to its father by communication path 641. This communication path can carry information in both directions simultaneously. It can, in fact, can serve as several channels of the various embedded networks, and each channel can independently carry information in both directions simultaneously. Each channel may have separate physical resources, or the effect of separate channels may be achieved by time-multiplexing over a single physical path. This communication path connects to communication port 640, which is connected via communication path 623 to a control module 620, which has the ability to perform the partitioning algorithm described in chapter 3, the parsing algorithm described in chapter 5, and the algorithm that embeds the BN network as described in chapter 7. The control module 620 is connected by a communication path 622 to a CPU 630, which is capable of executing STL programs as described in chapter 6 and of performing processing related to storage management as described in chapters 4 and 7. The control module 620 is connected by a communication path 621 to a local storage unit 610, which contains (1) definitions of STL-defined operators; (2) storage used to represent the portions of the networks embedded in the cell; and (3) storage used by the embedded nodes during execution of STL operators as described in chapter 6. In this first alternative structure of an L cell, the embedded networks are represented in the local storage unit 610 using conventional data structures and programming techniques such as those described in the books reference above.

Figure 7:
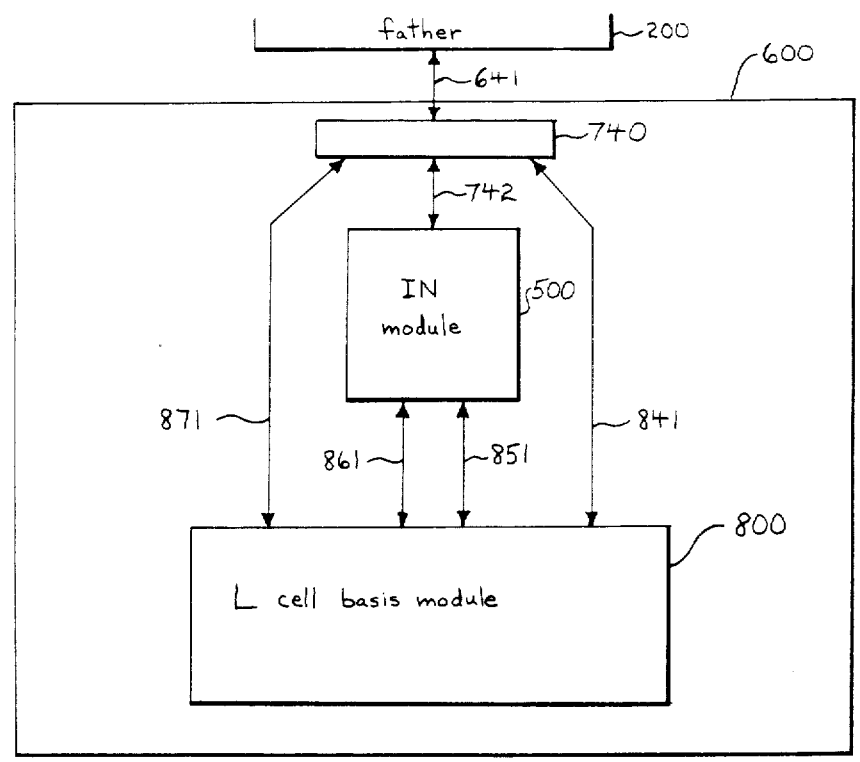
FIG. 7 is a schematic block diagram of a second alternative structure for an L cell of the present invention.

FIG. 7 indicates a second alternative structure for an L cell 600 of the present invention. As in the first alternative, the L cell is connected to its father by communication path 641. Communication path 641 connects to communication port 740. Communication port 740 is connected via communication paths 871 and 841 to the L cell basic module 800, and by communication path 742 to an IN module 500. The IN module 500 is connected to the L cell basis module 800 via communication paths 861 and 851. The IN module 500 is identical to the one already shown in FIG. 5.

In this alternative structure for the L cell, the L cell basis module 800 is capable of embedding the leaf nodes of the TA-Mediator network (described in Chapter 3), and the leaf nodes of the SN-CP network (described in Chapter 5), and the leaf nodes of the BN network (described in Chapter 7).

Figure 8:
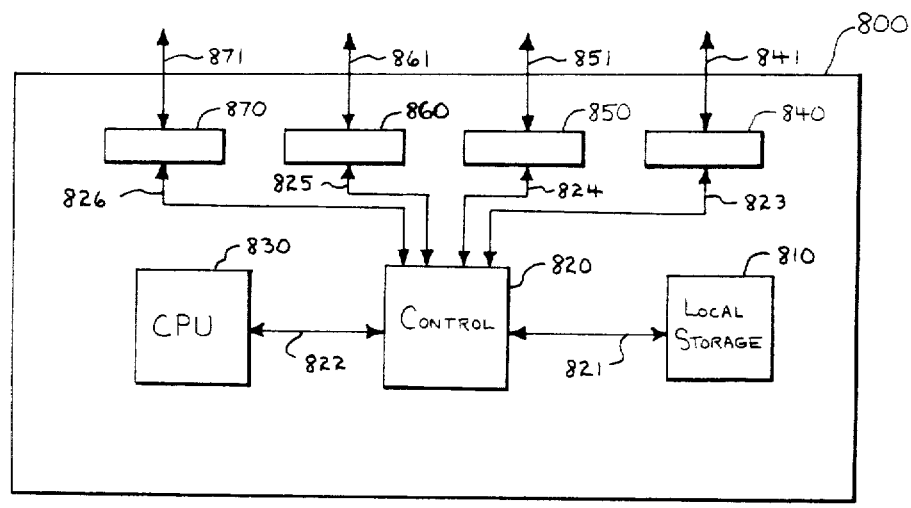
FIG. 8 is a schematic block diagram of an L cell basis module for the present invention.

FIG. 8 shows the structure of the L cell basis module 800, which has four communication paths, 841, 851, 861, and 871, which connect to communication ports 840, 850, 860, and 870, respectively, which in turn are connected to control module 820 via communication paths 823, 824, 825, and 826, respectively. The control module 820 is connected via communication path 822 to a CPU 830, and via communication path 821 to a local storage unit 810. The control module 820 is capable of embedding the leaf nodes of the TA-Mediator network, the leaf nodes of the SN-CP network, and the leaf nodes of the BN network. The CPU 830 is capable of executing STL programs as described in Chapter 6 and of performing processing related to storage management as described in chapters 4 and 7. The local storage unit 810 contains (1) definitions of STL-defined operators; (2) storage used to represent the portions of the networks embedded in-the basis module 800; and (3) storage used by the embedded nodes during execution of STL operators as described in Chapter 6.

The paragraphs above describe two alternative structures for T cells and L cells. In the first alternative for each kind of cell, there is a single CPU, a single control module, and a single local storage unit for each cell. In the second alternative each cell has a plurality of modules, each with its own set of computing resources; and each module has responsibility for a relatively small portion of the duties of the cell. As will become clearer in the following chapters, the duties of each module in the second alternative structures for the cells are syntactically defined—i.e., each module has responsibility for computations involving specific kinds of nodes that correspond to specific syntactically-defined entities in the program text. In the case of each SN-CP and SN-FC module, these computational responsibilities are further restricted to expressions at a certain syntactic nesting depth in an innermost application of a program.

It should be understood that the two alternative structures here described for the T cells and for the L cells do not exhaust the possibilities included in the intent and scope of the present invention. Among other alternatives particularly included are structures in which various of the modules share certain resources, such as storage and such as CPUs. Also particularly included are structures in which each module is further subdivided into submodules with further-restricted responsibilities, such as computational responsibility for a single node of an embedded network.

2. A Compact Representation of the FFP Text

Recall that in Machine I, the FFP text is stored in the L cells, at most one symbol (atom or syntactic bracket) per cell. All closing brackets ('>' and ')') are omitted in this representation, and the structural information they convey is preserved by storing with each remaining symbol an absolute level number (ALN). Consider the possibility of using instead the following "natural" representation: at most one symbol per L cell, all brackets appearing explicitly, with no ALNs.

There are advantages to be gained by using this natural representation. First, it is natural, and simple, and requires less pre-processing of the FFP text upon input and output. More importantly, parsing is faster with this representation. Locating the boundaries of the RAs, for instance, requires in Machine I an upsweep and a downsweep; with the natural representation of the text, a single upsweep suffices. Even more importantly, corresponding to the natural representation is a natural embedding in the T cells of a syntax tree reflecting the structure of the FFP text in the L array. Unfortunately, the natural representation requires more L cells than Magó's does to store a given FFP program. This is a serious program, since the L cell is such a precious and limited resource in the machine. It would be possible, of course, to pack more than one FFP atom per L cell, but this would reduce the degree of parallelism possible on the machine. It is, however, possible to pack many syntactic brackets into an L cell, with little or no loss of opportunity for parallelism, and with but little additional hardware required per L cell. One way to do so is described below. It is called the PC representation (for Potentially Compact). The PC representation ordinarily uses even fewer L cells than Magó's to store a given FFP program. It has the further advantage of obviating storage management for some of the common syntactic transformations on FFP text. This is an important advantage.

For the PC representation of Machine II, five registers are needed in each L cell:

S, to store an FFP atomic symbol
LAP, to store a count of left application brackets
RAP, to store a count of right application brackets
LSEQ, to store a count of left sequence brackets
RSEQ, to store a count of right sequence brackets.

The registers are logically ordered from left to right like this:

LAP LESQ S RSEQ RAP

Let the values stored in these registers be denoted by lap, lseq, s, rseq, and rap, respectively. Then the text represented by these values is:

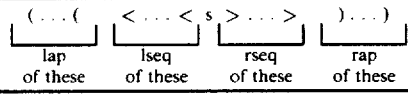

For example, suppose that the following values are stored in the registers of some L cell:

| REGISTER: | LAP | LSEQ | S | RSEQ | RAP |
|---|---|---|---|---|---|
| VALUE: | 3 | 2 | DBL | 1 | 0 | then the text represented in the L cell is:

(((< <DLB>

It is clear that lap, lseq, rseq, and rap will always be non-negative integers. Furthermore, it will always be the case that, in any given L cell, either lap=0 or rap=0. For if lap and rap were both positive, then an entire RA would be represented in the cell. This is not possible, because an RA has to have two top-level subexpressions—the operator and the operand—and it is easy to see that no more than one entire expression at any single nesting level can be stored in one L cell in this representation.

The representation is called "Potentially Compact" rather than simply "Compact" because execution of FFP programs naturally leads to less-than-fully-compact text, and the proper functioning of the machine is independent of the degree of compaction of the text. The text of the example above, for instance, could occupy anywhere from 1 to 7 cells. The degree of compaction is immaterial, except as it affects the amount of storage space (i.e., the number of L cells) available for storage management.

Notice the following simple but important properties of the PC representation (wich are also true, incidentally, of the representation of Machine I):
1. The left-to-right order of the FFP text is preserved.
2. Given two RAs, RA1 and RA2, one of them lies entirely to the left of the other.
3. No L cell contains text for more than one RA. In other words, no two RAs have to share any L cell.
4. No L cell contains more than one entire FFP expression at any given nesting level.
5. No L cell contains a entire RA, since each RA has two expressions at the same nesting level: the operator and the operand.

3. Partitioning

3.1 Introduction

In order to allow the simultaneous execution of all the RAs, Machine II—like Machine I—partitions itself into disjoint areas, thereby allocating to each RA a part of the machine for that RA's exclusive use. The partitioning process embeds in the machine a tree of several kinds of nodes, connected by several kinds of channels. The nodes act as processors and the channels carry information between the nodes. A given machine cell may have several nodes and channels embedded in it. The resulting embedded structure is called the TA-Mediator network, in reference to two of its several kinds of nodes, the TA and the Mediator.

"TA" stands for "Top of Area of an RA." The partitioning process associates exactly one TA with each RA, embedding the TA in the lowest cell that "sees" the entire RA. The TA supervises execution of the RA.

Corresponding to each pair of adjacent RAs (i.e., each pair of RAs not separated by another RA) is a Mediator node, embedded in the lowest machine cell that "sees" the entire text of both RAs. The Mediators supervise storage management in Machine II.

3.2 The Nodes and Channels of the TA-Mediator Network

The TA-Mediator network embedded by the partitioning process is a tree whose nodes are of seven types, denoted by the following node symbols:
1. TA—"Top of the Area of an RA" node.
2. MED—"Mediator" node.
3. IN—"Internal" node.
4. XN—"External" node.
5. (- —"Left application bracket" node.
6. -)—"Right application bracket" node.
7. DTA—"Dummy TA" node.

An explanation of the names may be helpful. The TA and the Mediator have already been mentioned. An IN node embedded in a cell corresponds to text that that cell has determined may be internal to some RA. An XN node corresponds to text that the cell knows is not internal to any RA (hence is external). The (- and -) nodes correspond resectively to '(' and ')' in the program text. Exactly two DTAs (Dummy TAs) are embedded in the machine—one in the leftmost L cell and one in the rightmost L cell—in order to simplify the partitioning possibilities at the boundaries of the machine. The DTA acts just like a TA in the partitioning process, but (unlike a TA) has no RA associated with it.

(It is sometimes convenient to assume that a DTA has a dummy RA associated with it.)

The arc between two nodes of the TA-Mediator network is called a channel, because it is used to carry information between the nodes. There are five channel types, denoted by the following channel symbols:
1. M—"Mediator" channel.
2. I—"Internal" channel.
3. X—"External" channel.
4. (—"Left application bracket" channel.
5. )—"Right application bracket" channel.

The reasons for choosing these names for the channels should become clear shortly.

The partitioning process is done in a single sweep of information up through the machine. This upsweep does two things:
1. Embeds the nodes and channels of the TA-Mediator network.
2. Stores in every IN node some information concerning the FFP text below it, for use on the following downsweep.

Although both of these are done at the same time, for simplicity they are described separately.

3.3 Embedding the Leaf Nodes of the TA-Mediator Network

The L cells initiate the partitioning process by examining the FFP text they hold and embedding the appropriate leaf nodes of the TA-Mediator network, as specified in Chart A. (Recall that lap and rap are, respectively, the number of left and right application brackets stored in the L cell.)

CHART A

| | Leaf nodes embedded by an L cell | |
|---|---|---|
| | rap = 0 | rap > 0 |
| lap = 0 | IN | IN −) XN |
| lap > 0 | XN (− IN | [Error] |

The two endmost L cells of the machine, furthermore, embed three additional nodes: XN DTA XN. The leftmost cell embeds them to the left of whatever else it embeds, the rightmost to the right. The left-to-right order of the nodes is important: it reflects the order of the text. The error case occurs if both '(' and ')' are represented in the cell; this is illegal in the PC representation and assumed not to happen. Notice that every L cell embeds exactly one IN node.

Both of the DTAs in the machine are leaf nodes of the TA-Mediator network. Every (- and every -) is a leaf node. Every TA and every MED is a non-leaf node. An IN or XN node may be either a leaf node or a non-leaf node. These facts will all be easy to verify once the partitioning algorithm has been specified.

The concept of the text seen by (or corresponding to) a node is important. For now, the definition is specified for a leaf node. Later, the definition is extended to include all the nodes of the TA-Mediator network.
1. An IN leaf node sees the text represented by the LSEQ, S, and RSEQ registers of the L cell—i.e., all the text in the L cell that may lie inside some RA. Since every L cell embeds an IN node, it is quite possible for an IN node to see no text; this is the case if lseq=0, rseq=0, and no atom is stored in S.
2. The (- node sees the most deeply nested '(' in the L cell. Notice that if there is no '(' represented in the cell (i.e., if lap=0), then no (- is embedded.

3. The -) node sees the most deeply nested ')' in the L cell. Notice that if there is no ')' represented in the cell (i.e., if rap=0), then no -) is embedded.
4. An XN leaf node immediately to the left of a (- node sees any left application brackets to the left of the innermost '(' in the L cell. Notice that if lap = 1, the XN immediately to the left of (- sees no text.
5. An XN leaf node immediately to the right of a -) node sees any right application brackets to the right of the innermost ')' in the L cell. Notice that if rap = 1, the XN immediately to the right of -) sees no text.
6. An XN leaf node immediately next to a DTA sees no text.
7. The DTA node sees no text.

Figure 9:
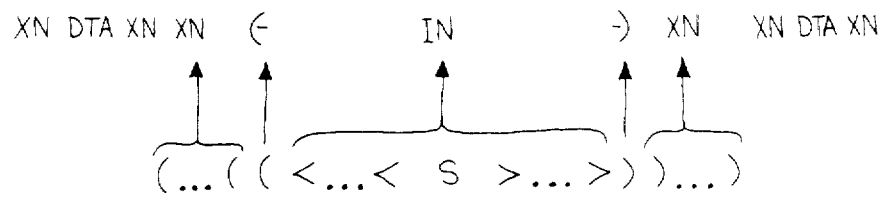
FIG. 9 is a schematic representation of the correspondence between the text and nodes in an L cell.

FIG. 9 indicates informally the correspondence between the FFP text and the embedded leaf nodes of an L cell (although no single L cell could actually have all the text shown.) This correspondence is, more formally, an order-preserving function from the sequence of FFP symbols in the machine into (but not onto) the sequence of leaf nodes of the TA-Mediator network. It therefore makes sense to speak, for instance, of the text between a DTA and an RA, even though the DTA is not itself part of the text; the correspondence defines the DTA's position with respect to any text symbol.

3.4 The Partitioning Algorithm

Corresponding to every node is a channel leading upward from the node: the upward channel of the node. Chart B gives the correspondence. Each L cell, having embedded nodes in accordance with Chart A, then uses the information in Chart B to guide the embedding of the appropriate channels leading upward from those nodes. The left-to-right order of the channels is important; it reflects the order of the nodes.

| Chart B | |
|---|---|
| The channel leading upward from a node | |
| Node | Upward channel of the node |
| TA | M |
| MED | M |
| IN | I |
| XN | X |
| (- | ( |
| -) | ) |
| DTA | M |

Having embedded the leaf nodes and their upward channels, each L cell then determines whether any adjacent channels can be brought together to form a (non-leaf) node in the L cell. Chart C shows all the legal combinations. The two or three channels brought together to form a node are called the downward channels of the node, since they connect the node to lower-level nodes of the TA-Mediator network.

| | Chart C | |
|---|---|---|
| | The node formed from adjacent channels | |
| | Pattern (downward channels) | Node to be embedded |
| 1. | I I | IN |
| 2. | I X | XN |
| 3. | X I | XN |
| 4. | X X | XN |
| 5. | X ) | XN |
| 6. | ( X | XN |
| 7. | ( I ) | TA |

| | Chart C | |
|---|---|---|
| | -continued | |
| | The node formed from adjacent channels | |
| | Pattern (downward channels) | Node to be embedded |
| 8. | M X M | MED |

Having embedded a non-leaf node, the L cell then uses the information in Chart B to embed the upward channel for that node. This yields a new set of channels for the L cell to try to bring together—the upward channel of the new node having replaced the downward channels. The cell continues to embed new nodes in this manner until no more adjacent channels match the patterns of Chart C. Then the final set of channels is extended upward to the father cell.

The process just described is specified more formally by Algorithm PARTITION, shown in Chart D. The vector of channels being processed by a cell at any instant during partitioning is called the Curent Channel Configuration, or CCC of the cell. Algorithm PARTITION is executed not only by each L cell, but also by each T cell. When a cell (other than the root cell of the machine) has embedded the nodes and channels as described, it sends its final CCC on to its father T cell. A T cell gets its initial CCC by concatenating the CCCs it receives from its sons. The global effect of all this is to embed the TA-Mediator network in the machine. The characteristics of the TA-Mediator network are not significantly affected by the particular choices made in the "Select" statement of the algorithm.

| Chart D |
|---|
| Algorithm PARTITION |
| Do while (the CCC contains adjacent channels matching a pattern in Chart C) { Select any adjacent channels in the CCC which match a pattern in Chart C. Embed the corresponding node, giving it as downward channels the selected channels of the CCC. Using Chart B, embed the appropriate upward channel for the node. Form a new CCC from the old CCC by substituting the channel just embedded in place of the selected channels. } Send the CCC to the father T cell (unless this is the root cell of the machine). |

The reader may have noticed that the term "channel" has been used here to denote two distinct concepts:
1. The entire arc between two nodes
2. The part of a channel that lies in a single machine cell.

In most situations, the context makes clear which meaning is intended. When there is no danger of confusion, "channel" will continue to be used in both senses. The term channel segment will be used to refer specifically to the second concept.

3.5 An Example

Figure 10:
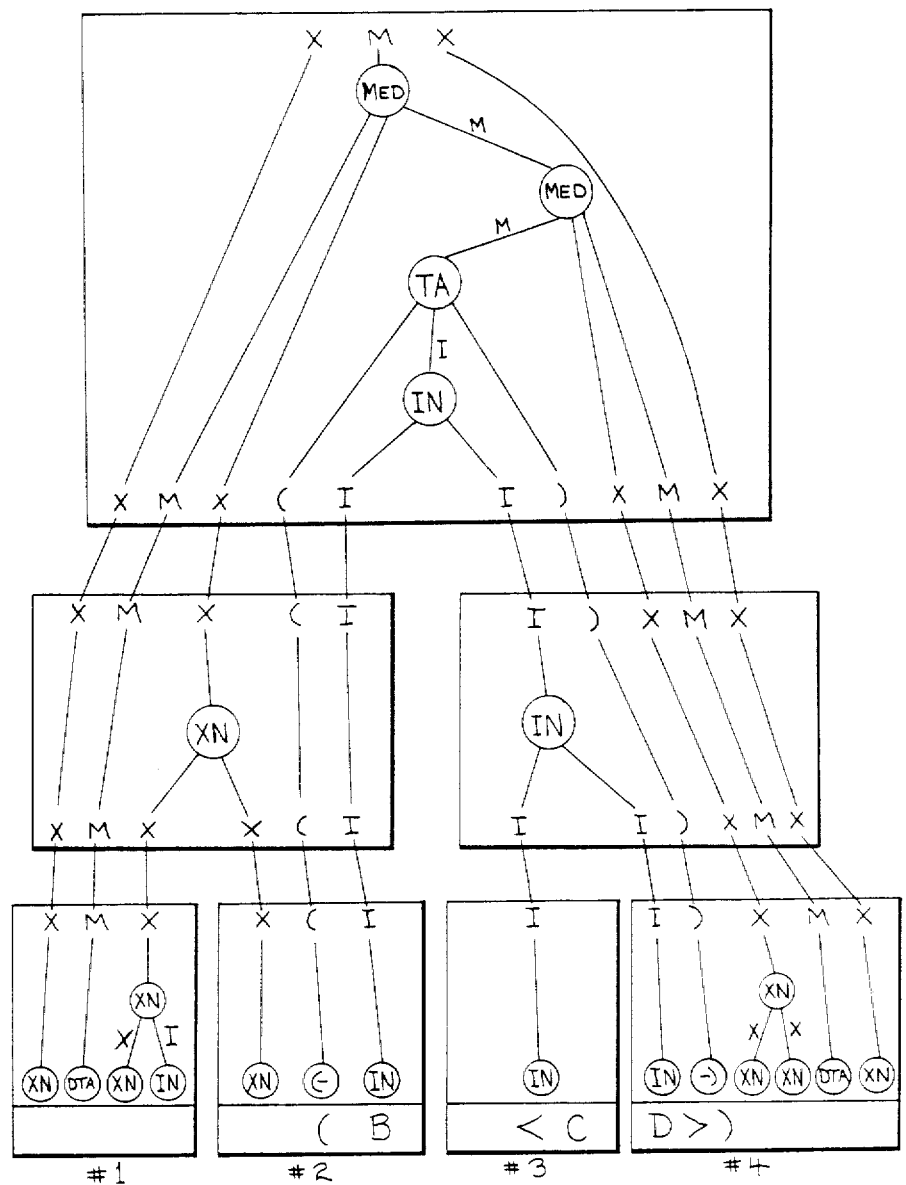
FIG. 10 is a schematic representation of an example of partitioning in the present invention.

FIG. 10 shows the TA-Mediator network embedded in a machine holding this RA: (B<CD>). The machine has only four L cells. For simplicity, such diagrams ordinarily show the syntactic brackets rather than the PC representation registers. Each channel is labelled with its channel type. The nodes are circled to help distinguish them from the channel labels. This convention is followed from here on.

With reference to FIG. 10, we see that after the embedding of leaf nodes has been done, the cells proceed to combine channels together and embed the resulting non-leaf nodes. In this example, cell #1 combines X and I into an XN node, which yields, according to Chart B, an X channel. The CCC thus becomes X M X, which cannot be reduced further by Chart C. Hence the final CCC for cell #1 is X M X.

Cell #2 and cell #3 have no matching patterns, so they send on their CCCs without change. Cell #4 combines X X into an XN node, yielding an X channel and a final CCC of: I ) X M X.

The T cell above L cells #1 and #2 gets this inital CCC: X M X X ( I. The pattern X X forms an XN node, yielding an X channel, so the CCC sent on to the father T cell is: X M X ( I.

The T cell above cells #3 and #4 has as its initial CCC: I I ) X M X. It combines I I into an IN node, which yields an I channel, and this final CCC: I ) X M X.

Finally, the root T cell initially has this CCC: X M X ( I I ) X M X. Four nodes are formed. First, I I yields IN, which yields an I channel. Then ( I ) yields a TA node, which yields an M channel. The CCC at this point is X M X M X M X.

The second, third and fourth channels match pattern #8 of Chart C. So do the fourth, fifth, and sixth channels. In FIG. 10 an arbitrary choice has been made to reduce first the rightmost selectable channels. This gives a MED and leaves a CCC of X M X M X, which again matches pattern #8, producing a second MED and a final CCC of X M X. Since this is the root T cell, the partitioning is complete at this point. (If it were not the root, the CCC of X M X would be sent to the father T cell.)

3.6 Properties of the TA-Mediator Network

Figure 12:
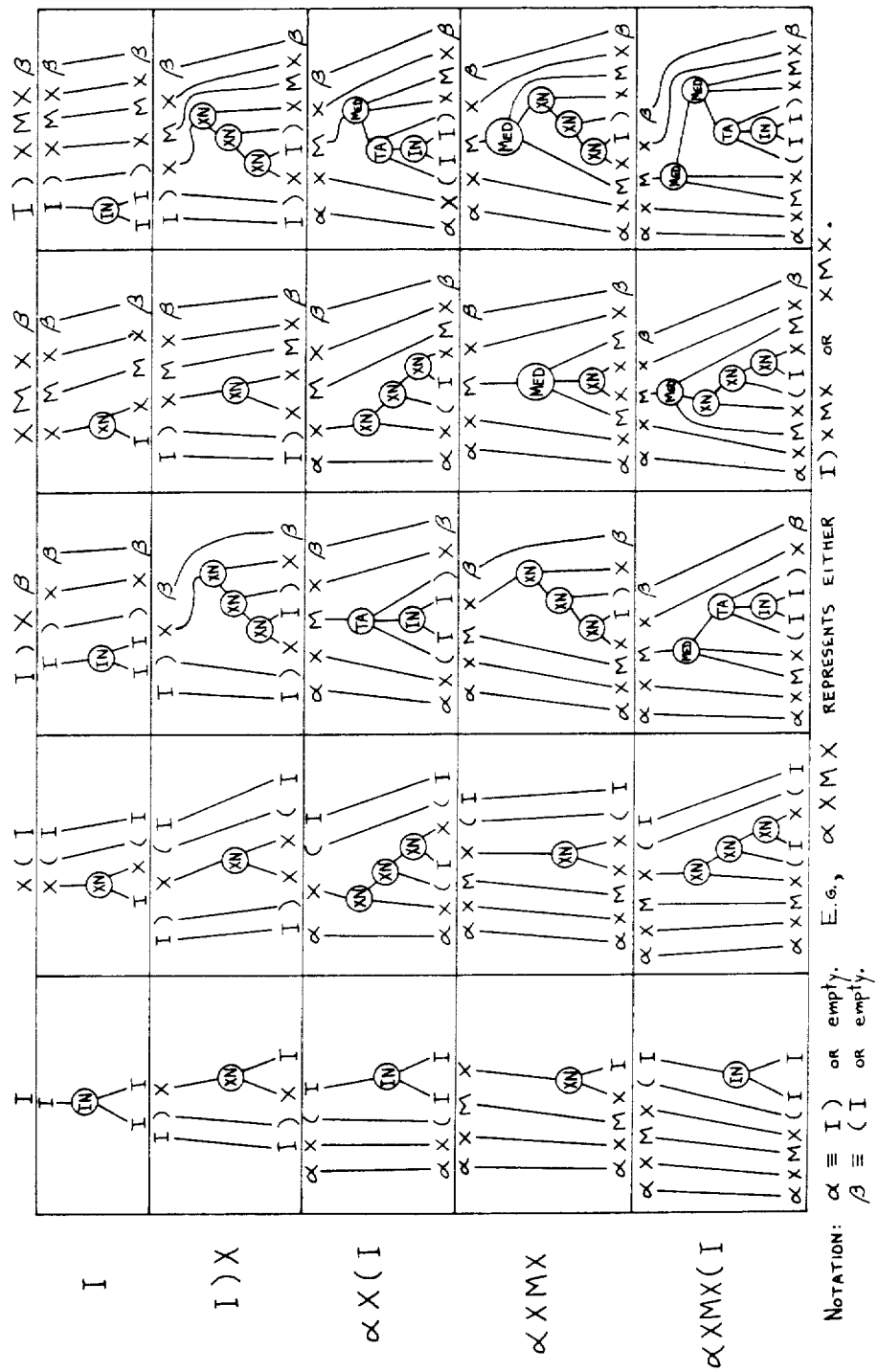
FIG. 12 is a schematic representation of all the configurations that a T cell can take on during partitioning in the present invention.

Charts A, B, C, and D together define the types of channels that can lead into and out of each type of node. FIG. 11 summarizes all the possibilities schematically. FIG. 12 gives a synopsis of the possibilities for a T cell in the partitioning process. There are 64 configurations a T cell may have to take on (but only one during any particular partitioning). The figure coalesces some similar configurations via the "alpha" and "beta" notation, as explained in the figure. The order of the rows and columns has been chosen deliberately to show the left-right symmetry. The entry in the bottom right corner (which represents 4 of the 64 configurations) is the only one in which there was a choice of which channels to combine together into a node. As in the example, an arbitrary choice has been made to combine the rightmost selectable channels first. The only other choice—using the leftmost selectable channels first—would have been just as appropriate; nothing depends critically on that choice. In both cases, the same number of nodes, of the same types, get embedded. The same CCC is sent to the father T cell. The only distinction is whether the TA is the right son or the left son of its MED father, and whether that MED is the right son or left son of its MED father. The only possible difference this can make is in the storage management process. In fact, it makes no significant difference.

With reference to FIG. 3, it is now possible to give, for each configuration of channels entering communications port 350, the configuration of channels carried by each of the communications paths leading upward from communications port 350. Table A below gives this correspondence.

TABLE A

| 350 | 352 | 353 | 354 | 355 | 356 |
| --- | --- | --- | --- | --- | --- |
| I |  |  |  |  | I |
| I ) X | I ) |  | X |  |  |
| X ( I |  |  | X | ( | I |
| I ) X ( I | I ) |  | X | ( | I |
| X M X | X | M | X |  |  |
| I ) X M X | I ) X | M | X |  |  |
| X M X ( I | X | M | X | ( | I |
| I ) X M X ( I | I ) X | M | X | ( | I |

Again with reference to FIG. 3, it is now possible to give, for each configuration of channels entering communications port 360, the configuration of channels carried by each of the communications paths leading upward from communications port 360. Table B below gives this correspondence.

TABLE B

| 360 | 366 | 365 | 364 | 363 | 362 |
| --- | --- | --- | --- | --- | --- |
| I | I |  |  |  |  |
| I ) X | I | ) | X |  |  |
| X ( I |  |  | X |  | ( I |
| I ) X ( I | I | ) | X |  | ( I |
| X M X |  |  | X | M | X |
| I ) X M X | I | ) | X | M | X |
| X M X ( I |  |  | X | M | X ( I |
| I ) X M X ( I | I | ) | X | M | X ( I |

Figure 12A:
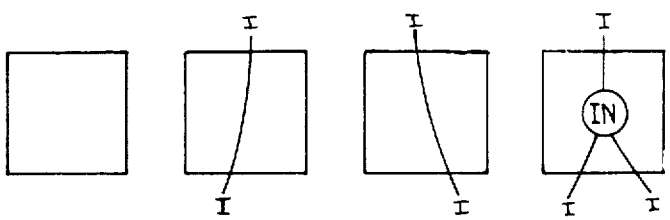
FIG. 12A is a schematic representation of all the configurations that an IN module can take on during partitioning in the present invention.

FIG. 12A shows all the configurations that may be taken on by an IN module during partitioning. (See FIGS. 3, 5, and 7.) Notice that one of the possibilities is that no channels and no nodes get embedded.

Figure 12B:
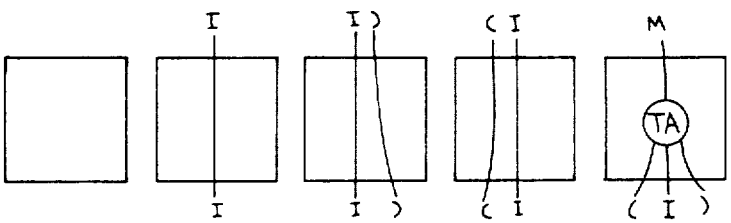
FIG. 12B is a schematic representation of all the configurations that a TA module can take on during partitioning in the present invention.

FIG. 12B shows all the configurations that may be taken on by a TA module during partitioning. (See FIG. 3.) Notice that one of the possibilities is that no channels and no nodes get embedded.

Figure 12C:
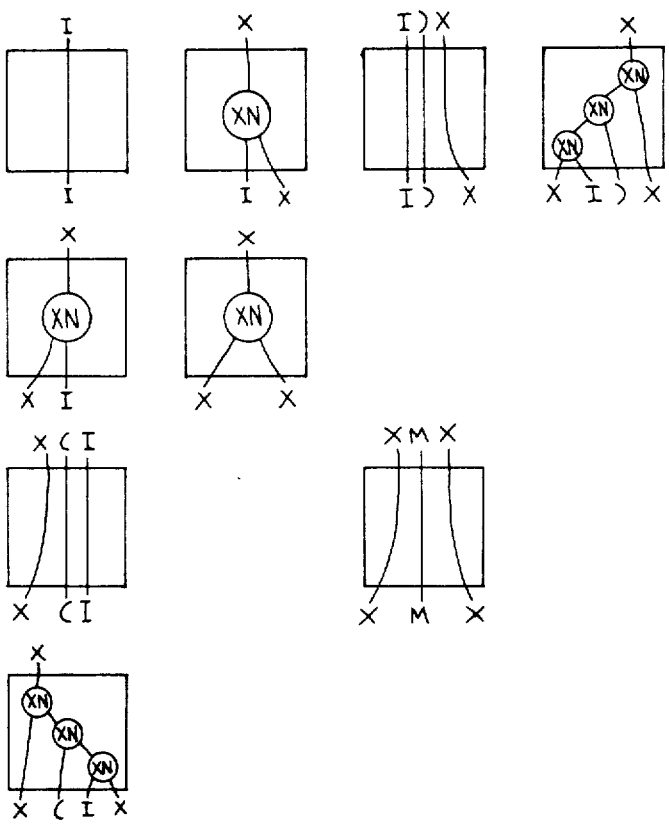
FIG. 12C is a schematic representation of all the configurations that an XN module can take one during partitioning in the present invention.

FIG. 12C shows all the configurations that may be taken on by an XN module during partitioning. (See FIG. 3.)

Figure 12D:
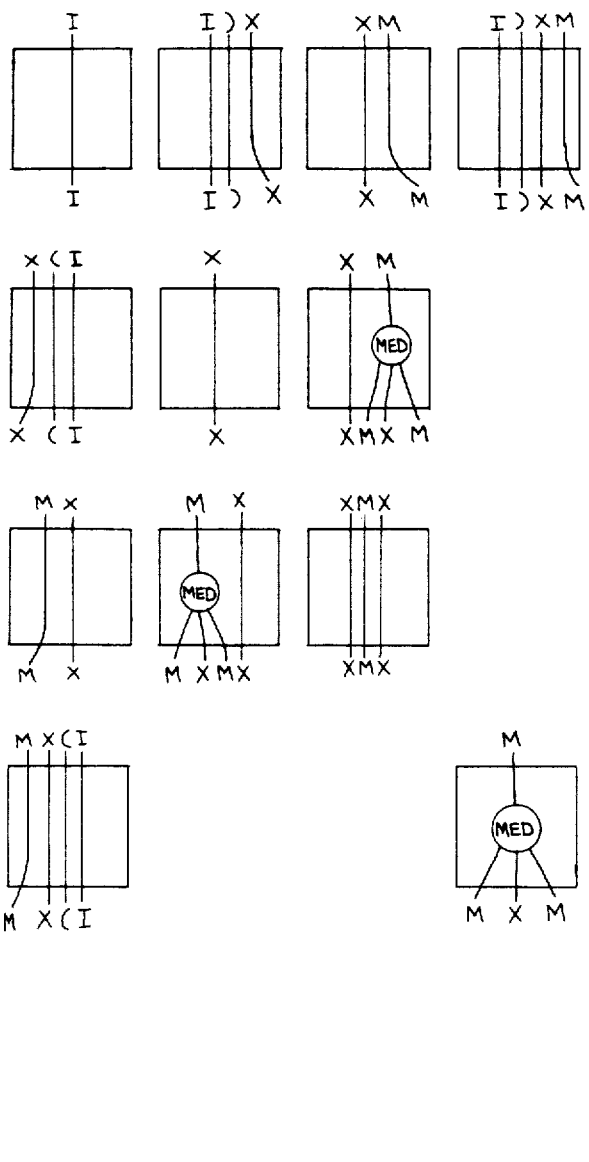
FIG. 12D is a schematic representation of all the configurations that a MED module can take on during partitioning in the present invention.

FIG. 12D shows all the configurations that may be taken on by a MED module during partitioning. (See FIG. 3.)

A definition has been given for the text seen by a leaf node of the TA-Mediator network. That definition is now extended. The text seen by a non-leaf node of the TA-Mediator network is defined (recursively) to be the text seen by the sons of the node. The L cells seen by a node are the L cells containing the text seen by the node. The text seen by an L cell is the text represented in that L cell (by LAP, LSEQ, S, RSEQ, and RAP). The text seen by a T cell is the text seen by its son cells.

The FFP text strictly between two adjacent RAs (or between an RA and an adjacent DTA, or between two adjacent DTAs) is called an XRA (external to an RA). An XRA consists of zero or more FFP symbols. Every FFP symbol in the machine lies either in some RA or in some XRA.

The following properties of the TA-Mediator network are easy to verify:

1. A non-leaf IN node has two sons, both of which are IN nodes.
2. A non-leaf XN node has two sons, at least one of which is an XN node.
3. A TA node has three sons: (- and IN and -).

4. A MED node has three sons. The left son is a DTA, a TA, or a MED. So is the right son. The middle son is an XN.
5. A DTA, (-, or -) is always a leaf node.
6. The middle subtree of a TA is a binary tree of IN nodes.
7. Each TA sees one RA, and nothing else.
8. The IN son of a TA sees all the text between the '(' and ')' of the RA, and nothing else.
9. Each RA is seen by exactly one TA.
10. The TA of an RA lies in the lowest cell seeing the whole RA.
11. Each RA area (i.e., the TA and its subtree) is disjoint from the other RA areas.
12. The XN son of each MED sees precisely one XRA, and nothing else.
13. Each XRA is seen by the XN son of exactly one MED.
14. The MED whose XN son sees a given XRA lies in the lowest T cell seeing the two RAs (or the DTA and RA, or the two DTAs) that bound the XRA.
15. There is a MED (or two of them) in the root cell of the machine. This is guaranteed by the presence of the DTAs in the endmost cells.
16. Except for the two outermost XN nodes and their X channels, the TA-Mediator network is a tree.
17. The subgraph of the TA-Mediator network consisting solely of the TAs, DTAs, MEDs, and M channels is a binary tree whose non-leaf nodes are MEDs and whose leaf nodes are TAs and DTAs.

3.7 Storing Information in the IN Nodes

The partitioning upsweep not only builds the TA-Mediator network, it stores in each IN node two kinds of information concerning the text seen by the node:
1. Indications of whether it and its sons see any FFP text at all.
2. Relative syntactic nesting depth information.

These are now discussed in more detail.

3.7.1 Mtext, Ltext, and Rtext

Each IN leaf node has a Boolean flag, denoted by Mtext (for "My text") that is true if the node sees some FFP text, and is false otherwise. Each IN non-leaf node has three Boolean flags: Mtext, Ltext, and Rtext, indicating, respectively, whether it, its left son, and its right son see any FFP text.

Thus each I channel carries an Mtext value during the partitioning upsweep. When a non-leaf IN node is formed, it sets Ltext to the value received from the left, Rtext to the value received from the right, and Mtext to the logical or of the two values. It sends Mtext on up its upward I channel.

Only the IN nodes have to perform this computation. The I channel leading into a TA node carries Mtext = true. The TA can discard this value. The only other node with an I downward channel is the XN node; it, too, can discard any Mtext values that come to it.

3.7.2 Relative Offsets

The other computation done on the partitioning upsweep stores in the IN nodes information about the relative syntactic nesting depths of the FFP text corresponding to the two subtrees of the node. This information is used on the next downsweep to tell every FFP symbol that lies inside an RA what its nesting depth is, relative to the RA's application brackets.

On the partitioning upsweep, for this purpose, every I channel carries two non-negative integers, LB and RB, and every IN node stores two non-negative integers, LOFF and ROFF.

LB and RB represent the number of unmatched sequence brackets on the left and right boundaries, respectively, of the subtree under the I channel. By definition, the number of unmatched sequence brackets on the left boundary is the number of unmatched right sequence brackets in the subtree, and vice versa.

"LOFF" and "ROFF" stand for "left offset" and "right offset." The highest level of FFP text in one subtree of an IN node may be at a deeper syntactic nesting level than the highest level of FFP text in the other subtree. LOFF and ROFF indicate which (if either) subtree is deeper. If LOFF<0 then ROFF=0 and the left subtree is deeper by LOFF levels. If ROFF<0 then LOFF=0 and the right subtree is deeper by ROFF levels. Otherwise, the highest levels of FFP text in the subtrees are at the same nesting depth (and LOFF=ROFF=0).

Each IN node, upon being formed from two adjacent I channels, uses the LB and RB values on these channels to compute LOFF, ROFF, and the output values of LB and RB. Let LB1 and RB1 denote the values from the left channel; LB2 and RB2 denote the values from the right channel; and LB and RB denote the values sent on up to the father on the upward channel.

The leaf IN nodes can use the same computational algorithm as the other IN nodes if the appropriate input values of LB1, RB1, LB2, and RB2 are assumed. Recall that every L cell embeds exactly one IN leaf node; that IN leaf node should act as if it had the following input values:

LB1=0  RB1=lseq  LB2=rseq  RB2=0

(Recall that lseq and rseq are the number of left and right sequence brackets stored in the cell.) In other words, the IN leaf node acts as if it has a left son that sees the (lseq) left sequence brackets and a right son that sees the (rseq) right sequence brackets.

The algorithm for computing LOFF, ROFF, LB, and RB is given in Chart E. In effect, this algorithm matches up the (unmatched) left sequence brackets of the left son with the (unmatched) right sequence brackets of the right son. If there are more left brackets, ROFF becomes positive; if there are more right brackets, LOFF becomes positive; otherwise both become 0.

| Chart E | |
|---|---|
| Algorithm for computing relative offsets | |
| OFF | := RB1 − LB2 |
| ROFF | := Max ( 0, OFF ) |
| LOFF | := Max ( 0, −OFF ) |
| LB | := LB1 + LOFF |
| RB | := RB2 + ROFF |
| Store LOFF and ROFF. | |
| Send LB and RB up the upward channel. | |

Figure 13:
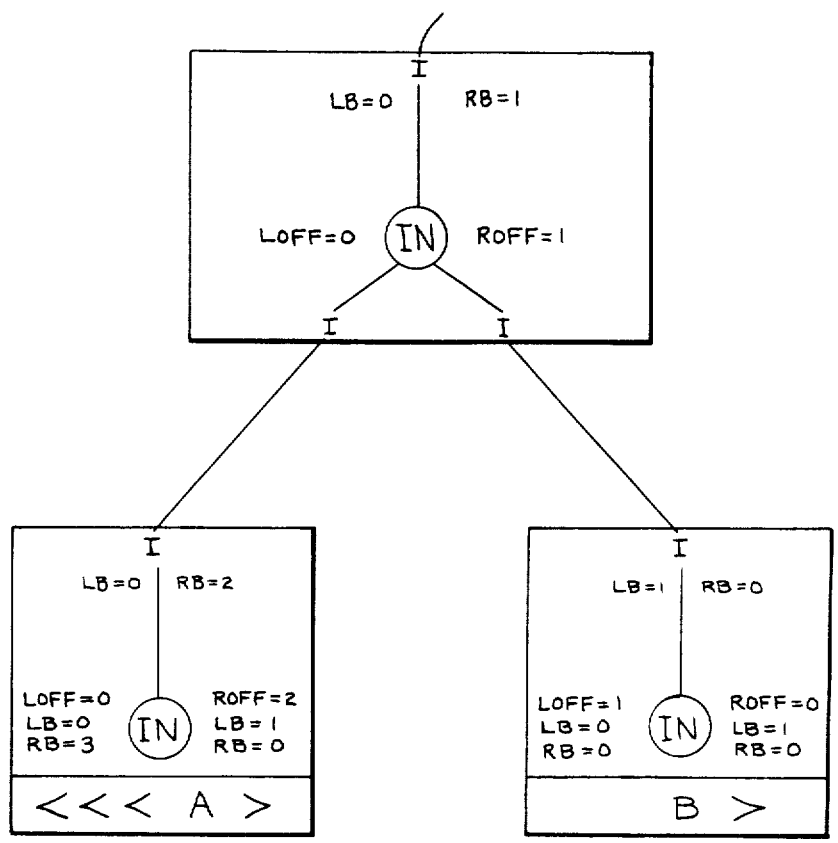
FIG. 13 shows an example of LB, RB, LOFF, and ROFF as computed during partitioning in the present invention.

Only the IN nodes have to perform this computation. The I channel leading into a TA node carries LB=0 and RB=0, assuming the RA is syntactically well-formed; the TA can discard these values. The only other node with an I downward channel is the XN node; it, too, can discard the LB and RB values that come to it. FIG. 13 shows a small example.

3.8 Some Implications of Partitioning

The following brief observations can now be made about the requirements of the cells of Machine II:
1. The nodes act as processors. Each has some local storage. Whether each node actually is a separate processor, or the nodes time-share one or more processors, is a question to be decided on the basis of cost and performance.
2. The channels are used as two-way communication links between nodes. This implies the need for some registers and some simple processing capabilities for each channel in each cell.
3. No L cell other than the leftmost and the rightmost in the machine has to embed more than 3 nodes. The L cells on the ends of the machine have to embed no more than 7 nodes. Exactly one of the nodes embedded in each L cell is an IN node. Chapter 5 describes how that IN node may be refined by embedding several other nodes within it.
4. No L cell other than the leftmost and rightmost in the machine has to embed more than 3 channel segments. The L cells on the ends of the machine have to embed no more than 7 channel segments. Exactly one of the channel segments in an L cell is an I channel segment. Chapter 5 describes how that I channel segment may be refined by embedding several other channel segments within it.
5. No T cell has to embed more than 4 nodes. (See FIG. 12.) At most one of these is an IN node. Chapter 5 describes how the IN node may be refined by embedding several other nodes within it.
6. No T cell has to embed more than 1 TA node.
7. No T cell has to embed more than 2 MED nodes.
8. No T cell has to embed more than 3 XN nodes.
9. No T cell has to embed more than 18 channel segments. At most five of these are I channel segments. Chapter 5 describes how each of these may be refined by embedding one or more new channel segments within it.

3.9 Another Example of Partitioning, with Relative Offsets

Figure 14:
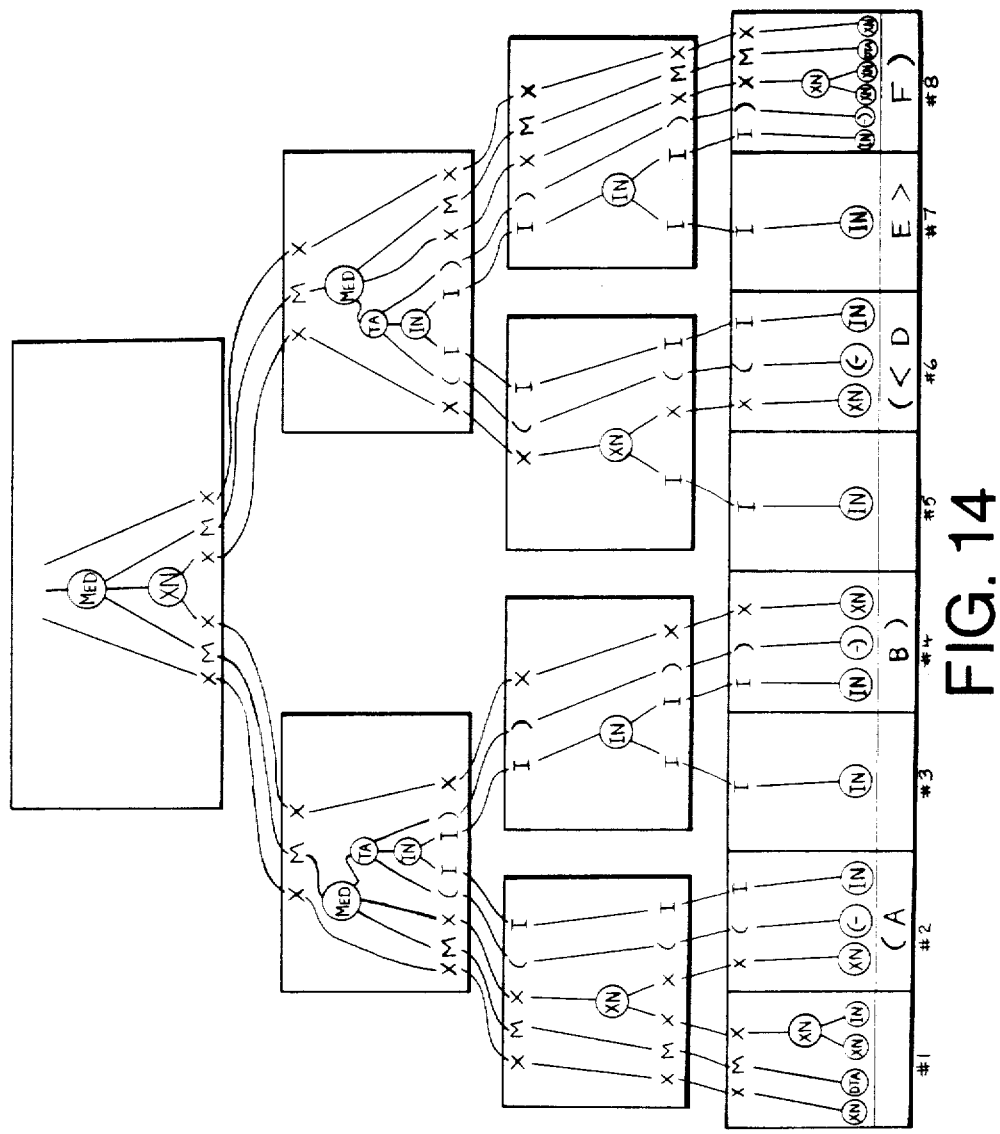
FIG. 14 is a schematic representation of an example of an embedded TA-Mediator network.
Figure 15:
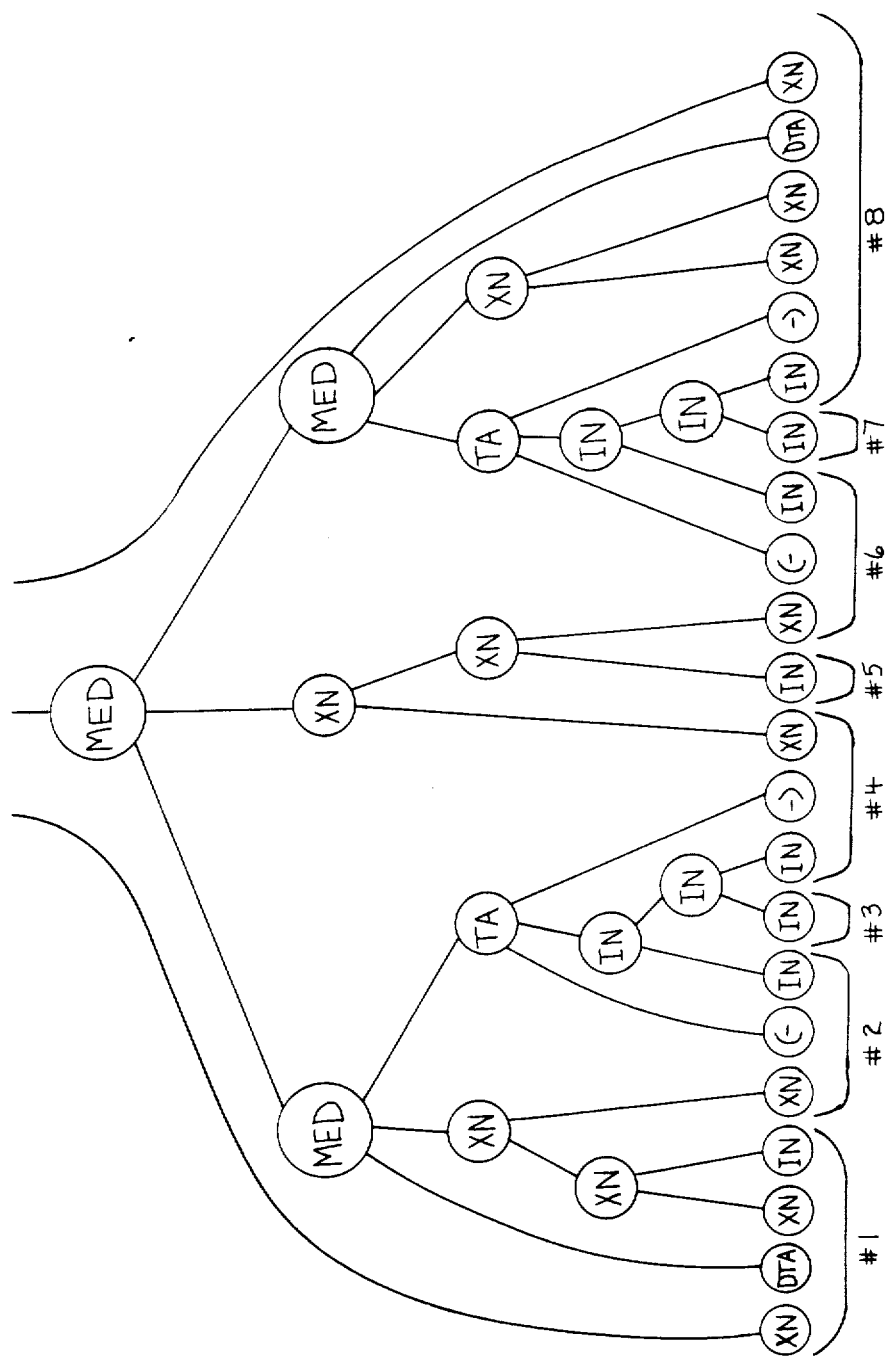
FIG. 15 is a schematic representation of the structure of the TA-Mediator network shown in FIG. 14.
Figure 16:
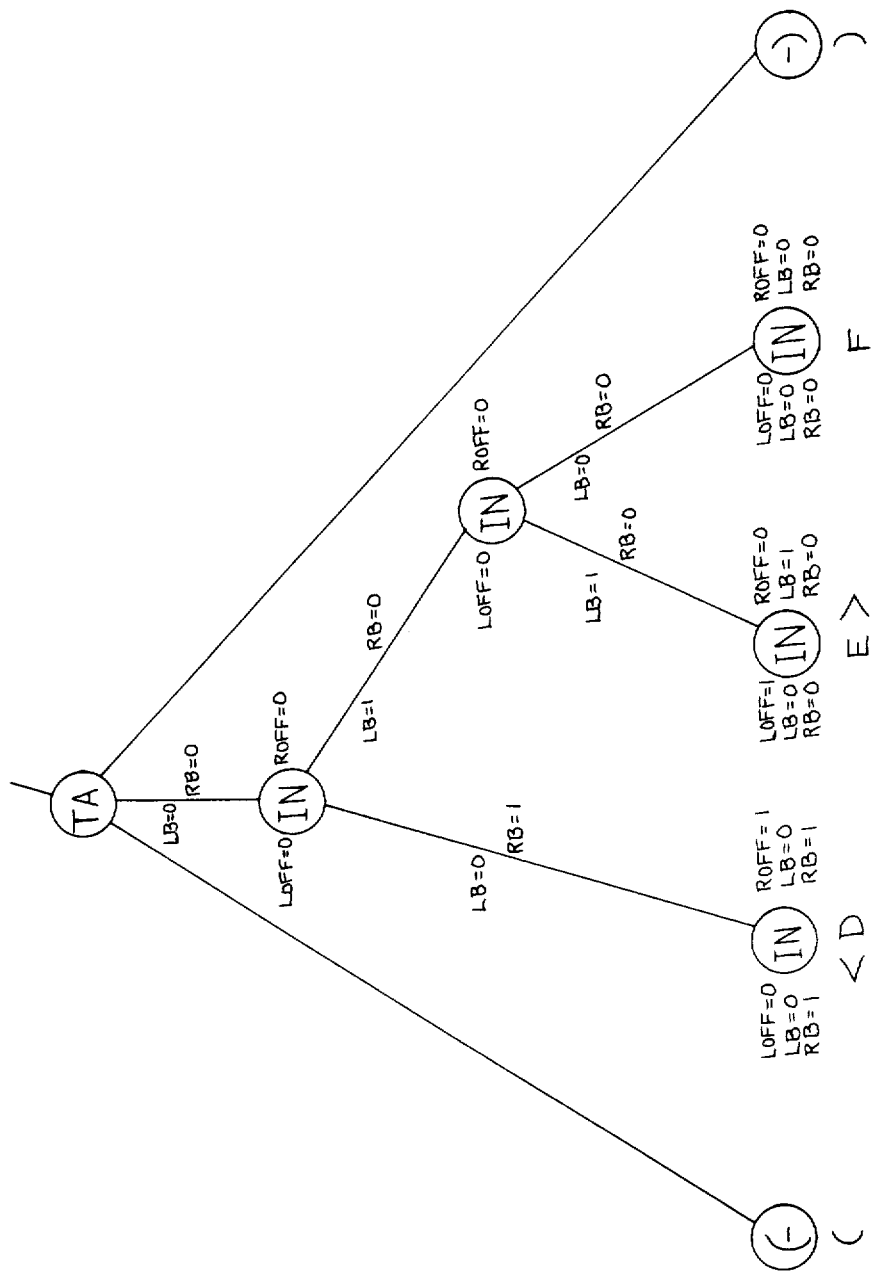
FIG. 16 is a schematic representation of an example of LB, RB, LOFF, and ROFF as computed during partitioning for the rightmost RA shown in FIG. 14.

The next three figures show an example of partitioning in a machine with eight L cells. FIG. 14 shows which cells the various nodes and channels are embedded in. FIG. 15 shows the resulting TA-Mediator network structure, without the machine cells. FIG. 16 is a blow-up of the internal structure of the rightmost RA, showing the LB, RB, LOFF, and ROFF values.

4. Overview of Execution

What is stored in the L array is one or more applicative expressions, each comprising a single user-program. For simplicity, the convention is adopted that each user-program must be an application ( u d ), where u is an operator expression of some standard form, say <QUIT jobinfo userinfo>, holding some identifying information about the job and the user; and where d is the applicative program the user wants executed. The operator QUIT is executed, of course, only after d has been reduced to a constant. It is also assumed that the application brackets enclosing a user-program are tagged so that the machine can distinguish them from ordinary application brackets, and a user-program is not allowed to be nested inside another expression. This makes it easy for the machine to detect completion of user-programs.

Machine II has one or more T cells that can serve as I/O ports, as they simultaneously serve in their normal roles as T cells. Each T cell in the machine is connected to each of its two sons by an I/O channel. The I/O channels are (logically, at least) distinct from the channels of the TA-Mediator network. Every T cell knows how to send information to an I/O port along the I/O channels.

Outside of the machine is a processor P that acts as the interface between the users and the machine. P can communicate with each I/O port of the machine. P accepts user-programs from the users and collects information about their space (and perhaps time) requirements. P and Machine II jointly decide when and where new user-programs should be inserted (as described below), and P makes those programs available to the appropriate I/O ports. When a user-program has been executed, it flows back to P through an I/O port, and P returns it to the user. This I/O, of course, must be coordinated with the other activities of Machine II; the following paragraphs describe at a high level how this is done. The succeeding chapters describe certain aspects in more detail.

Figure 17:
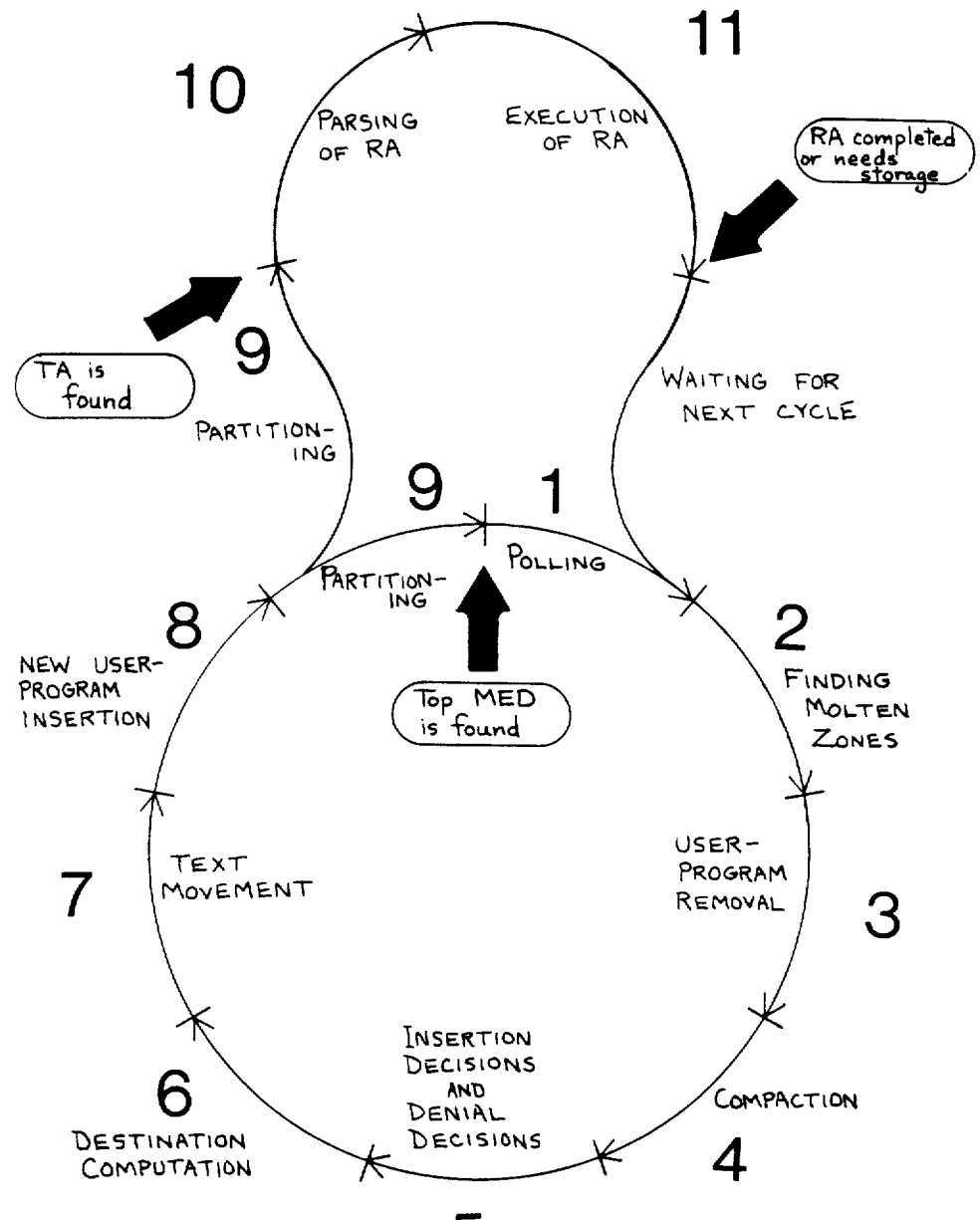
FIG. 17 is a schematic representation of the execution cycle of the present invention.

Assume that some user-programs have been brought into the machine and stored in L, and that the machine has been running for a while. The activities of the machine are cyclic. FIG. 17 shows how the steps of the cycle are related. The description begins with the most easily identified point in the cycle:
1. [Polling] The topmost MED node in the machine sends a polling signal down its M channels. This signal, which is intended to determine the status of the RAs, spreads to all the TAs in the machine.
2. [Finding molten zones] Every TA responds immediately to the polling signal by sending one of these three status indications to its father MED:
   (a) the RA has been reduced—i.e., its execution is complete
   (b) the RA needs storage now
   (c) the RA is still executing, and storage is not needed at this time.

On the basis of the status information, the MEDs locate the so-called molten zones of the machine: those regions outside the RAs with status (c). The RAs with status (c) continue their execution without interference. Any RA with status (a) or (b) becomes part of a molten zone, as does the non-RA text in the machine. The molten zones are the regions of the machine that are ready to have their text shifted around to provide storage where it is needed. Corresponding to each molten zone is a unique MED node that sees that entire molten zone; that MED node supervises steps 3 through 8 of the cycle for that zone.

3. [User-program removal] In each molten zone, each completed user-program is detected and removed from the machine—i.e., the result (the final expression) is returned to the user and erased from the L cells.
4. [Compaction] In each molten zone, after the removal of all completed user-programs, certain of the syntactic brackets may be coalesced, so that the text becomes fully compact in the zone. Execution of RAs—in particular, erasure of expressions—can yield text that is not fully compact. The purpose of this step of the cycle is to regain any such wasted space.
5. [Insertion decisions and denial decisions] Each molten zone decides whether it has too little space to honor all its storage requests, exactly the required amount, or an abundance. If there is too little, it denies the requests of some RAs; they wait until next time. If there is exactly the required amount, then all the requests are satisfied. If there is an abundance, and if the zone is not entirely inside a user-program, then the number of excess cells is reported to an I/O port, which reports it to P. If there are user-programs of the appropriate sizes waiting to be brought in, then a decision is made concerning which of them to bring in, and their sizes are reported back to the top MED node of the molten zone.

6. [Destination computation] Each molten zone—on the basis of the sizes and positions of its undenied storage requests, the sizes of the new user-programs to be inserted, and the locations of the empty L cells—computes where each text symbol presently in the zone should move in order to create empty L cells where they are needed to satisfy all the storage requests of the (undenied) RAs and to provide space for the new user-programs.

7. [Text movement] In each molten zone, the program symbols move from their present locations in L, up through the machine tree, and back down to their L cell destinations.

8. [New user-program insertion] The new user-programs are brought in and stored in the space allocated for them.

9. [Partitioning] In each molten zone, when the text has finished moving and the new programs (if any) have been stored, partitioning is done, as described in the previous chapter. This process builds a new TA-Mediator network reflecting the new alignment of text in the L array. Actually, the algorithm used here is a slightly modified version of Algorithm PARTITION of Chapter 3, the modification being necessary to take into account the fact that part of the TA-Mediator network (the part corresponding to the RAs whose status in step 2 above was (c): still executing) is already standing in place. The partitioning upsweep, in a sense, synchronizes the whole machine, terminating in the root cell only when all the molten zones have finished their text movemet and been re-integrated into the global network (i.e., the new TA-Mediator network). The topmost MED in the machine can then initiate another polling signal to start the next cycle.

10. [Parsing] As each TA is found on the partitioning upsweep, it notices the status of its RA. There are three possibilities:
    (a) new RA
    (b) old RA, storage having been allocated
    (c) old RA, storage having been denied.

In case (c), there was insufficient space available to satisfy the RA's storage request this time, so the TA simply has to wait for the next polling signal to come down, and then ask again for storage. In case (a) or (b), though, the TA immediately initiates a parsing process in its area. This process, described in detail in the next chapter, refines the TA's tree of IN nodes by embedding a more elaborate tree of nodes reflecting the syntax of the RA. This is done in each RA's area concurrently with the continuing upsweep of the partitioning process elsewhere in the machine. There is no need for the RAs to communicate with each other in this process; each proceeds independently of the others.

11. [RA execution] The RAs are reduced concurrently, each beginning as soon as its parsing is completed. Within each RA's area, all the nodes are initially quiescent. The TA initiates the execution. It can activate computational processes in the other nodes of its network. The techniques for specifying and implementing these computations are described in Chapter 6. For now, it is merely noted that the computations can be highly concurrent and that they culminate in the reduction of the RA. Although the computation can involve the concurrent actions of a large number of machine cells, it is always the case that control eventually returns to the TA, all the other nodes of the RA's network becoming quiescent. At this point, the computation may be complete, or it may merely have reached a point at which additional storage is needed in order to continue the reduction. In either case, the TA waits until the next polling signal and then announces its status.

Steps 2 through 8 are collectively referred to as storage management. Chapter 7 discusses storage management.

In any particular molten zone, steps 2 through 9 are mutually exclusive: each step is completed before the next one begins. However, each molten zone goes through these steps independently of the other molten zones. Step 9 (partitioning) eventually causes the molten zones to go out of existence, as the new TA-Mediator network is built. (Steps 7, 8, and 9 could, in each molten zone, be overlapped to some degree, but, for simplicity, this possibility is not pursued here.)

The internal parsing of an RA (step 10) takes place concurrently with the continuing upsweep of the partitioning process (step 9); and as soon as the parsing is complete for an RA, the RA's execution (step 11) begins, independent of whether partitioning and parsing are still going on elsewhere in the machine.

An RA, once it has started execution, proceeds without pause through as many cycles as needed, until it either finishes or decides to ask for storage. Its only continuing responsibility outside itself is to respond immediately to each polling signal that comes down to the TA. (That response requires but a trivial amount of work by the TA.) This contrasts sharply with the situation in Machine I, in which every RA that has not finished by a certain point in the cycle is interrupted, forced to push back into L any data moving through the tree, and then required to participate in global storage management.

5. Embedding the SN-CP Network

5.1 Introduction

Figure 47:
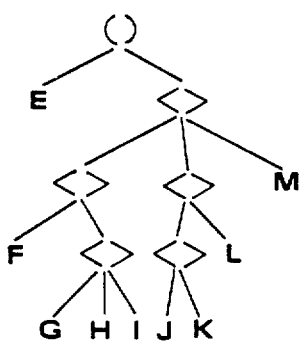
FIG. 47 is a schematic representation of a syntax tree corresponding to an FFP expression.

A human parses an FFP expression such as (E< <F<G H I> > < <J K>L>M>)

only with some difficulty. The difficulty is eased if the expression is drawn as a syntax tree in which each atom and each pair of matching brackets forms a node, as shown in FIG. 47.

In this form it is immediately obvious that the expression is an application with two subexpressions, the first being E and the second being a sequence which itself has three subexpressions, and so on. The translation back and forth between the two representations is straightforward.

A relative level number (RLN) is associated with each subexpression of the RA, as follows:

The RLN of the RA itself is 0.

If x is an element of expression e (see the discussion of FFPs), and e has RLN=i, then x has RLN=i+1. There is, furthermore, a natural way to associate an RLN with each symbol of an RA. If the symbol is an FFP atom, then it is also an FFP expression, and thus already has an RLN. If the symbol is a syntactic bracket, then its RLN is taken to be the RLN of the expression delimited by that bracket.

EXAMPLE

```
Text:   ( E < < F < G H I > > < < J K > L > M > )
RLN:    0 1 1 2 3 3 4 4 4 3 2 2 3 4 4 3 3 2 2 1 0
```

Figure 48:
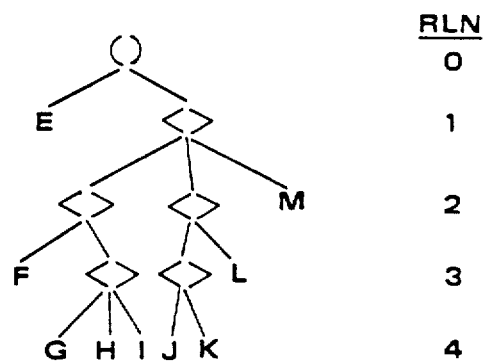
FIG. 48 is a schematic representation of a syntax tree and its corresponding relative level numbers.

The syntax tree shows it nicely of FIG. 48.

The execution of an RA in Machine II takes place in a tree of nodes reflecting the syntactic structure of the RA. The present chapter describes how that tree of nodes—a refinement of the TA-Mediator network—is embedded in the machine. Ideally, the tree embedded for each RA would look like the syntax trees in FIGS. 47 and 48. Two problems arise, however. Both of them occur because only a fixed amount of hardware can be incorporated in each machine cell.

The first problem is that there is virtually no limit to the number of elements a sequence can have. If <a1 a2 a3 ... an> is embedded in the machine, the < > node has n sons. Does this mean it has to have n channels feeding directly into it from the sons? If so, the machine cell holding < > has to be able to embed n channels.

Figure 49:
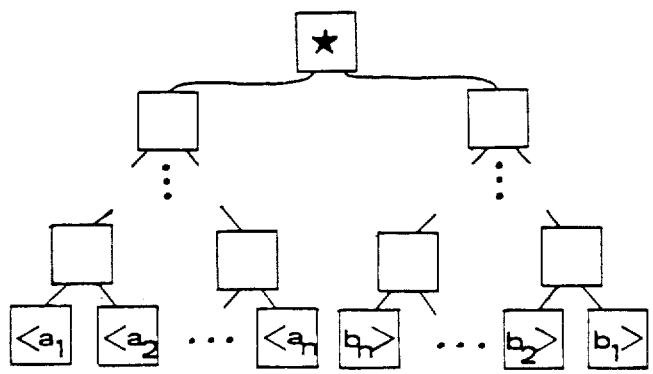
FIG. 49 is a schematic representation of a deeply-nested FFP expression as it might be stored in the machine.

The second problem is that there is virtually no limit to the depth to which an expression can be nested. Suppose, for instance, that $$<a1<a2<a3 \ldots <an-1<an\ bn>bn-1>\ldots b3>b2>b1>$$

is to be embedded in the machine. The natural way to do so is to embed, for each subexpression, a node in the lowest machine cell seeing the entire subexpression. It may happen that a single cell is the lowest one for all n of the non-atomic subexpressions in the example. The text might, for instance, be stored in the machine as indicated in FIG. 49.

In this case, one machine cell (the one marked in FIG. 49 with *) has to embed n nodes. In other words, the amount of hardware needed in the cell grows linearly with the nesting depth of the text seen by the cell.

Figure 50:
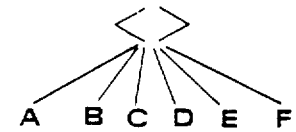
FIG. 50 is a schematic representation of a syntax tree.
Figure 51:
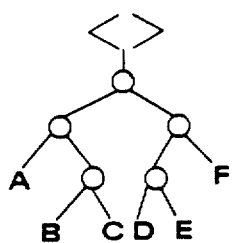
FIG. 51 is a schematic representation of a different form of the syntax tree of FIG. 50.

The solution proposed here to the first problem is to combine together the upward channels of the sons of a node before the channels reach the node. For instance, the syntax tree shown in FIG. 50 might be treated by the machine as if it were of the form shown in FIG. 51.

It is possible to do so in such a way that every node is guaranteed to have only a few downward channels. Furthermore, it can be guaranteed that only a few of the circular of FIG. 51 to be embedded in any single machine cell.

The solution proposed here to the second problem is to embed a syntax tree corresponding only to the top few syntactic levels (i.e., the least deeply nested levels) of each RA. Most of the computation will be expressed in terms of these top few levels, and will be carried out by the nodes so embedded. (Of all the primitive operators mentioned in Backus's Turing Award Lecture, "Can programming be liberated from the von Neumann style? A functional style and its algebra of programs," *Communications of the ACM* 21, 8 (August 1978), 613–641, only one requires knowledge of the structure of the operand to a depth greater than three.) It is essential, though, that all the text of the RA be "visible" to the TA for certain basic functions such as copying the text to another location or comparing two expressions for equality.

Thus the following strategy is used. A small positive integer D is chosen at the time the machine is built. In each RA, every sequence bracket with RLN>D is treated, for purposes of parsing, as if it were an FFP atom. In effect, this "flattens" all the syntactic structure below level D into a single "flat" level (with RLN=D+1).

Figure 52:
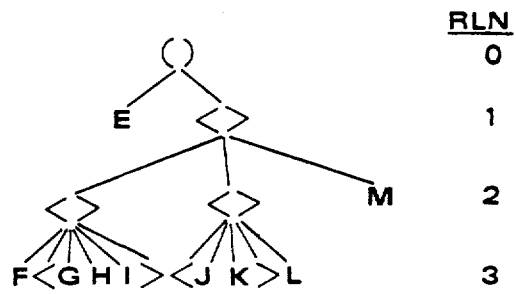
FIG. 52 is a schematic representation of a flattened syntax tree corresponding to the syntax tree of FIG. 47.

Suppose, for instance, that D=2 for the machine. Then, given the text $$(I<<F<G\ H\ I>><<J\ K>L>M>),$$

the machine would embed a tree structure corresponding not to the syntax tree of FIG. 47 but to the flattened syntax tree shown in FIG. 52.

The coming sections show how to use these ideas to embed, for each RA, a tree of nodes reflecting the top levels of the syntax of the RA, assuming but a fixed amount of hardware in each machine cell. The term parsing will be used to refer to this process of embedding nodes corresponding to the RA's syntax.

5.2 The Downsweep: Computing the RLNs

Once a TA has been formed, it takes charge of the reduction of its RA. Since each TA sees its RA through its own separate network of nodes and channels, the TAs can proceed independently of each other. Each TA initiates parsing immediately upon being formed, so that parsing occurs simultaneously with the continued building of the TA-Mediator network higher up in the machine.

The parsing process refines the middle subtree of the TA (recall that it is a binary tree of IN nodes) by embedding a more elaborate tree reflecting the top several levels of the RA's syntax. The only nodes involved in the parsing are the TA nodes and the IN nodes that lie somewhere beneath a TA and see text. The IN nodes outside the RA areas and the IN nodes inside an RA but seeing no text have, by the time parsing begins, served their purpose. Now they simply sit until the next round of storage management. Each IN node that lies inside an RA area and sees FFP text, though, actively participates in the parsing, and thereby embeds within itself one or more new nodes and channels. These IN nodes, as distinguished from the non-participating ones, are called active IN nodes.

The resulting tree under each TA is called the SN-CP network of the RA, in reference to two of its several kinds of nodes, the SN node and the CP node. As was previously discussed, only the top levels of syntax of the RA can be parsed fully, since the amount of hardware in each machine cell grows with the number of levels of parsing depth. Let D denote the maximum number of levels of the RA's syntax that can be fully parsed. The value of D will determine the amount of hardware built into each machine cell.

The first downsweep after partitioning informs every FFP symbol in the RA what its RLN is. Then, to initiate the parsing upsweep, the symbols that are deeper than D cause "flat" nodes to be embedded in the L cells, while the symbols at higher levels cause ordinary syntax nodes to be embedded. (Notice that the symbols at the higher levels of syntax have small RLNs, and the symbols at the deeper levels of syntax have large RLNs).

The downsweep is initiated by the TA immediately upon its birth: the TA sends to its IN son the integer 1, which is the RLN of the highest-level text seen by the IN son of the TA. During this downsweep, each active IN node receives a single such integer, which is denoted by Mrln (for "My RLN"). Each IN non-leaf node, upon receipt of Mrln, computes the corresponding values to send to its sons, suing the algorithm shown in Chart F. In each case, the value of Mrln received by an IN node (non-leaf or leaf) is the RLN of the highest-level text seen by that node. What an IN leaf node does with Mrln is described in Section 5.4. Notice that only the active IN nodes receive Mrln.

| Chart F |
|---|
| Algorithm for computing nesting depths |
| Accept Mrln from father. |
| Lrln := LOFF + Mrln |
| Rrln := ROFF + Mrln |
| If Ltext = true, send Lrln to left son. |
| (This is the left son's Mrln.) |
| If Rtext = true, send Rrln to right son. |
| (This is the right son's Mrln.) |

5.3 The Nodes and Channels of the RA's SN-CP Network

The parsing process in each TA's area refines the binary tree of IN nodes and I channels by embedding a tree—the SN-CP network of the RA—consisting of six kinds of nodes and four kinds of channels. These are referred to as interior nodes and interior channels. The interior nodes are represented by the following node symbols:
1. SN—"Syntax" node.
2. CP—"Syntax combining place" node.
3. FN—"Flat" node.
4. FC—"Flat combining place" node.
5. <—"Left sequence bracket" node.
6. ->—"Right sequence bracket" node.

The interior channels are represented by the following channel symbols:
1. S—"Syntax" channel.
2. F—"Flat" channel.
3. <"Left sequence bracket" channel.
4. >"Right sequence bracket" channel.

Each <- and each -> and each FN is a leaf node of the SN-CP network. Each CP and each FC is a non-leaf node. An SN may be either a leaf or a non-leaf. These facts will be easy to verify when the parsing algorithm has been specified.

Each SN node corresponds to an FFP expression at or above level D. Each FN node corresponds to one or more FFP symbols below level D. Each <- node corresponds to a '<' at or above level D. Each -> node corresponds to a '>' at or above level D. Each CP node combines the channels from SN (or other CP) nodes. Each FC node combines the channels from FN (or other FC) nodes.

The upsweep that embeds the SN-CP network also stores in the interior nodes information concerning the text seen by the nodes. For simplicity, the embedding process is described first. Then the enhancements that store the necessary information in the nodes are described.

In the upsweep of the parsing process, the active IN nodes get refined: they embed various interior nodes and channels within themselves. The I channels also get refined, embedding various interior channels (subchannels, one might say) within themselves.

Figure 53:
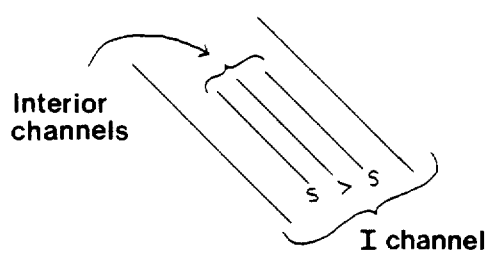
FIG. 53 is a schematic representation of an I channel enclosing three interior channels.

If an I channel is refined by embedding, say, three channels of type S and > and S, respectively, then the situation could be pictured by showing the three interior channels enclosed in the I channel as depicted in FIG. 53.

Figure 54:
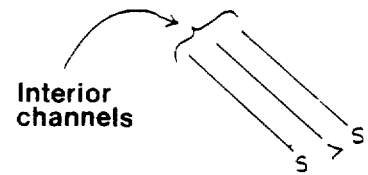
FIG. 54 is a schematic representation of three interior channels, without their enclosing I channel.

It is usually clearer, however, to omit the I channel from the diagram, and simply show the interior channels, as shown in FIG. 54.

Figure 55:
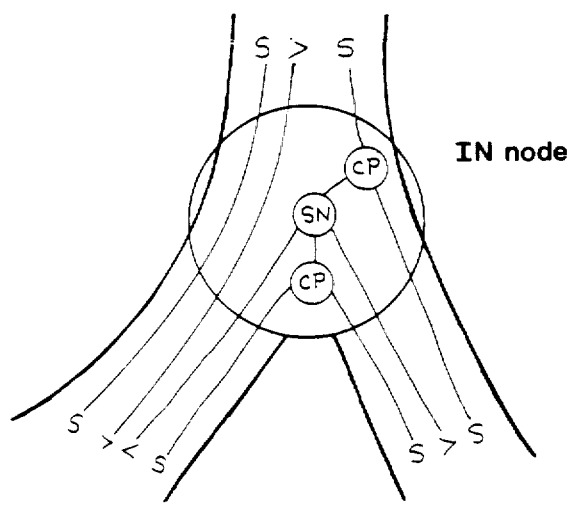
FIG. 55 is a schematic representation of an IN node and its channels.
Figure 56:
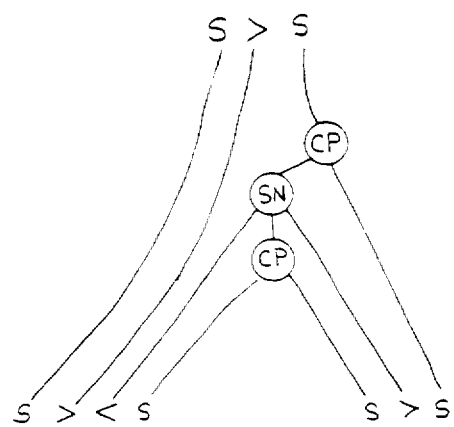
FIG. 56 is a schematic representation of the same IN node and its channels, as it will commonly be drawn.

Similarly, it is usually convenient and clear to show the interior nodes and channels that get embedded within an IN node, without showing the IN node itself. Thus, for instance, the diagram of an IN node and its channels shown in FIG. 55 will instead commonly be drawn as shown in FIG. 56.

After the parsing has been done, the IN nodes and the I channels—as distinguished from the interior nodes and channels embedded within them—have no role to play in the RA's execution. They simply sit passively and wait until the RA goes through storage management; at that point they again become useful, as is explained in Chapter 7.

5.4 The Upsweep: Building the SN-CP Network for the RA

5.4.1 A Simple Example of an SN-CP Network

Before delving into the details of the parsing upsweep, consider an example of what is to be embedded. The complications introduced by the "flat nodes" are avoided in this example, by assuming that D is greater than the nesting depth of the text in question.

Figure 57:
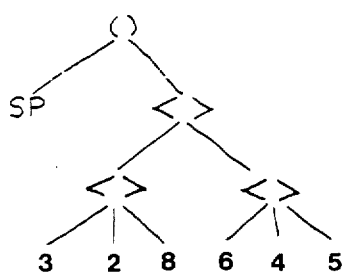
FIG. 57 is a schematic representation of a syntax tree.

Consider this RA: (SP<<3 2 8><6 4 5>>). It has the syntax tree shown in FIG. 57.

Figure 18:
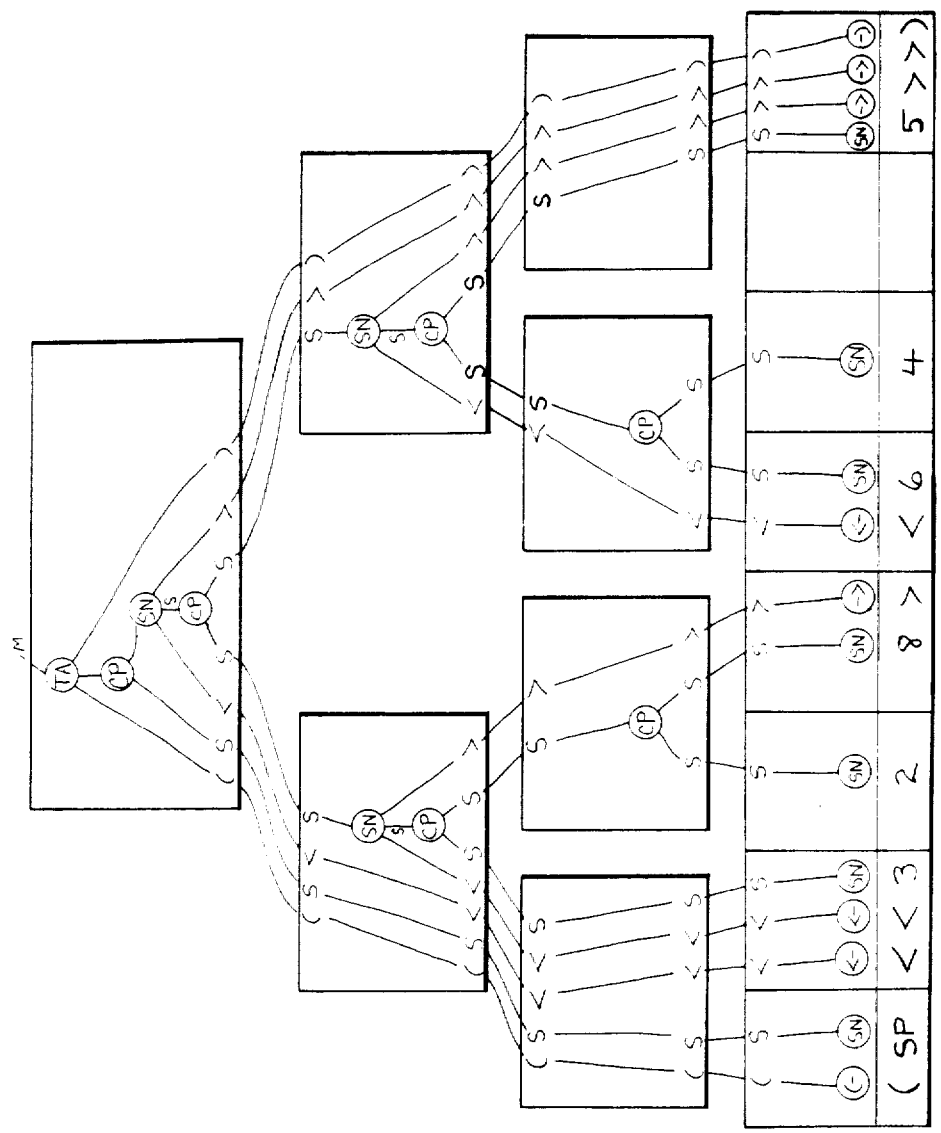
FIG. 18 is a schematic representation of an example of an embedded SN-CP network according to a first alignment of text.
Figure 19:
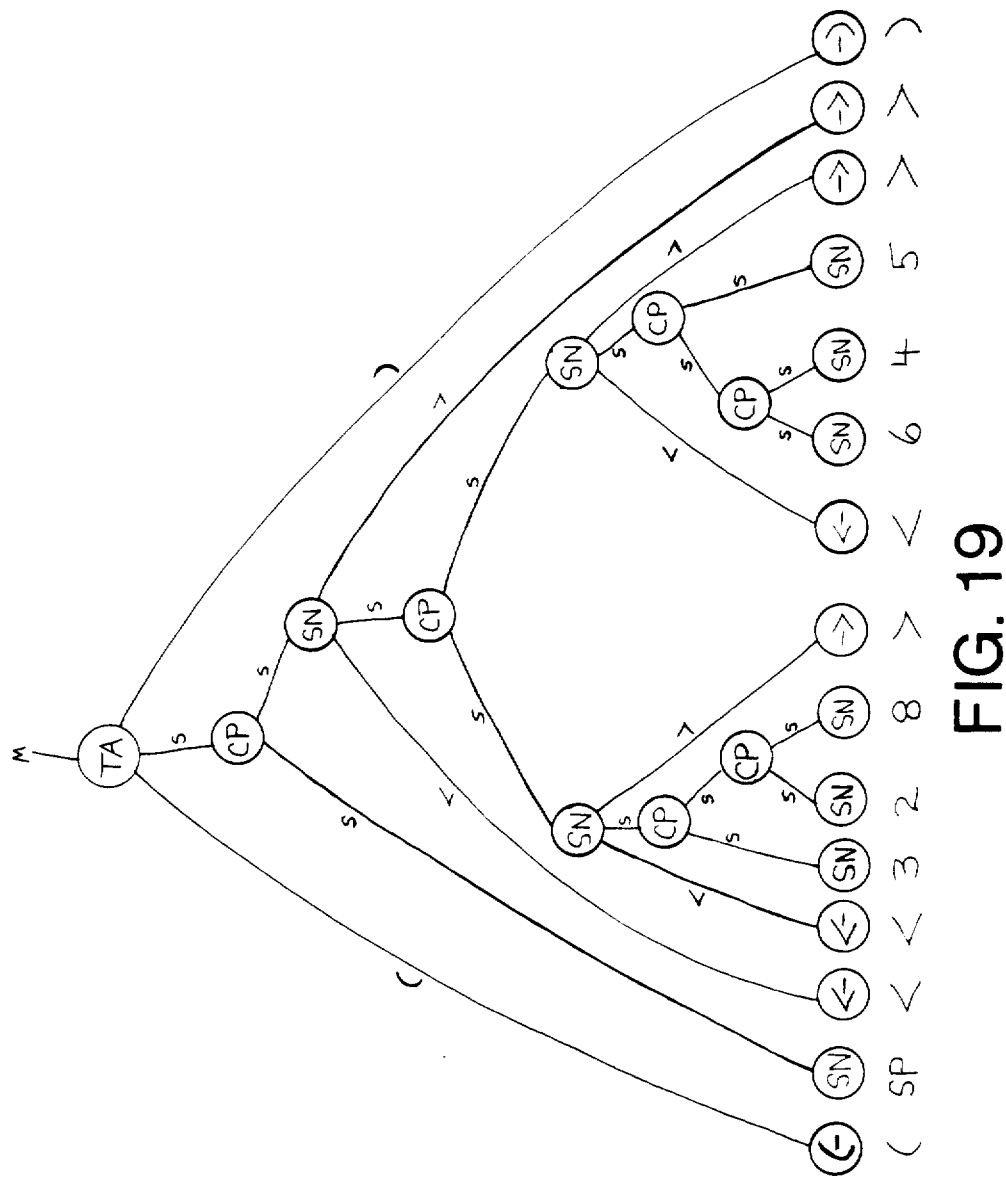
FIG. 19 is a schematic representation of an example of an SN-CP network structure according to a first alignment of text, as shown in FIG. 18.

FIG. 18 shows, for one way of storing this RA in the machine, the SN-CP network that gets embedded. (As explained above, the IN nodes and the I channels are not pictured.) FIG. 19 shows the structure of that SN-CP network, without the clutter of the machine cells.

Figure 20:
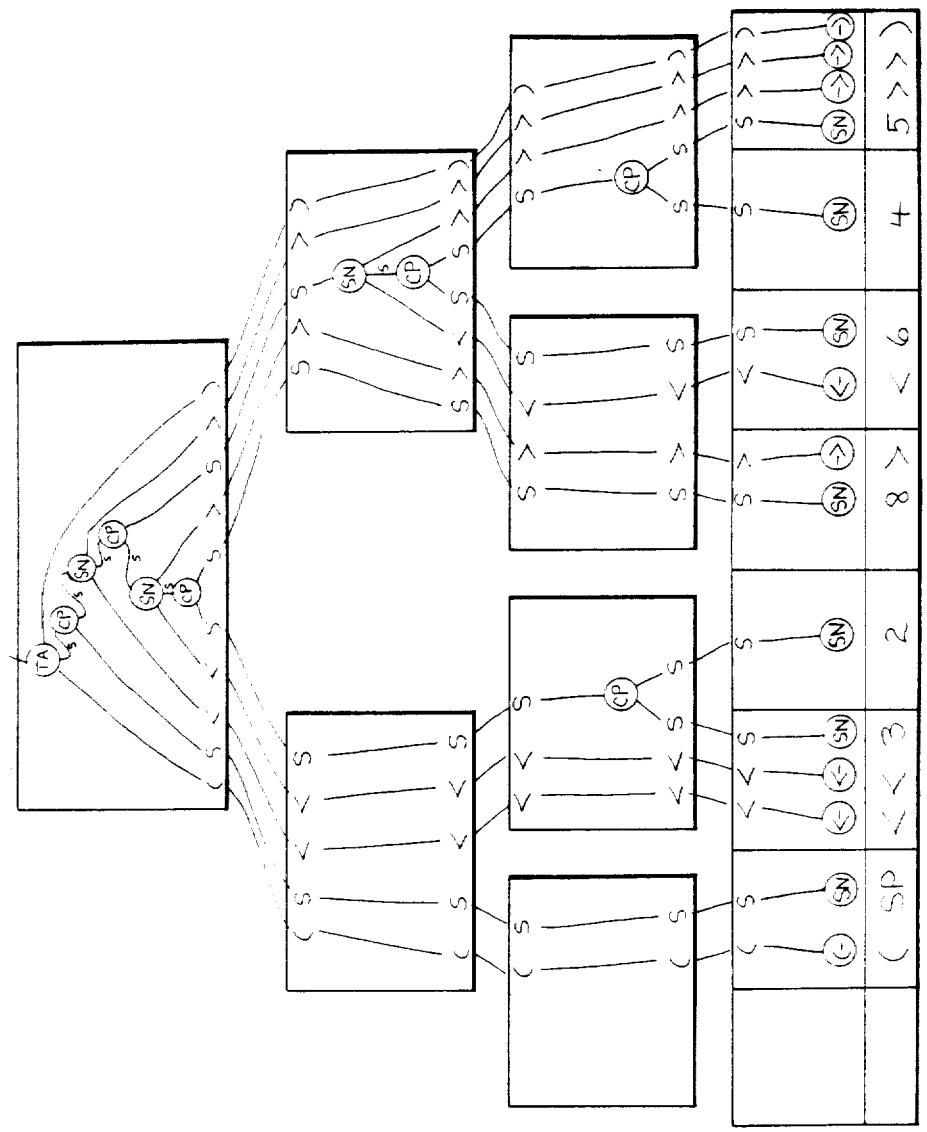
FIG. 20 is a schematic representation of an example of an embedded SN-CP network according to a second alignment of text.
Figure 21:
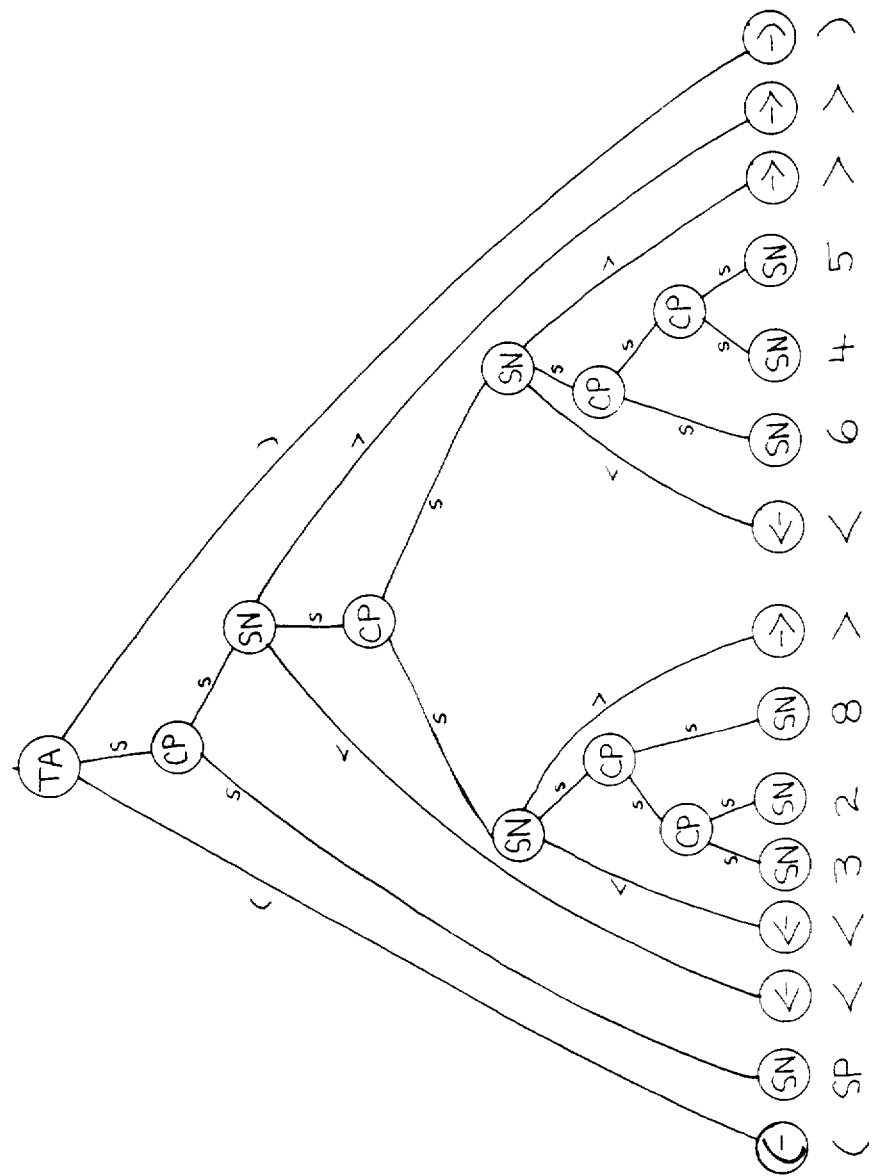
FIG. 21 is a schematic representation of an example of an SN-CP network structure according to a second alignment of text, as shown in FIG. 20.

FIG. 20 and FIG. 21 show the corresponding information for a different alignment of the text in the machine. (Still other alignments are possible, of course.)

Notice how similar the two SN-CP networks are, when abstracted from the machine. The only distinction between them is the order in which the S channels come together to form the CP nodes. This order depends entirely on how the text happens to sit under the T cells.

Notice that there is an SN node corresponding to each atom and to <3 2 8 > and to <6 4 5 > and to <<3 2 8 > <6 4 5 >>. The TA node corresponds to the entire RA. The CP nodes are used to combine together pairs of S channels of the top-level elements of a sequence or application. The close correspondence between the syntax tree and the SN-CP network should be apparent.

Assume that SP is a primitive FFP operator that takes a "sum of products" of the components of its operand. In the present example, then, the result should be 168, since 168=(3) (2) (8)+(6) (4) (5). Given the appropriate instructions, the nodes of the SN-CP network can easily and concurrently compute this result. In the SN-CP network of FIG. 19, for instance, the 2 and 8 can be multiplied in the CP node just above the SN nodes corresponding to 2 and 8. Then in the next CP above, the 3 and the 16 can be multiplied together.

While this is going on, the product of 6, 4, and 5 can be found in a similar way. Then the sum can be computed in the CP node that joins the $<3\ 2\ 8>$ and the $<6\ 4\ 5>$. The degree of concurrency is greatly increased if the operand has many subsequences, each with many elements. The next chapter shows how to program the modes of the SN-CP network to perform highly concurrent computations of this kind, and of much more complex kinds.

5.4.2 Embedding the Leaf Nodes of the SN-CP Network

A leaf IN node, upon receiving the Mrln value from its father, adds Mrln to LOFF and ROFF and uses the resulting values to guide the embedding of one or more nodes within the IN node. The new nodes can conveniently be thought of as belonging to three groups: a left group, a middle group, and a right group. The nodes in the left group correspond to the FFP text represented by the LSEQ register—i.e., to the lseq left sequence brackets represented in the cell. The middle group corresponds to the contents of the S register of the cell. The right group corresponds to the rseq right sequence brackets in the cell.

When the IN leaf node receives Mrln, it performs these assignments:

$$Lrln := LOFF + Mrln$$

$$Rrln := ROFF + Mrln.$$

Lrln is the RLN of the topmost (i.e., outermost) '$<$' represented in the cell, if there is one, and Rrln is the RLN of the topmost '$>$', if there is one. The chart below shows the RLNs of all the symbols of one RA. It also shows the LOFF, ROFF, Mrln, Lrln, and Rrln values of the leaf IN node. It is always true that lseq+Lrln=rseq+Rrln=the RLN of the atom, if there is an atom. If there is no atom in the cell, then this number is the RLN that an atom would have if it were inserted in the S register of the cell. This number is referred to as DA (Depth of Atom). This chart also shows DA for each cell.

| Contents | ( < | < A | B > | D > | < < < E > | > > > ) |
|---|---|---|---|---|---|---|
| RLN | 0 1 | 2 3 | 3 2 | 2 1 | 1 2 3 4 5 4 | 3 2 1 0 |
| LSEQ | 1 | 1 | 0 | 0 | 4 | 0 |
| RSEQ | 0 | 0 | 1 | 1 | 1 | 3 |
| LOFF | 0 | 0 | 1 | 1 | 0 | 3 |
| ROFF | 1 | 1 | 0 | 0 | 3 | 0 |
| Mrln | 1 | 2 | 2 | 1 | 1 | 1 |
| Lrln | 1 | 2 | 3 | 2 | 1 | 4 |
| Rrln | 2 | 3 | 2 | 1 | 4 | 1 |
| DA | 2 | 3 | 3 | 2 | 5 | 4 |
| Cell # | 1 | 2 | 3 | 4 | 5 | 6 |
| The RA: | ( < | < A B | > D | > < | < < < E > | > > > ) |

Now, the correspondence between the FFP text and the nodes in each of the three groups is described.

Left Group: Consider the text represented by the LSEQ register. It is desired to embed a $<$- node for every '$<$' that is at or above depth D, the machine's maximum parsing depth. Lrln is the depth of the topmost '$<$' in the cell (or of the atom, if there is no '$<$'. If $D >= Lrln$, there should be embedded Min(lseq,$D+1-Lrln$) nodes of type $<$-. Each $<$- node sees a '$<$' in the text. If lseq exceeds the number of left sequence bracket nodes so embedded, then some of the left sequence brackets are too deeply nested to get their own $<$- nodes, and they have to be represented, as a group, by a single FN node.

Middle Group: If S is empty (i.e., if there is no atom stored in the L cell), then nothing is embedded in the middle group. If there is an atom in S, and DA$<=$D, then an SN node is embedded to correspond to the atom. If there is an atom in S, but DA$>$D, then the atom is too deeply nested to be represented except as flat text, so an FN node is embedded to correspond to the atom.

Right Group: This group is treated symmetrically with the left group. That is, a -$>$ node is embedded for every '$>$' that is at or above level D. Rrln is the RLN of the highest '$>$' (or of the atom, if there is no '$>$'). Thus, if D$>=$Rrln, then Min(rseq,$D+1-Rrln$) nodes of type -$>$ are embedded. Each node -$>$ sees a '$>$' in the text. If rseq exceeds the number of -$>$ nodes so embedded, then the remaining right sequence brackets are too deeply nested to get their own right sequence bracket nodes, and must be represented, as a group, by a single FN node.

The algorithm is stated more precisely in Chart G. The nodes are embedded in left-to-right order coinciding with the order of the text they represent. In the algorithm, AL is the number of syntactic levels between level D and the level of the leftmost '$<$' in the cell, inclusive. (Mnemonics: Above level D, Left sequence brackets.) EL is the number of left sequence bracket nodes to be embedded in the cell. (Mnemonics: Embed Left sequence brackets.) DL is the number of left sequence brackets that are nested too deeply to have their own sequence bracket nodes. (Mnemonics: Deeply nested Left sequence brackets.) AR, ER, and DR have corresponding meanings with respect to the right sequence brackets in the cell. Notice that the values of Lrln and Rrln for each IN leaf node are greater than or equal to 1. This implies that EL$<=$D and ER$<=$D. Thus no more than D nodes of type $<$- are embedded, and no more than D nodes of type -$>$ are embedded.

---

Chart G
Algorithm for refining an active IN leaf node

Accept Mrln from father node.
Lrln := LOFF + Mrln
Rrln := ROFF + Mrln
DA := lseq + Lrln (equivalently: rseq + Rrln)
/* Left group                                                          */
  AL := Max (D+1,Lrln) − Lrln
  EL := Min (AL,lseq)
  DL := lseq − EL
  Embed EL of these: $<$− (None, if EL = 0.)
  If DL > 0 then embed (to the right of all the
  $<$− nodes) an FN node representing DL left
  sequence brackets.
/* Middle group                                                        */
  If S is empty, do not embed anything.
  Else if DA $<=$ D then embed an SN node to
  correspond to the atom.
  Else embed an FN node to correspond to the
  atom.
/* Right group                                                         */
  AR := Max (D+1,Rrln) − Rrln
  ER := Min (AR,rseq)
  DR := rseq − ER
  Embed ER of these: −$>$ (None, if ER = 0.)
  If DR > 0 then embed (to the left of all the
  −$>$ nodes) an FN node representing DR right -continued

| Chart G |
|---|
| Algorithm for refining an active IN leaf node |
| sequence brackets. |

Figure 22:
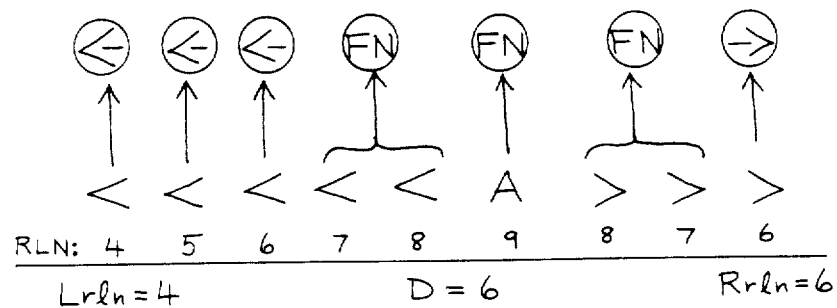
FIG. 22 is a schematic representation of an example of the correspondence between the text and the leaf nodes of the SN-CP network embedded in an L cell.
Figure 23:
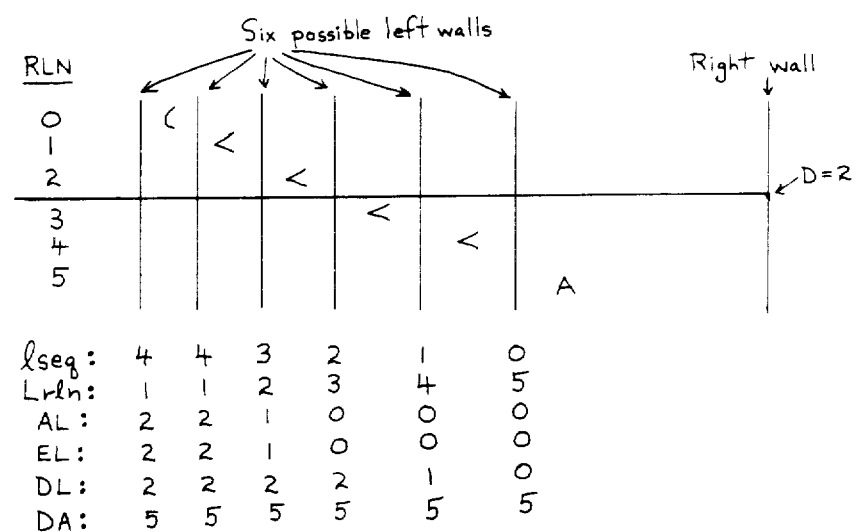
FIG. 23 is a schematic representation of several examples of lseq, Lrln, AL, EL, and DL in an L cell.

FIG. 22 illustrates the correspondence between the nodes embedded in an L cell and this text: <<<<<A>>>, assuming D=6, Lrln=4, and (therefore) Rrln=6. FIG. 23 illustrates the values of RLN, lseq, Lrln, AL, EL, DL, and DA for this text: (<<<<A. The value of D is assumed to be 2, and the horizontal line indicates the level below which text is "flattened." Depending upon the compactness of the text, anywhere from 0 to 5 of the brackets in the example might be stored in the same L cell as the atom A. In the figure, these six possibilities are shown by means of the six positions of the left wall (cell boundary) of the L cell. In each case, the numbers at the base of the wall are the values of lseq, Lrln, AL, EL, DL, and DA with respect to the single L cell stretching from that wall to the right wall. For all six examples, DA=5, rseq=0, Rrln=5, AR=0, ER=0, and DR=0. FIG. 24 is another example of the same kind, varying the position of the right wall, and using D=5 and this text: A>>). For all four examples, DA=3, lseq=0, Lrln=3, AL=0, EL=0, and DL=0.

5.4.3 Embedding the non-Leaf Nodes of the SN-CP Network

The algorithm controlling the parsing upsweep is quite similar to the algorithm controlling the partitioning upsweep. In both cases there is a CCC (Current Channel Configuration), a chart defining the upward channels of the nodes, and a chart defining the legal combinations of downward channels to form nodes.

The upward channels of the nodes are shown in Chart H below. The initial CCC in each active IN leaf node of the RA is the vector of channels emanating from the nodes embedded by the algorithm of Chart G.

| Chart H | |
|---|---|
| Channels leading upward from a node | |
| Node | Upward channel of the node |
| SN | S |
| CP | S |
| FN | F |
| FC | F |
| <- | < |
| -> | > |

The CCC is compared with the patterns of Chart I, and, if a matching pattern is found, the appropriate node is embedded and the CCC is updated. Algorithm PARSE, the algorithm for using this chart, is nearly identical to Algorithm PARTITION. It is given in Chart J.

| Chart I | |
|---|---|
| Node formed from adjacent channels | |
| Pattern (downward channels) | Node to be Embedded |
| 1. | S S | CP |
| 2. | F F | FC |
| 3. | < F > | SN |
| 4. | < S > | SN |

| Chart I | |
|---|---|
| Node formed from adjacent channels | |
| Pattern (downward channels) | Node to be Embedded |
| 5. | < > | SN |

| Chart J |
|---|
| Algorithm PARSE |
| Do while (the CCC contains adjacent channels matching a pattern in Chart I.) { Select any adjacent channels in the CCC which match a pattern in Chart I. Embed the corresponding node, giving it as downward channels the selected channels of the CCC. Using Chart H, embed the appropriate upward channel for the node. Form a new CCC from the old CCC by substituting the channel just embedded in place of the selected channels. } Send the CCC to the father node, thus embedding the appropriate interior channels within the upward I channel. |

The major difference between PARTITION and PARSE (besides the different charts they use) is that PARSE is executed inside each TA's area, by the active IN nodes rather than by the entire T cells and L cells. Each active non-leaf IN node has the property that Mtext=true—i.e., the node sees some text. The node also knows, from Ltext and Rtext, whether its right son or its left son or both see text. Thus it knows whether to expect a CCC from the left, the right, or both, during parsin. If it is to receive only one CCC, the effect of PARSE is simply to pass that CCC on upward. If the IN node is to receive two CCCs—i.e., if Ltext AND Rtext=true—it waits until both CCCs have arrived, concatenates them, embeds the appropriate nodes and channels, and sends the resulting CCC on to the father node, thus embedding the appropriate channels within the upward I channel. The parsing upsweep terminates upon reaching the TA.

Charts G, H, I, and J together define the types of channels that can lead into and out of each type of interior node. FIG. 25 summarizes the possibilities schematically.

The following algorithm is useful in defining the terms syntactic father and syntactic son. This algorithm can be applied to any SN node in the network:

| |
|---|
| Start at the SN. If it has no middle downward channel, then stop. Else { Move down the middle downward channel until another node is reached. While (the node is CP or FC) { Follow either downward channel until another node is reached. } }. |

Figure 26:
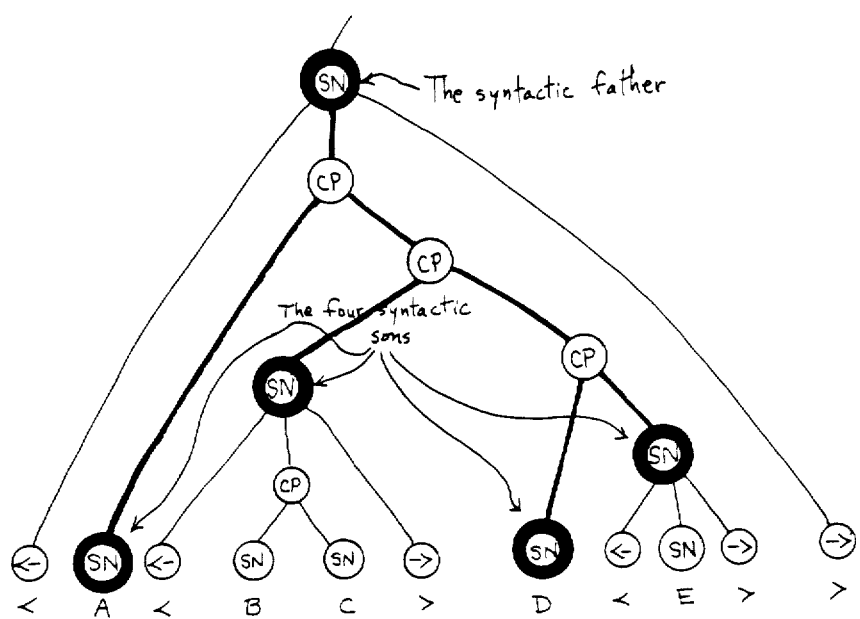
FIG. 26 is a schematic representation of an example of a syntactic father and its four syntactic sons.

If the SN node at which the algorithm starts corresponds to an FFP atom or to an empty sequence, then the algorithm terminates at the SN node itself. If the SN node corresponds to a non-empty sequence, then the algorithm terminates at the first SN or FN node that is reached. Consider the set of nodes of the SN-CP network reachable from a given SN node with this algorithm. That set of nodes and the channels connecting them form a binary tree whose root is the original SN, and whose internal nodes are CPs (or FCs), and whose leaf nodes are SNs (or FNs). The SN that is the root of the binary tree is said to be the syntactic father of the SNs (or FNs) that are the leaves of the binary tree; conversely, they are said to be the syntactic sons of the root SN node. FIG. 26 illustrates these terms.

5.4.4 An Example

Figure 27:
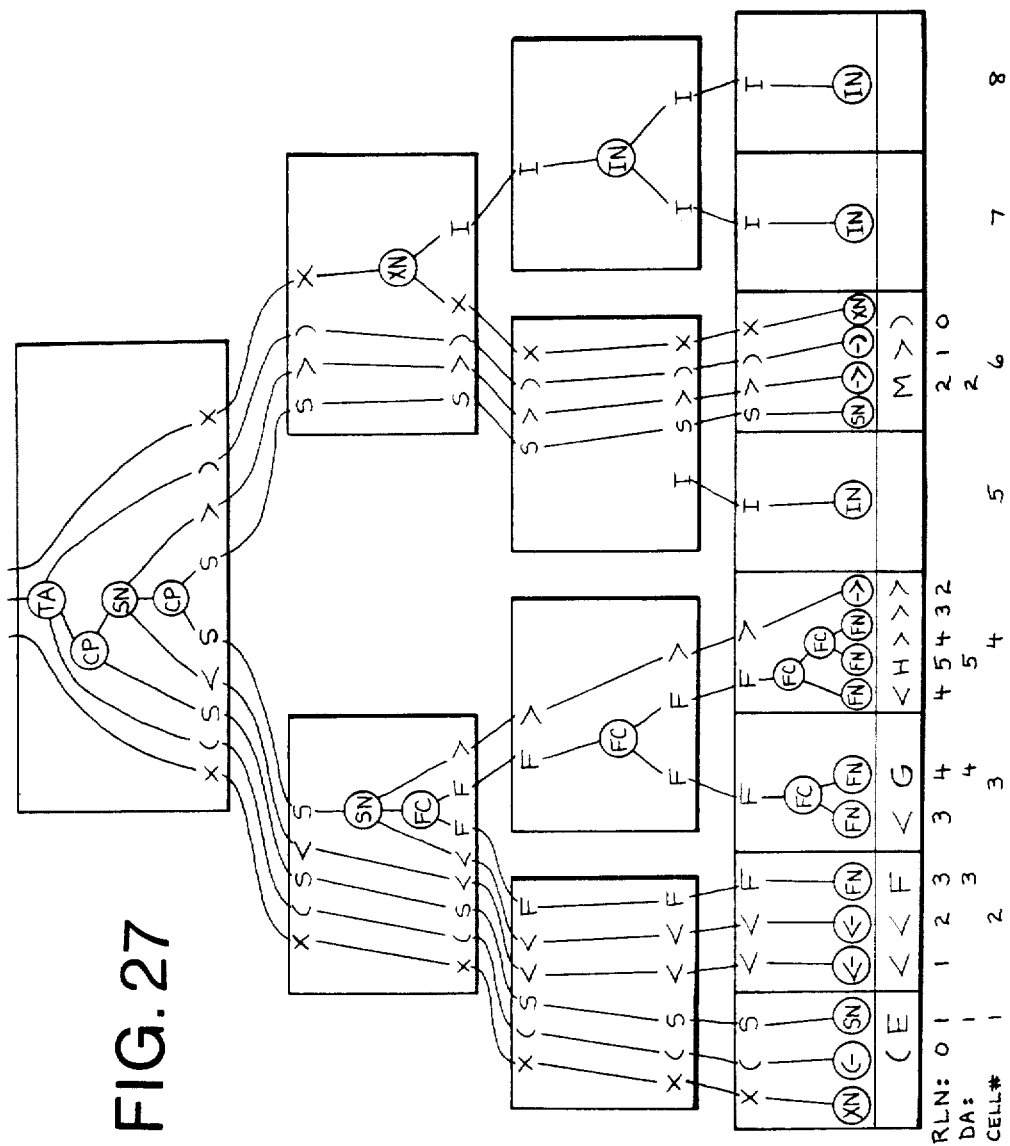
FIG. 27 is a schematic representation of an example of an embedded SN-CP network.
Figure 28:
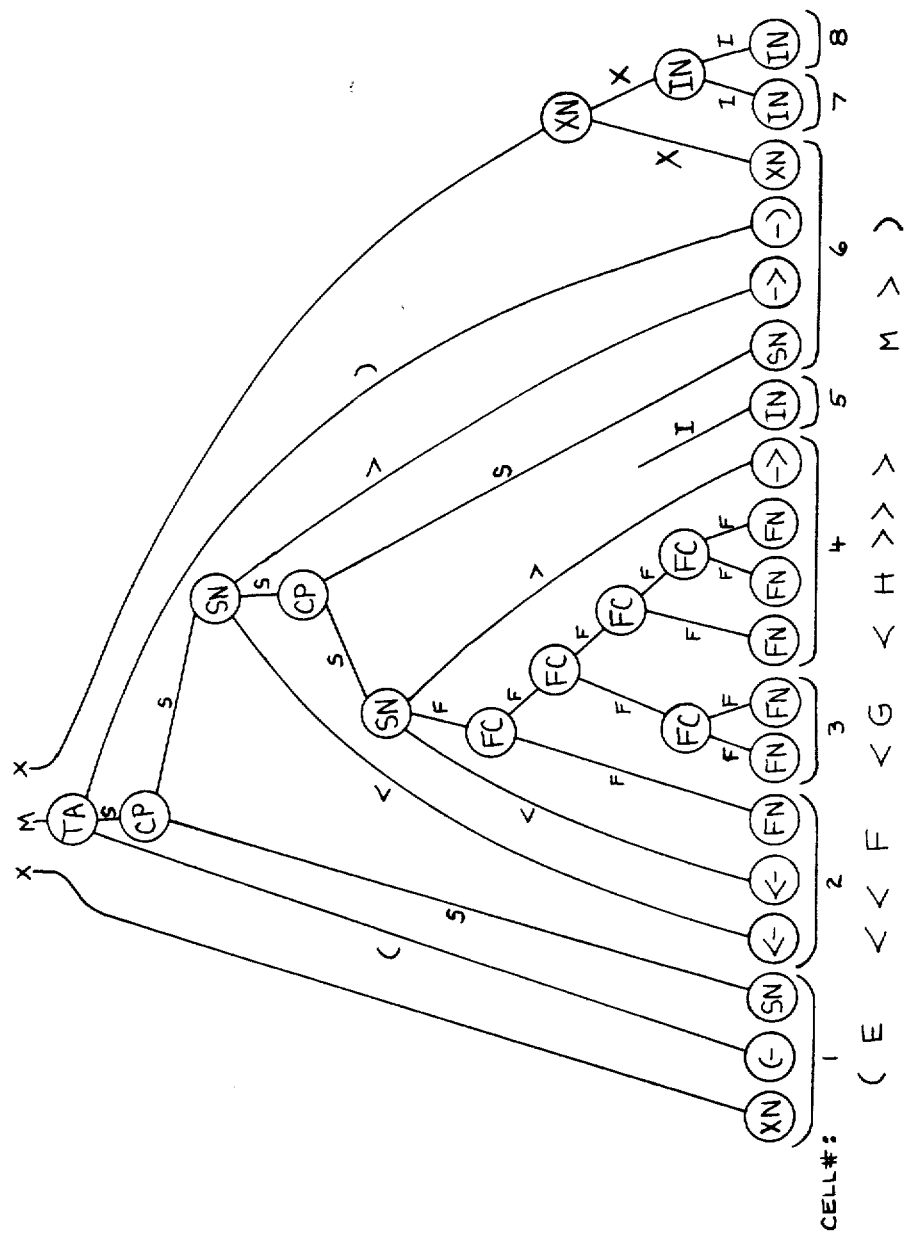
FIG. 28 is a schematic representation of the structure of the SN-CP network shown in FIG. 27.
Figure 58:
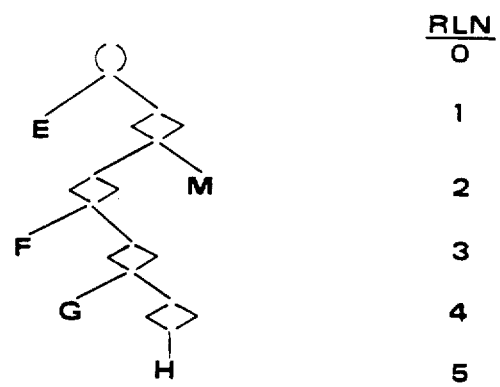
FIG. 58 is a schematic representation of a syntax tree.

FIG. 27 and FIG. 28 show an example of parsing for this RA:

(E<<F<G<H>>>M>).

assuming that D=2. The eight L cells shown are assumed to lie somewhere in the middle of a large machine. The full syntax tree for this text is shown in FIG. 58.

Figure 59:
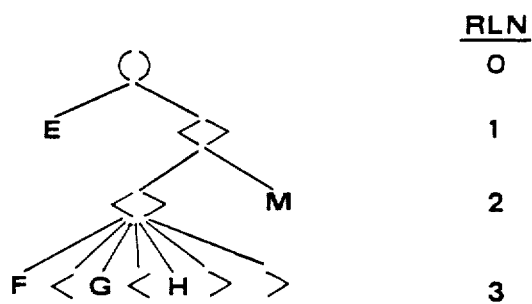
FIG. 59 is a schematic representation of a flattened syntax tree corresponding to the syntax tree of FIG. 58.

The flattened syntax tree, assuming D=2, is shown in FIG. 59.

FIG. 27 shows the embedding of nodes and channels in the machine cells. (The active IN nodes and I channels are not shown.) FIG. 28 shows the resulting TA and its SN-CP network structure, without the machine cells. Notice the lone IN node in cell #5. It sees no FFP text, so it receives no Mrln on the downsweep, and it sends up no CCC on the upsweep. It does nothing until the next cycle of storage management.

5.4.5 Characterization of the SN-CP Network

THe following properties of the SN-CP network are easy to verify:
1. A non-leaf SN has 2 or 3 sons. The left son is <-, the right son is ->, and the middle son (if there is one) is an SN, a CP, an FN, or an FC.
2. A CP has two sons, each of which is either an SN or a CP.
3. An FC has two sons, each of which is either an FN or an FC.
4. An FN, <-, or -> is always a leaf node.
5. Every SN sees a well-formed subexpression of an innermost application. This subexpression is either an atom or an entire FFP sequence. The SN lies in the lowest cell seeing that entire subexpression.
6. Corresponding to each sequence whose brackets are at level D or higher (i.e., for which RLN<=D) is exactly one SN that sees precisely that sequence.
7. A non-leaf SN node has a middle son if and only if the FFP sequence corresponding to the SN is a non-empty sequence. The middle son, if there is one, sees all the text between the '<' and '>' of the sequence, and nothing else.
8. An SN node has SN node syntactic sons if and only if the SN node corresponds to a non-empty sequence whose RLN is less than D. If an SN node syntactic sons, the sons see top-level subexpressions of the sequence seen by their syntactic father node.
9. An SN node has FN node syntactic sons if and only if the SN node corresponds to a non-empty sequence whose RLN equals D.
10. The subtrees associated with disjoint sequences whose brackets are visible (i.e., for which RLN<=D) are disjoint.
11. A TA has three sons. The left son is (-, the right son is -), and the middle son is a CP.
12. The CP middle son of a TA has two sons, each of which is an SN, since an RA must have exactly two top-level subexpressions: an operator and an operand.

5.4.6 Storing Syntactic Information in the Nodes

Each node of the SN-CP network has several parse registers of two kinds. The first kind of parse register holds information concerning the text seen by the node. The second kind of parse register holds information about the text seen by the syntactic father of the node. The first kind of information is available on the upsweep that builds the SN-CP network, and is discussed in the present section. The second kind of information is discussed in the next section.

There is one parse register that every node has: the nodetype register, which indicates the type of the node (SN, CP, etc.).

The other parse registers set on the upsweep that builds the SN-CP network are as follows:

| Node | Registers | | Description |
|------|-----------|---|-------------|
| <-   | 1. | Srln | The RLN of the corresponding '<' in the text. |
| ->   | 1. | Srln | The RLN of the corresponding '>' in the text. |
| FN   | 1. | texttype | Is the corresponding text an atom, left sequence brackets, or right sequence brackets? |
|      | 2. | DL, or S, or DR | The number of left sequence brackets. The atom. The number of right sequence brackets. |
| FC   | 1. | l#sons | The number of FNs in the left subtree. |
|      | 2. | r#sons | The number of FNs in the right subtree. |
|      | 3. | #sons | l#sons + r#sons. |
|      | 4. | l#sym | The number of FFP symbols in the left subtree. |
|      | 5. | r#sym | The number of FFP symbols in the right subtree. |
|      | 6. | #sym | l#sym + r#sym. |
| SN   | 1. | texttype | Is the corresponding text an atom or a sequence? |
|      | 2. | S | The atom, if this is a leaf node. |
|      | 3. | Srln | The RLN of the sequence or atom. |
|      | 4. | #sons | The number of syntactic sons of this node. |
|      | 5. | #sym | The number of FFP symbols seen by this node. |
| CP   | 1. | Srln | The RLN of the SNs at the highest FFP syntactic level under the CP. |
|      | 2. | l#sons | The number of SNs with RLN = Srln in the left subtree. |
|      | 3. | r#sons | The number of SNs with RLN = Srln in the right subtree. |
|      | 4. | #sons | l#sons + r#sons. |
|      | 5. | l#sym | The number of FFP symbols in the left subtree. |
|      | 6. | r#sym | The number of FFP symbols in the right subtree. |
|      | 7. | #sym | l#sym + r#sym. |
| TA   | 1. | #sons | The number of SN syntactic sons (must be 2). |
|      | 2. | #sym | The number of FFP symbols seen by the TA. |

It is easy to see how the leaf nodes compute these quantities. The non-leaf nodes compute and store their information when they are built, by looking at the numbers sent up to them on their downward channels. Here is what the channels carry (besides an indication of their channel type):

| Channel | Data | Description |
| --- | --- | --- |
| < | Srln | RLN of the <— it comes from. |
| > | Srln | RLN of the —> it comes from. |
| F | #sons | The number of FN nodes below this channel. |
| | #sym | The number of FFP symbols seen by the node from which this channel comes. |
| S | Srln | The Srln value of the node from which this channel comes. |
| | #sons | The number of SNs at the top syntactic level under this channel. (I.e., the number of SNs under this channel whose Srln register value equals the Srln value carried on this channel.) |
| | #sym | The number of FFP symbols seen by the node from which this channel comes. |

An FN node sends up a #sons value of 1 and a #sym value of either DL, 1, or DR, depending on whether the FN is in the left group of nodes, the middle group, or the right group. An SN leaf node sends up a #sons value of 1 and a #sym value of 1. An SN non-leaf node sends up #sons value of 1 and a #sym value that is 2 more than the #sym value it receives from its middle downward channel (so that it counts its two enclosing sequence brackets.)

It should be clear, then, how the nodes compute what they need to store.

5.4.7 Storing Information about the Syntactic Father

Many STL programs can be simplified if the SN and FN nodes know something about the text seen by their syntactic fathers. Four parse registers are provided in each SN and FN to hold such information:

| Register | Description |
| --- | --- |
| f#sons | The number of syntactic sons of the syntactic father of this node. |
| f#sym | The number of FFP symbols seen by the syntactic father of this node. |
| pos#sons | The ordinal position of this node among the syntactic sons of its syntactic father. |
| pos#sym | The ordinal position of the leftmost FFP symbol of this node among the FFP symbols seen by the syntactic father node. |

These registers could be set on a downsweep initiated by the TA as soon as the TA has been embedded. There is, however, a better way. The information needed for these four registers by each SN or FN becomes available in its syntactic father node as soon as that syntactic father node is embedded. Thus, the TA and each non-leaf SN node can, at its birth, initiate a "local downsweep" in its own subtree. Each of these local downsweeps carries four numbers down to the syntactic sons of the TA or SN node; some of the numbers are modified on their way down; the numbers are stored in the syntactic sons; and the local downsweep terminates. No upsweep (local or global) is needed to report the completion of the task; the TA can immediately proceed with its task of reducing the RA. As explained in the next chapter, it does so by "calling" upon its syntactic sons to find out what kind of expression is in the operator position of the RA. The information associated with this call can follow immediately behind the four numbers sent down in the TA's local downsweep. Thus, the extra time required to set these four parse registers is insignificant.

Figure 60:
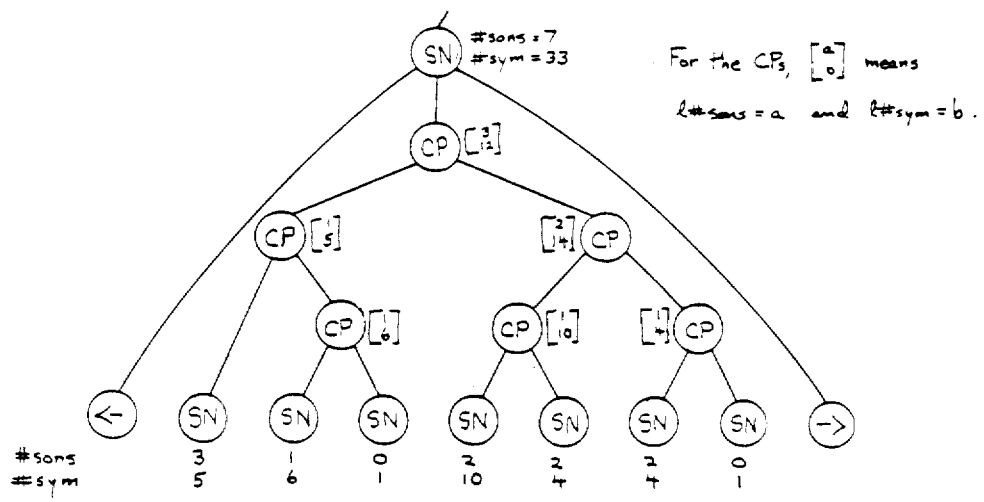
FIG. 60 is a diagram of an SN-CP network, illustrating the algorithm used to compute the values of certain parse registers.

Consider how the four registers are set in each local downsweep. There is either a TA or an SN at the top, initiating the local downsweep. At the bottom are either SNs or FNs. In between is a binary tree of either CPs or FCs. The algorithm is the same in every case; for simplicity, it is described here for a particlular case, diagramed in FIG. 60.

The SN at the top of the diagram sends down four numbers:

sons #sym 1 2.

Each CP receives four numbers and sends four numbers to each son. it refers to the four numbers it receives as f#sons ("father's number of sons"), f#sym ("father's number of symbols"), plsons ("position number of leftmost son"), and plsym ("position number of leftmost symbol"). It executes this algorithm:

Accept f#sons.
Send f#sons to left and to right.

Accept f#sym.
Send f#sym to left and to right.

Accept plsons.
Send plsons to left.
Send plsons+1#sons to right.

Accept plsym.
Send plsym to left.
Send plsym+1#sym to right.

Algorithm executed by CPs or FCs during the "local downsweep."

Thus f#sons and f#sym are simply distributed to all the syntactic sons, where they are stored in the f#sons and f#sym registers, respectively. The plsons value received by each CP, and eventually by each of the SNs at the bottom, is the ordinal position of the leftmost syntactic son in that subtree. Thus each node at the bottom stores plsons into the pos#sons register. The plsym value received by each CP, and eventually by each of the nodes at the bottom, is the ordinal position of the leftmost FFP symbol seen by that node. Thus each node at the bottom stores plsym into the pos#sym register. (The value of plsym sent down by the top SN is 2, since the leftmost symbol seen by the top SN—the '<'—is not seen by the SN sons.)

Figure 29:
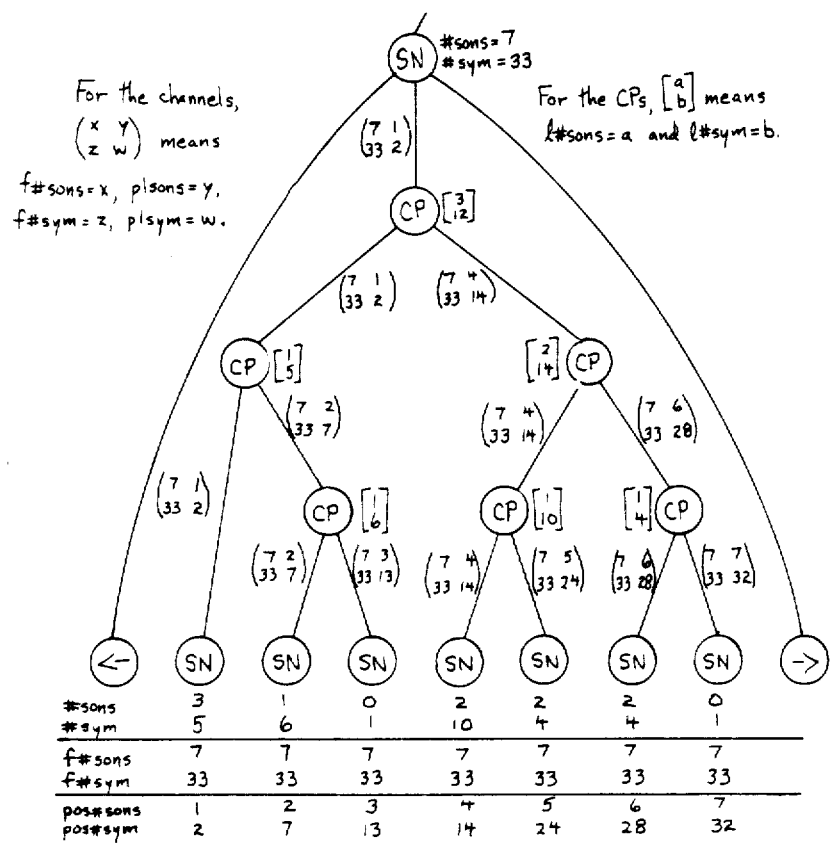
FIG. 29 is a schematic representation of an example of #sons, #sym, f#sons, f#sym, pos#sons, and pos#sym for an SN-CP network.

FIG. 29 shows, for the particular example above, the values sent down on each channel and stored in each of the syntactic sons.

5.5 Some Implications of the SN-CP Network

What is the maximum number of nodes and channels a machine cell has to embed during parsing?

The L Cell

During partitioning, exactly one IN node is embedded in each L cell. During parsing, that IN node is refined if and only if it lies inside an RA and sees some FFP text. If it is refined, the maximum number of nodes and channels embedded within it can be determined from Algorithm PARSE (Chart J) and the characterization of the initial embedding of interior nodes given in Section 5.4.2. It is not hard to see that the maximum number of each type of node and channel gets embedded when the initial embedding of interior nodes is this:

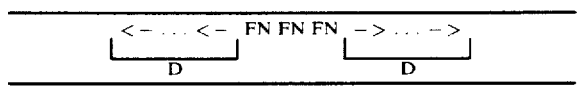

(Recall that D is the maximum parsing depth of the machine.) Applying Algorithm PARSE and counting the resulting nodes and channels yields these numbers:

| Entity | Maximum Number Embedded in an L cell |
|---|---|
| SN | D |
| FN | 3 |
| FC | 2 |
| <- | D |
| -> | D |
| Total (interior nodes) | 3D + 5 |
| S channel segment | D |
| F channel segment | 5 |
| < channel segment | D |
| > channel segment | D |
| Total (interior channels) | 3D + 5 |

As an example, consider a machine for which $D=2$. Then the worst-case initial embedding is

Figure 61:
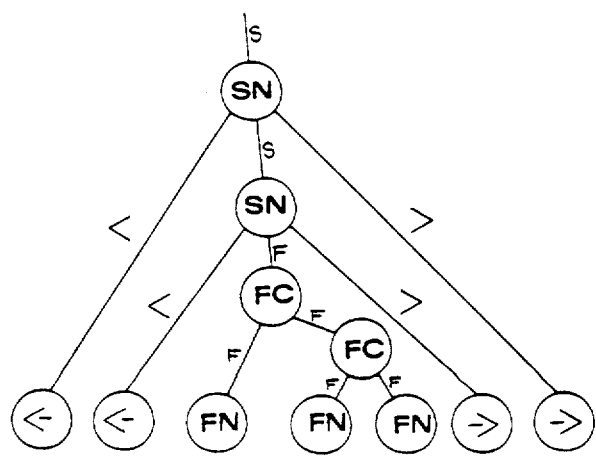
FIG. 61 is a schematic diagram of a worstcase embedding in an L cell.

<-<-FNFNFN->-> which, under Algorithm PARSE, yields the embedding in the L cell shown in FIG. 61.

The T Cell

Figure 62:
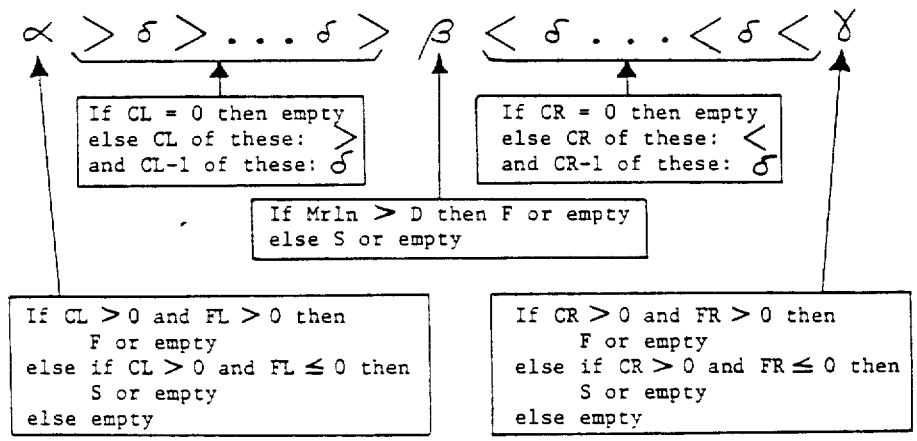
FIG. 62 is a schematic representation of a CCC (current channel configuration).

Recall that each IN node computes a value for LB and for RB during the partitioning upsweep and each active IN node receives a value for Mrln during the next downsweep. LB and RB are the number of unmatched sequence brackets on the left and right boundaries, respectively, of the text seen by the IN node. Mrln is the RLN of the highest-level text seen by the IN node. The CCC sent up by the IN node can be characterized in terms of LB, RB, and Mrln, as follows:
Let
$A = \text{Max}(D+1, \text{Mrln}) - \text{Mrln}$
$CL = \text{Min}(A, LB)$
$FL = \text{Mrln} + Cl - D$
$CR = \text{Min}(A, RB)$
$FR = \text{Mrln} + CR - D$ Then the CCC is of the form shown in FIG. 62.
This characterization holds for an active IN node whether it is in an L cell or a T cell. Since $\text{Mrln} >= 1$, $A <= D$ and thus $Cl <= D$ and $CR <= D$. Hence the CCC sent up by an IN node has no more than D channels of type < and no more than D channels of type >. Notice that if the RA is syntactically well-formed—which is assumed—then an I channel immediately to the right of a channel of type (must have $Cl = 0$. Similarly, an I channel immediately to the left of a channel of type) must have $CR = 0$.

Since at most one IN node is embedded in any cell during partitioning, no T cell during parsing has to combine more than one pair of initial CCs—i.e., one CCC from each son of the IN node. It is possible, however, for there to be as many as two other I channels passing through the T cell, along the edges of the text seen by the cell. These can cause some interior channels but no interior nodes to be embedded.

Figure 63:
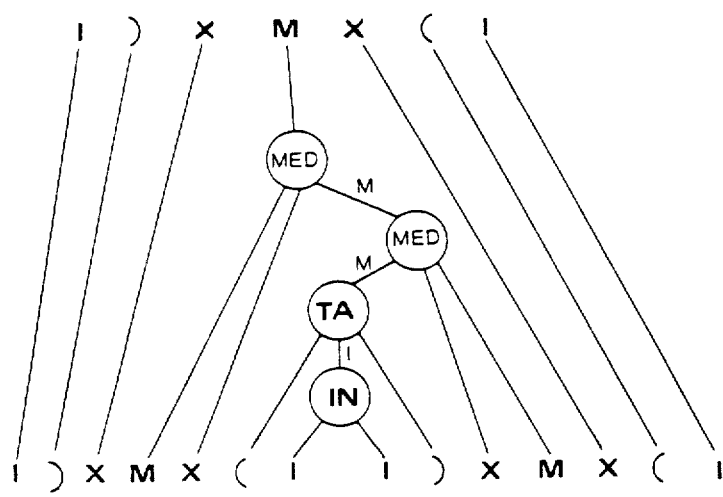
FIG. 63 is a schematic representation of the configuration yielding the embedding in a T cell of the largest posssible number of nodes and channels of each kind.

A careful consideration of FIG. 12 and the above facts reveals that the largest number of each kind of node and each kind of channel is embedded by a T cell when the partitioning process produces the configuration shown in FIG. 63
and the CCs sent up by the four I channels are, from left to right:

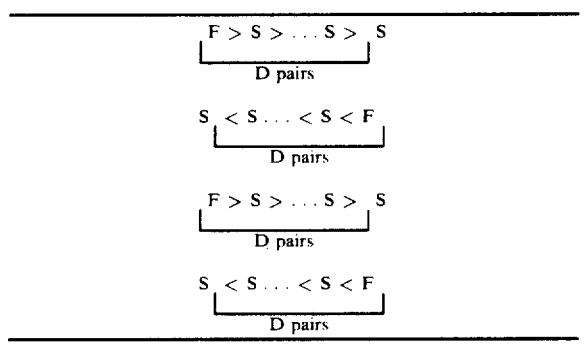

Applying Algorithm PARSE and counting the resulting nodes and channels gives these numbers:

| Entity | Maximum Number Embedded in a T cell |
|---|---|
| SN | D |
| CP | 2D |
| FC | 1 |
| Total (interior nodes) | 3D + 1 |
| S channel segment | 7D |
| F channel segment | 5 |
| < channel segment | 2D |
| > channel segment | 2D |
| Total (interior channels) | 11D + 5 |

Figure 64:
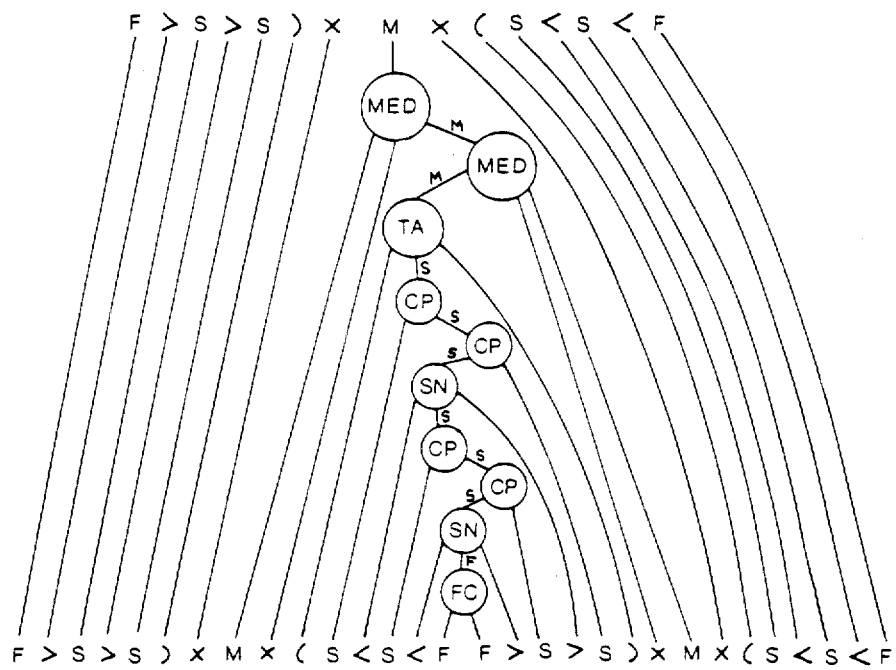
FIG. 64 is a schematic representation, when D=2, of the maximum number of nodes and channels that ever have to be embedded in a T cell.

As an example, consider a machine for which $D=2$. The worst-case situation—both for the number of nodes and for the number of channels—is shown in FIG. 64.

The results of this section and those of Section 3.8 imply that, as a result of partitioning and parsing:
1. An endmost L cell of the machine may have to embed as many as $3D+12$ nodes and $3D+12$ channel segments.
2. Any other L cell may have to embed as many as $3D+8$ nodes and $3D+8$ channel segments.
3. A T cell may have to embed as many as $3D+5$ nodes and as many as $11D+23$ channel segments.

6. The Syntax Tree Language (STL)

6.1 Three Language Levels: FFP, STL, and MCL

The present chapter briefly describes the Syntax Tree Language or STL. It is so called because the execution of the STL is best thought of as being performed by the nodes of the SN-CP network rather than by the T cells and L cells. For a more detailed explanation of the STL, see Tolle's dissertation, previously referenced.

It is convenient for our purposes to identify three language levels in Machine II. At the highest level is the FFP language; below that is the STL; and at the lowest level is the Machine Cell Language, or MCL.

Recall that an FFP operator can be defined or primitive: an FFP-defined operator is an operator whose definition is an FFP (constant) expression; an FFP-primitive operator is one whose effect is specified in terms of a lower-level language, namely the STL. In other words, an operator that is FFP-primitive is, perforce, STL-defined. In like manner, an STL-primitive operator is an MCL-defined operator. An MCL-primitive operator is one whose effect is specified at a still lower level—perhaps directly in the hardware, perhaps in microcode, perhaps in some other low-level language that we shall not specify.

The STL and the MCL together play the role in Machine II that the microprogramming language does in Machine I: expressing the actions to be taken by the machine to execute each FFP-primitive operator. The intention is that the MCL should be at about the level of a conventional machine language. The STL is at a higher level than that, bridging the gap between the MCL and the FFP. The STL generally works on entire FFP expressions, it is executed by nodes interconnected in a way closely resembling FFP syntax trees (hence the name STL), and yet it concerns itself with issues outside the realm of FFPs: data movement, storage management, limited parsing depth, and coordination of computation below the level of the RAs.

Nothing more is said here about the MCL and about the MCL-defined (STL-primitive) operators, since it will be clear that they can be implemented with no particular difficulty. The focus here is on the STL.

The STL is just one of many possible languages for the machine. The aim here is not to find the most powerful or most elegant possible language, but to present one that is fairly simple, reasonably easy to describe, and yet powerful enough to be interesting and indicative of the potential of the machine.

6.2 Libraries of Operator Definitions

At the FFP level, the task of programming consists in composing FFP operators to get new FFP operators. Two system libraries will be available for this purpose: FDEF, a library of FFP-defined operators; and SDEF, a library of STL-defined operators. Each of these consists of a set of operator names (FFP atoms) and their corresponding definitions (i.e., programs).

FDEF may be very large, and must, therefore, reside outside the machine. SDEF, though, can be relatively small—it might contain the STL programs defining a few dozen or a few score powerful, generally useful operators—and thus it is proposed here that a copy of SDEF reside in every cell of the machine. This approach has the advantage of eliminating
1. The need for an RA to send a request out for instructions on how to execute an FFP-primitive operator.
2. The need to wait for those instructions to be brought into the machine.
3. The need to wait for those instructions to be distributed to the components of the RA.

This approach has the disadvantage of restricting the permissible size of the SDEF library, so that it can be stored in a single cell. As the technology advances, this restriction should become progressively less important. If it does turn out to be too severe a restriction, though, there are options—compromises—available to make it less so:
1. Part of the SDEF library could reside in the cells and part reside outside the machine, to be brought in on demand.
2. There could be a number of special-purpose SDEF libraries, each containing powerful operators crafted to fit a particular class of computational tasks. The entire machine could, in effect, be converted to a special-purpose processor simply by loading the cells with the appropriate SDEF library.
3. Individual FFP user programs, being executed in different subtrees of the machine, might be able to request that particular SDEF sub-libraries be stored in their subtrees, in a more or less dynamic way.

6.3 The STL and the Microprogramming Language of Machine I

There are significant differences beween the STL and the microprogramming language of Machine I:
1. The STL is a higher-level language than the microprogramming language of Machine I; its ability to compose functions and to combine data is more sophisticated. (On the other hand, the STL is not at the high level of the FFP language. The STL has to deal with the apparently inescapably messy details of storage requests, limited parsing depth, and so on.
2. Execution of the STL is accomplished by the nodes of the SN-CP network, with control passing from the top nodes downward, under some simple conventions yielding a natural, hierarchical decomposition of the computation, and the capacity for sophisticated combining operations. In Machine I, by contrast, the microprogram instructions are executed primarily by the L cells, the T cells being used only for communication and simple combining operations.
3. STL-defined operators can be defined in terms of each other—even recursively—as well as in terms of MCL operators. The microprograms of Machine I, on the other hand, cannot be defined in terms of each other, but only in terms of the rather simple "built-in" operations of the language.
4. In Machine I, entire microprograms are distributed through the tree to the L cells, where they are executed. In Machine II, only the name of an STL program (possibly together with a few parameters) is passed between nodes.
5. In Machine I, the distribution of microprogram instructions takes place only once per RA, before execution begins, while in Machine II the distribution of operator names is an integral part of the execution, and may take place repeatedly and concurrently with other activities going on elsewhere in the RA's area.
6. In Machine I, the amount of storage to be requested by an RA is computed by fixed "internal mechanisms" of the machine, which are rather inflexible in their computational abilities and in the times at which they can be invoked. In Machine II, this kind of calculation is done by an STL program rather than by a built-in mechanism, and can thus be as flexible as any STL computation. Furthermore, storage management for intermediate results is more often avoidable on Machine II than on Machine I. In Machine II, intermediate results often can simply be streamed back up into the tree for further computation, as part of the same FFP-primitive operation, rather than having to be stored in the L array so that a later RA can act on them. This is an important advantage, since storage management is a time-consuming (as well as space-consuming) operation on both machines.
7. Microprogram execution on Machine I has to be done in lock-step with the globally-sweeping state changes of the machine. STL execution is relatively free-running; there is, for instance, no restriction on the number of up-down sweeps in executing an RA.

6.4 Overview of the STL Execution Scheme

The only thing an SN or FN node is allowed to do is wait to be called on by its syntactic father SN (or TA) and then—when called—execute the STL operator that the father called with. In order to do so, the node may have to call on its own syntactic sons, perhaps repeatedly, or it may have to do nothing more than return an empty sequence to the father. Exactly what happens depends upon
1. The STL operator to be executed.
2. The values of a few parameters associated with the operator.
3. The subtree of the SN-CP network seen by the node.
4. The data sent to the node by its syntactic father.
5. The values of a few registers in the node, which may have been set by previous calls from the syntactic father.

Each STL operator name is an FFP atom. The SDEF library in every cell of the machine consists of these operator names together with the corresponding STL programs defining the operators. The STL definition of an operator may refer to a few formal parameters of the operator. When the operator is invoked, the calling operator supplies actual parameter values, to be substituted in place of the formal parameters.

When an SN or FN node is called by its syntactic father node, it receives an operator packet and a data packet. The operator packet is an FFP sequence of the form $<\%Opname\% ap1 \ldots apn>$, where "Opname%" is the FFP atom that is the name of the operator to be executed, and where ap 1, . . . , apn are the actual parameter values to be substituted in place of the formal parameters in the STL definition of the operator. The number of parameters, n, is greater than or equal to zero; its value depends on the definition of the operator. Each parameter is an FFP expression. The operator packet is sent to the called-upon node and is stored there in its entirety before that node starts executing the operator. Thus it is necessary that the entire operator packet be fairly short.

The data packet, on the other hand, is not restricted in length or in nesting depth. It must be a single FFP expression. It arrives at the called-upon node a symbol at a time. Since the node has limited storage capacity, and since the data packet can be arbitrarily long, the node cannot, in general, store the whole data packet at once.

In each node of the SN-CP network, there is a Node Monitor process that watches the upward channel of the node, waiting for a call to come down. When a call comes down to an SN or FN node, the Node Monitor creates a new process, gives it the operator packet to execute, and connects it to a new pair of subchannels (of the upward channel) called s-queues. Then the Node Monitor waits for another call to come down. The newly-created process looks up the STL program associated with the operator name and performs the indicated operations. The operator must, by convention, read the entire data packet, which flows down on one of the s-queues. The operator may call on the syntactic sons of the node in which it is executing. The operator must, by convention, eventually send a single data packet (i.e., FFP expression) toward the syntactic father, along the other s-queue.

In order to simplify the kinds of communications that can take place, we make the convention that whenever a node A calls on one syntactic son, node A must call on all of its syntactic sons. There is an STL-primitive operator for doing so: CALL_SONS. There is no other means in the STL for a node to communicate with its syntactic sons.

Execution of the CALL_SONS operator by node A causes information to be sent from node A down through the binary tree of CPs (or FCs) to the SN (or FN) sons of node A. The CPs (or FCs) route portions of the information to the appropriate subtrees, so that each syntactics on node gets called with the intended operator and data. Different sons may get different operators and data. The distribution of all this information is done by each CP (or FC) according to instruction contained in "distribution" operator packets, which are part of the information the CP (or FC) receives as a result of the execution of the CALL_SONS. Each CP (or FC) also receives and stores a "combining" operator packet. When all the syntactic sons send an FFP expression up toward the syntactic father—as they must in response to each call—each CP (or FC) uses the combining operator to combine the FFP expression from its left subtree together with the FFP expression from its right subtree, producing a single FFP expression that it sends on toward the syntactic father node. Thus the syntactic father receives a single FFP expression in response to each CALL_SONS that it executes.

No other communication between a node and its syntactic sons is allowed.

Figure 65:
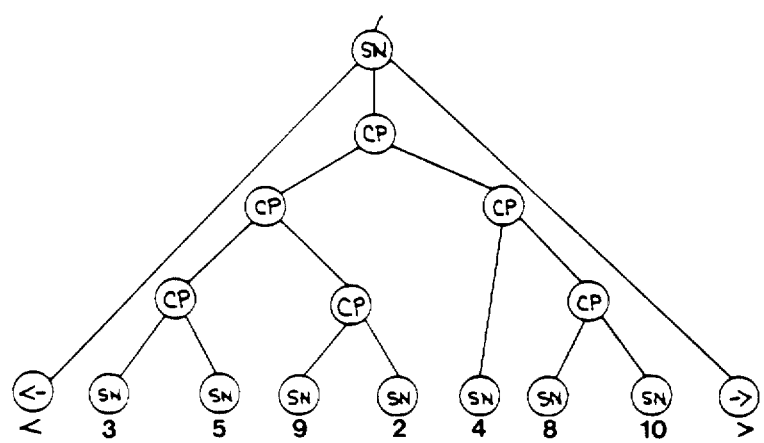
FIG. 65 is a schematic representation of an SN-CP network, showing elements of a sequence to be added together.

As an example, consider the subtree of an RA's SN-CP network shown in FIG. 65.

Suppose the elements of the sequence are to be added together. Then the topmost SN node shown here might be called on by its syntactic father node (a TA or an SN) with the operator packet $<RED+>$ and the data packet $<\ >$. (In this example, the data packet $<\ >$ is not really needed, except to satisfy the STL convention that there must always be a data packet accompanying the calling operator.) RED is an STL-defined operator that expects one atomic parameter and an empty FFP expression. The effect of RED is to read the $<\ >$, discard it, and then to "reduce" the sequence under the node with the operator named by the parameter (in this case, +). RED accomplishes the reduction by executing CALL_SONS with the appropriate parameters to cause all the syntactic sons of the node to receive the operator WRAPR ("wrap and return") and all the CP nodes to receive the combining operator packet $<EE+>$.

Thus each of the leaf SN nodes receives the operator packet $<WRAPR>$ and the data packet $<\ >$. WRAPR is an STL-defined operator that discards its input expression (the $<\ >$) and returns to the syntactic father the data stored at (or below) the node, surrounding that data by one extra pair of sequence brackets. In the case of a leaf SN node, the effect of WRAPR is to return $<\%Atom\%\ >$, where %Atom% is the FFP symbol stored in the node.

Figure 66:
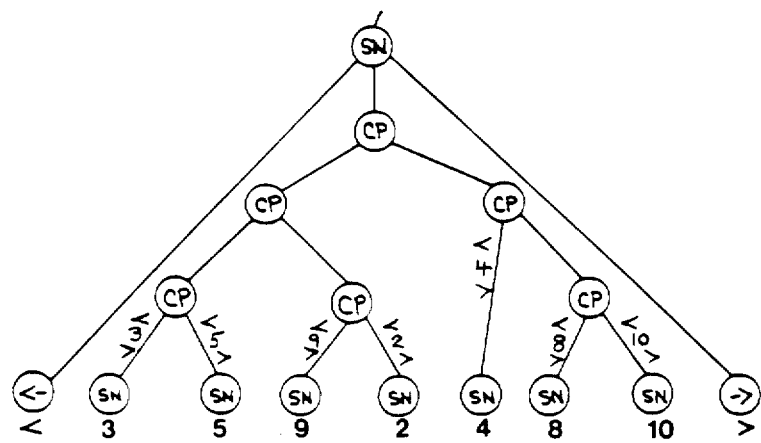
FIG. 66 is a schematic representation of the SN-CP network of FIG. 65, together with an indication of the symbols sent up by the leaf SN nodes when they have executed WRAPR.

Thus the leftmost leaf SN node sends up the sequence $<3>$ (one symbol at a time), the next one sends up the sequence $<5>$, and so on. FIG. 66 shows what is sent up by the leaf SN nodes when they have executed WRAPR.

Figure 67:
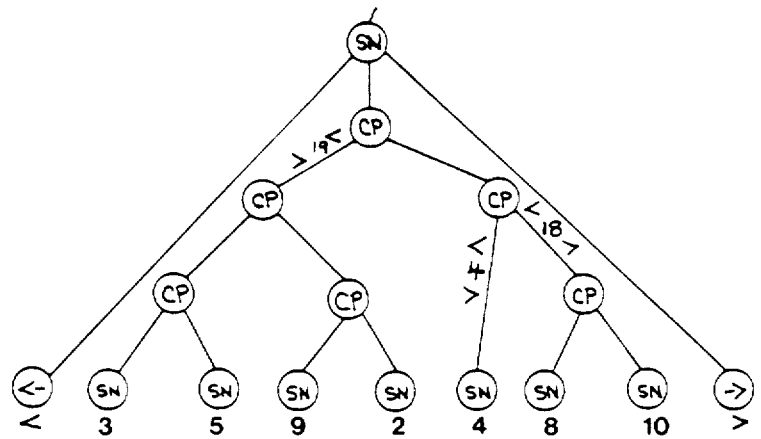
FIG. 67 is a schematic representation of the SN-CP network shown in FIGS. 65 and 66, at a later stage of execution.

As the expressions come up to the CP nodes, the CPs use the combining operator packet $<EE+>$ to combine them. EE ("element by element") applies its parameter (the +) to each pair of corresponding elements of its two input sequences. In the present case, each input sequence has but a single element. Thus, a little later in the execution, the situation might look like that shown in FIG. 67.

Eventually, the single expression <41> arrives at the top SN of the diagram and is then sent on up to the syntactic father node, the subtree again becoming dormant.

All activity taking place in a node in response to a call from its syntactic father must cease when the son sends the last of the FFP expression toward the father. It is possible, however, for two or more calls from a node to a syntactic son node to be active at one time, in a very simple and restricted manner. In such a case, the syntactic son node has a separate simultaneous process going on in response to each call, and the completion of one of them has no direct effect on any of the others.

As we have said, an SN (or FN) node can do nothing except wait for and respond to calls from its syntactic father. A CP or FC can do nothing except distribute those calls and combine together the resulting FFP expressions. The role of the TA is to initiate and coordinate the reduction of the RA, and to communicate (when polled—see Chapter 4) with the MED node above it. The syntactic bracket nodes (the <- and -> and (- and -) ) ordinarily play only a minor role in the computational process.

As soon as the SN-CP network has been built, the TA executes an STL operator, REDUCE, which causes the FFP expression in the operator position of the RA to be "looked at" by the TA. In the simplest case, the RA's operator is a single FFP atom that happens to be an STL-defined operator. In this case, the TA, upon receiving that atom (as it will, via the actions of REDUCE), executes it. The TA's execution of that operator differs from an SN's execution of an operator only in that the TA has no syntactic father node to which to return an expression and from which to read an expression.

Each node knows that when all the calls it has made on its syntactic sons have been answered, then its subtree is quiescent—no data is being moved, no computation is taking place. In particular, the TA can know when the entire SN-CP network of the RA is quiescent. This fact is crucial to the TA's ability to know what response to give to the polling signal discussed in the previous chapter, since storage management cannot be performed in a region that has data moving through the tree.

6.5 Storage and Transmission of Data in the SN-CP Network

6.5.1 Registers

A register is a storage location capable of holding a single FFP atom or bracket. STL programs make use of three kinds of registers: parse registers, temporary registers, and persistent registers.

The parse registers were introduced in the previous chapter. (See 5.4.6 and 5.4.7.) Their values are set when the SN-CP network is built, and may be read from but not written to by an STL program. Among these registers are nodetype, texttype, S, #sons, #sym, f#sons, pos#sons, and Srln.

Each invocation of an STL-defined operator in a node may be associated with several temporary registers, used for private "scratch work." These are denoted by t1, t2, and so on. Temporary registers, in other words, act as local variables in the STL definition of the operator. No operator can access the temporary registers of another operator. When an operator finishes executing, its temporary registers are released. We assume there is some small limit to the number of these that any single operator can have; six will suffice for the operators introduced here.

The persistent registers of a node, by contrast, are global to the node: any operator executing in the node may read from or write to the persistent registers; all operators executing in the same node share the same persistent registers. The STL programmer has to ensure that no conflict arises in their use.

The persistent registers are denoted by nodename, dummy_node, p1, p2, . . . , p6.

Sometimes during execution of an RA, storage management is performed for the RA. Storage management, of course, moves the RA's text, thus requiring that the RA's SN-CP network be re-built. The persistent registers have to survive this process. One simple way to ensure their survival is to store them, just prior to storage management, with the leftmost FFP symbol seen by the node (for instance, with the '<' in the case of a sequence). Then the persistent register values can travel with that symbol during storage management, and can be restored to the node when the SN-CP network is re-built. (Persistent registers associated with CP and FC nodes do not persist through storage management.) All this is done automatically by the storage management mechanism. (Notice that even though the number of '<' brackts stored in an L cell may be very large, the number of '<' brackets that are at or above level D in an L cell can be no more than D. Thus, the amount of persistent register information required to be held in any L cell is bounded.)

6.5.2 Streams and s-queues

An invocation of an operator may be associated with one or more input and output streams of data. A stream is a sequence of FFP symbols (atoms and brackets), produced by one operator and consumed by another. A stream is carried on a channel that we refer to as a stream-queue or an s-queue.

An operator is connected to an s-queue at a port, which is one end of an s-queue. A port can be thought of as a special kind of register. Every s-queue has two ports, the front port and the rear port. The rear port is an output port, or %Outport%, of the producer operator of the s-queue; FFP symbols are inserted, one at a time, at the rear port of the s-queue by the producer operator. The front port is an input port, or %Inport%, of the consumer operator of the s-queue; FFP symbols are removed, one at a time, from the front port of the s-queue by the consumer operator. A stream is accessible only one symbol at a time. In order to use more than one symbol of a stream at a time, an operator must use its temporary registers to store successive symbols of the stream.

An s-queue may lie entirely within a single node of the SN-CP network, or it may have one end in one node and the other end in another node. In the latter case, one of the nodes is the father of the other (not necessarily the syntactic father), and the two nodes are thus connected by a single channel of the SN-CP network; that channel carries all the s-queues that go between the two nodes. Notice that an s-queue may pass through several cells of the machine.

The semantics of the STL guarantee that there is never any contention for access to an s-queue, either for input or for output, by guaranteeing that only one sequential process is connected to a given port. An s-queue has a bounded capacity. Below the STL level there are mechanisms that ensure that any attempt to put a symbol into an s-queue is blocked until there is room in that s-queue to hold a symbol, and that any attempt to read or remove a symbol from an s-queue is blocked until there is a symbol available. Such blocking is invisible at the STL level.

Although the number of physical connections between a father cell and a son cell is necessarily limited, that narrow physical channel must act as if it were several logical channels (i.e., channels of the TA-Mediator network and the SN-CP network), each carrying several s-queues. Techniques for such multiplexing have been worked out in detail in other contexts. One approach is to associate sequential processes with the ends of the physical channels, to control access to the channels. Any process that wants to communicate with another process on the other side of the channel must first have a logical channel established across the physical channel. A logical channel is created by the physical channel process upon request; this involves creating a process for the logical channel, at each end of the physical channel, and "connecting" these logical channel processes to the requesting process(es). In Machine II, the logical channels are precisely the channels of the TA-Mediator network and the SN-CP network. The logical channels are created as the TA-Mediator network and the SN-CP network are built. The creation of an s-queue is done similarly: a logical channel process creates, upon request, processes to correspond to each end of the s-queue. The request, though, is generated by execution of an STL operator, rather than by execution of the partitioning or parsing process. (The logical channels and s-queues that lie entirely within a single machine cell might be handled somewhat differently from those that cross machine cell boundaries.) The s-queues, like the channels of the TA-Mediator network and the SN-CP network, are created and accessed in very restricted ways. Thus the associated processes can be expected to be considerably simpler than those required in more general intercommunication networks.

There are only two ways in which an s-queue can be created: execution of CALL__SONS or execution of a pipe operator. These are discussed separately.

6.5.2.1 Creation of s-queues by CALL__SONS

An execution of CALL__SONS creates two entire trees of s-queues spread across a subtree of the SN-CP network. One tree of s-queues carries data downward to the sons and the other carries data upward to the node that executes the CALL__SONS. As has been stated previously, execution of CALL__SONS causes very syntactic son of the node executing CALL__SONS to receive an operator packet and a data packet. It also causes all the CPs (or FCs) between the node and its syntactic sons to receive operator packets for distributing data downward and for combining data upward. Each operator packet is received and stored in its entirety. Then the operator definition is looked up and executed. Each operator packet in effect acts as a processor within a node, connected to other operator packets by s-queues.

Figure 30:
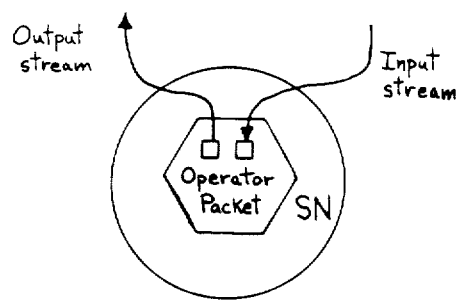
FIG. 30 is a schematic representation of an SN node that has just been called by its syntactic father node.

FIG. 30 shows schematically an SN that has just been called by its syntactic father node (via execution of CALL__SONS). The circle represents the SN Node. The hexagon represents the operator packet—i.e., the operator name and its actual parameter values—received from the father node. The squares represent the input port and the output port for the operator. The arrows represent s-queues carrying streams that flow in the direction of the arrows.

The operator's duty is to read a single FFP expression (the data packet) from the input s-queue and to send a single FFP expression to the output s-queue. The other ends of these s-queues lie in the father node of this node (not necessarily in the syntactic father node).

Figure 31:
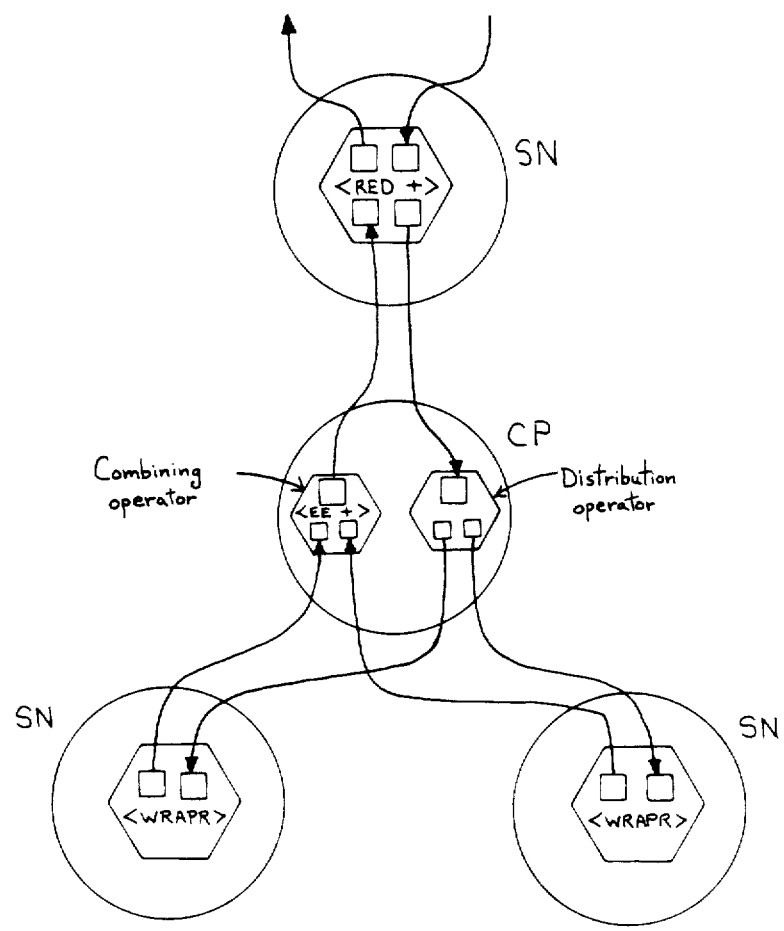
FIG. 31 is a schematic representation of the s-queues set up by an execution of CALL—SONS.

FIG. 31 shows another example. The operator packet in the top SN is <RED+>, as in the summation example a few pages back. The operator RED executes CALL__SONS with the appropriate parameters to cause every syntactic son to receive <WRAPR> and every CP to receive the combining operator packet <EE+>. The figure shows the s-queues set up by that execution of CALL__SONS.

6.5.2.2 Creation of s-queues by pipe operators

The only other way in which an s-queue can be created is via a pipe operator, which sets up a pipeline of operators in a single node of the SN-CP network. Consider, for instance, the problem of n × n matrix multiplication. Assume there is an STL-defined operator MM, "matrix multiply," which takes two parameters that specify the elementary operations to be used. For ordinary matrix multiplication, the parameters are the addition (+) and multiplication (×) operators. Here is an FFP program for the multiplication of two matrices:

$$(<MM+x> <matrix1\ matrix2>)$$

where each of the matrices is represented as a sequence of rows. As a 2×2 example, we might have:

$$(<MM+x> <<<3\ 8><4\ 9>><<6\ 2><1\ 5>>>)$$

representing the matrix product $$\begin{pmatrix} 3 & 8 \\ 4 & 9 \end{pmatrix} \begin{pmatrix} 6 & 2 \\ 1 & 5 \end{pmatrix}.$$

Figure 32:
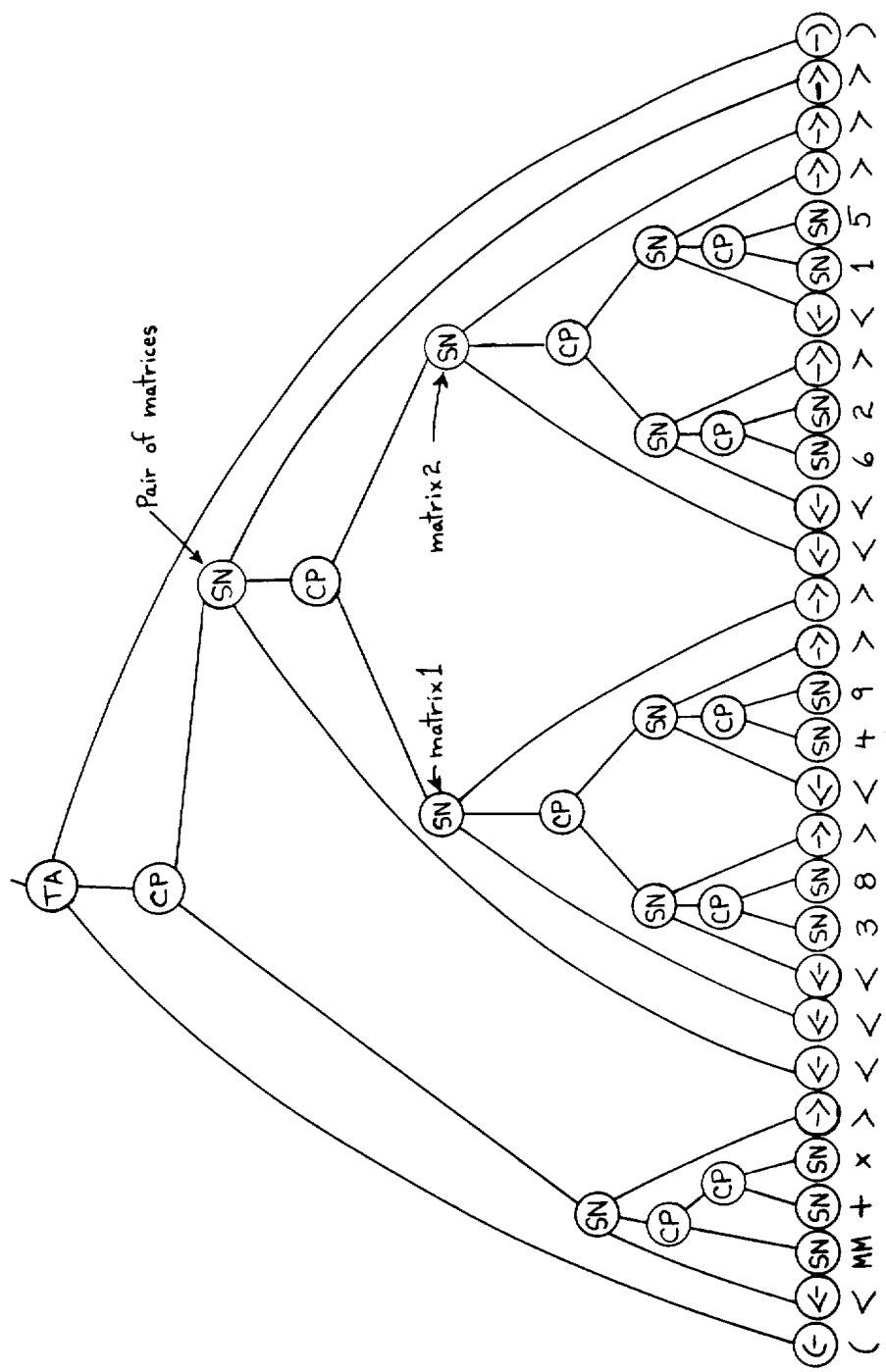
FIG. 32 is a schematic representation of an example of an SN-CP network for an RA that expresses a matrix multiplication.
Figure 33:
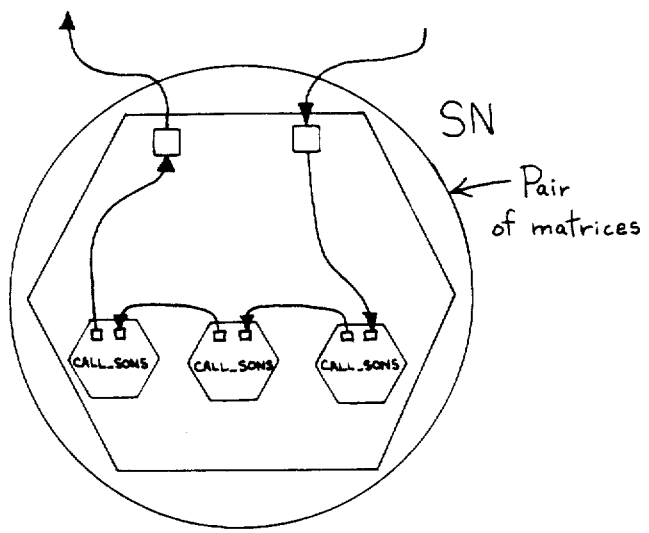
FIG. 33 is a schematic representation of a pipeline of operators set up in one SN node during execution of the RA shown in FIG. 32.

FIG. 32 shows the SN-CP network. The SN labelled "Pair of matrices" in the figures would be called on by the TA, which would tell it, in effect, "cause your two matrix sons to be multiplied together." One way it might do so is to set up a pipeline of three CALL__SONS operators, as FIG. 33 illustrates.

Figure 34:
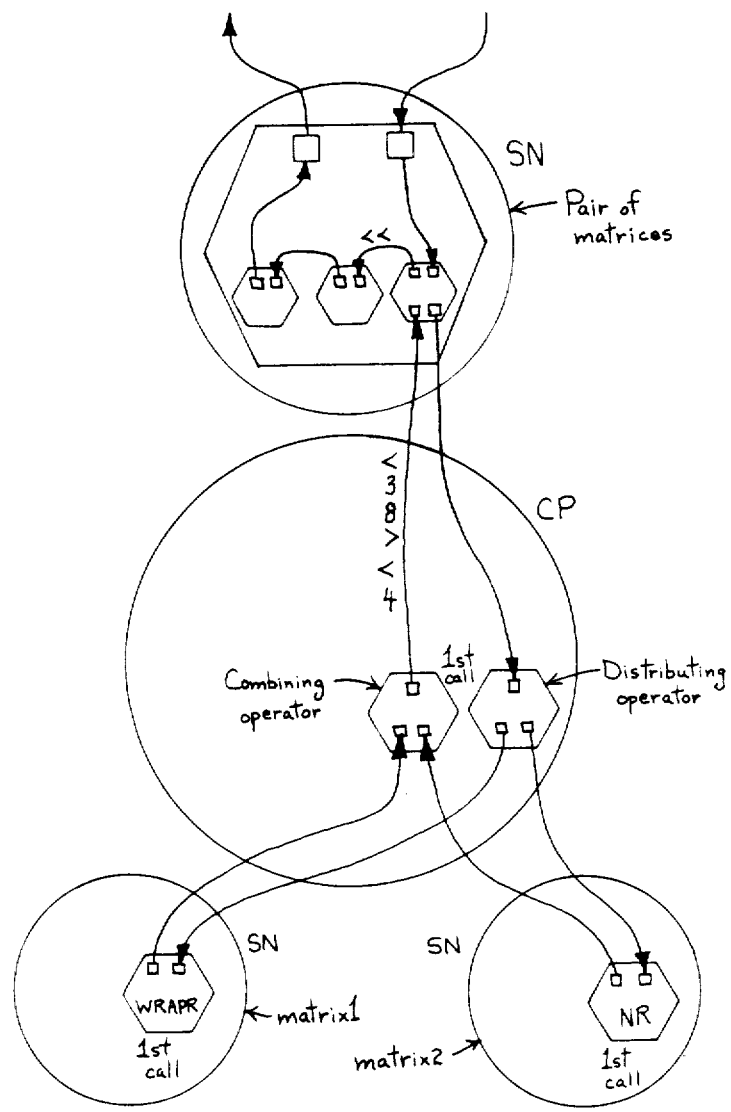
FIG. 34 is a schematic representation of some of the s-queues in the SN-CP network of FIG. 32, at some point in time after execution of the first CALL—SONS.

The first instance of CALL__SONS (the rightmost in the figure) would send the operator WRAPR to matrix1 and the operator NR to matrix2. WRAPR, as previously explained, is an STL-defined operator that returns the FFP text stored at or below the node, wrapped in an extra pair of sequence brackets. Thus <<<3 8><4 9>>> is returned by matrix1 in response to this call. NR ("null return") causes the null sequence, < >, to be returned. The CP, using the combining operator CAT ("catenate"), in effect discards the < >, so that <<<3 8><4 9>>>to is piped into the second CALL__SONS (the one in the middle). FIG. 34 shows the s-queues that are set up by the first CALL__SONS and also shows a "snapshot" of the data that might be flowing along these s-queues at some instant prior to the beginning of execution of the second CALL_SONS.

Figure 35:
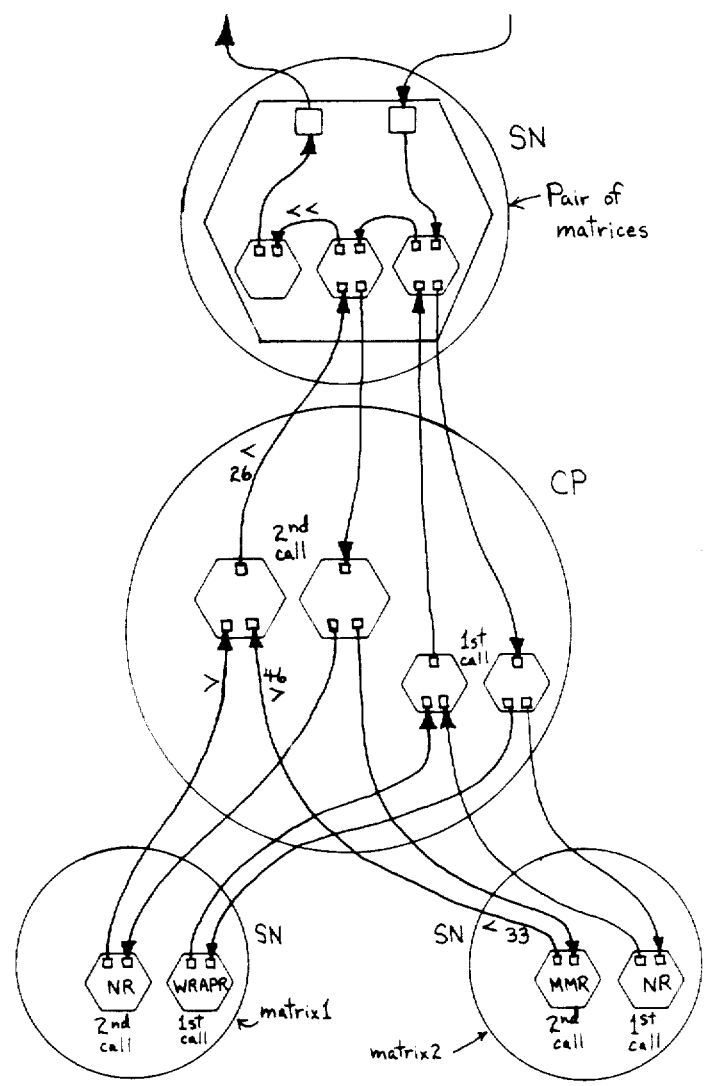
FIG. 35 is a schematic representation of some of the s-queues in the SN-CP network of FIG. 32, at some point in time prior to the execution of the third CALL—SONS.

The second CALL_SONS distributes its input data as a data packet to matrix2, along with the operator MMR, "matrix multiply and return." MMR is an STL-defined operator that multiplies two n×n matrices, one of which flows into the node as a data packet, the other of which is stored below the node. (MMR and a number of other operators are defined in Tolle's dissertation, previously referenced.) MMR sends the product matrix back up toward the caller. Meanwhile, the second call on matrix1 gives it the operator NR to execute, producing < >. The CP in effect discards < >, so the result of the second call is that the product matrix, < < <26 46> <33 53> > >, is passed to the third CALL_SONS. FIG. 35 shows the s-queues and a snapshot of the data that might be flowing just before the third CALL_SONS starts executing.

Figure 36:
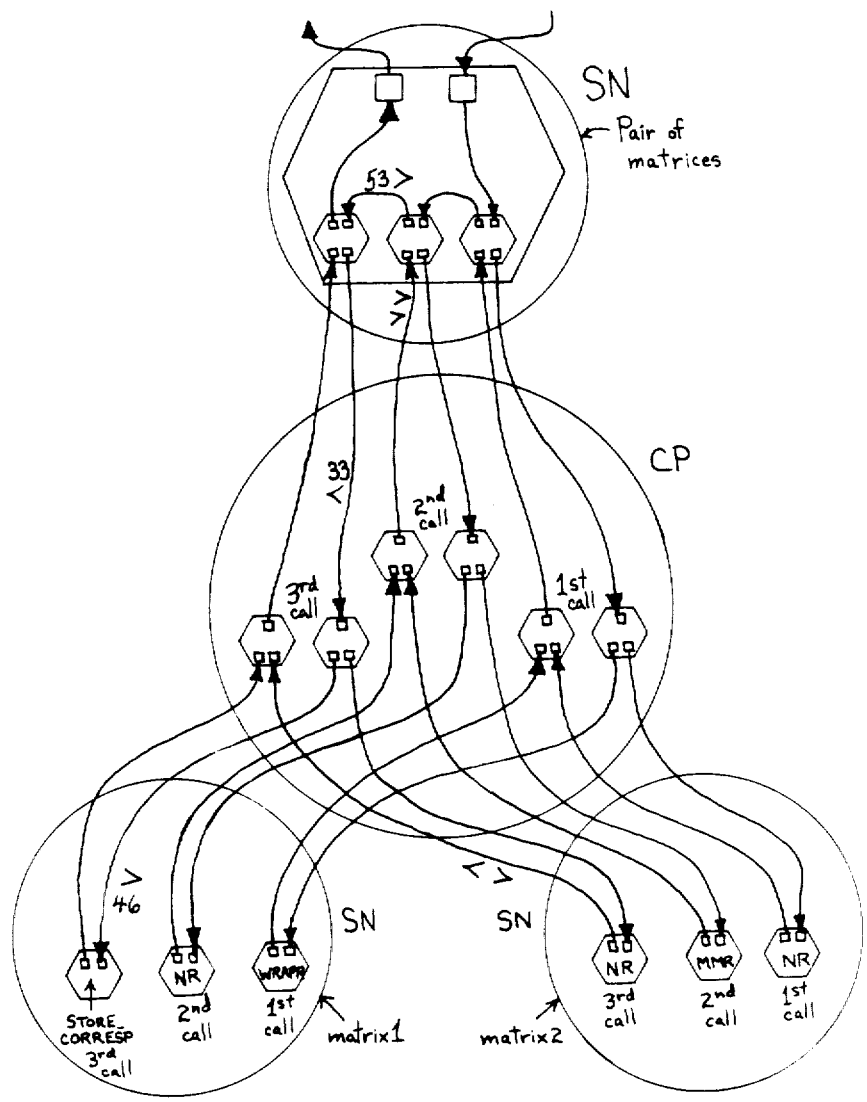
FIG. 36 is a schematic representation of some of the s-queues in the SN-CP network of FIG. 32 at some point in time after execution of the third CALL—SONS.

The third call sends the product matrix down to matrix1 (as a data packet), together with the operator STORE_CORRESP, which causes the product matrix to be stored in place of matrix1. The third call, meanwhile, sends NR to matrix2. Both STORE_CORRESP and NR return < >, which eventually makes its way up to the TA, and the computation is terminated. FIG. 36 shows the s-queues and a snapshot of the data that might be flowing along them at some instant after the third CALL_SONS has started executing.

Notice that some of the operators in the son SNs (specifically, WRAPR, MMR, and STORE_CORRESP) cause computations to be initiated in still lower-level nodes of the network. (In particular, the arithmetic computations are done at the lower levels.) These are all discussed in some detail in Tolle's dissertation, previously referenced.

If the matrices are large, then all three calls have to be active simultaneously. It is possible at some point in time, for instance, that the first row of the product matrix is flowing down to matrix1, while the second row of the product matrix is flowing up to the top SN, while the third row of matrix1 if flowing down to matrix2, while the fourth row of matrix1 if flowing up to the top SN. For that reason, FIG. 36 shows the entire network of s-queues and operators. The intention, though, is that each operator and s-queue should disappear as soon as it has served its purpose, thereby releasing whatever resources of the cell it has been tying up.

6.6 Reducing the RA: REDUCE

REDUCE is an STL-primitive operator executed by each TA in order to reduce its RA. REDUCE calls upon the left son of the TA—the operator expression—to find out what kind of expression is there. If the operator expression is an atom, it might be STL-defined or FFP-defined. In the former case, the STL definition is invoked. In the latter case, the FFP definition is retrieved from the FDEF file (outside the machine) and is stored in place of the atomic operator. This generally requires storage management.

If the operator is ⊥, then the RA reduces to ⊥.

If the operator is an empty sequence, < >, then the result of the reduction is simply the operand of the RA, since < > acts as the identity operator.

If the operator is a sequence whose first element is itself a sequence, then the metacomposition rule is applied:

(< <x1 ... xm>y2 ... yn>z)→(<x1 ... xm> < <x1 ... xm>y2 ... yn>z>).

This requires storage management.

If the operator is a sequence whose first element is an atom, then the metacomposition rule is applicable:

(<a1 x2 ... xn>z)→(a1 < <a1 x2 ... xn>z>).

6.7 Operations in FN and FC nodes

Most operations are expected to be performed on data that is at the upper levels of nesting of an RA. Data that is deeply nested does not have its syntactic structure reflected in the SN-CP network, and thus the SN-CP network is not well suited for operating on deeply nested data.

Still, there are some elementary operations, such as copying an expression from one place to another, that we need to be able to apply to any expression, no matter how deep its structure. Tolle's dissertation, previously referenced, discusses such operations, and shows how the FN and FC nodes can be used, under control of STL operators, to accomplish the desired results.

6.8 Requesting Storage

The reduction of an RA may require that extra storage (i.e., L cells) be allocated to the RA. Consider, for instance, the execution of this RA:

(<AA<A B<C D> > > <x1 x2 ... xn>)

where each xi is an FFP constant expression. AA, as explained earlier, applies its parameter to each element of the operand, by producing the following sequence of RAs:

<(<A B<C D> >x1)(<A B<C D> >x2) ... (<A B<C D> >xn)>

Storage must be allocated for all these copies of <A B<C D> >. The next chapter discusses the storage management process, which shifts FFP text around in the L array to make space available where it is needed. The present section discusses the STL's interface with the storage management process.

Before storage management can begin, the STL program for AA has to determine how much storage is needed to hold one copy of <A B<C D> >, and it has to make that information available at all the places where the expression is to be inserted. Then the STL program for AA can, through the TA node, signal that the RA wants storage on the next storage management cycle, when the polling signal comes down to the TA. (See Chapter 4.) This causes the RA to become part of a molten zone, to get its new L cells where needed, and then to have its SN-CP network re-built. After all this has been done, the STL program for AA "wakes up" and continues with its work, which involves copying <A B<C D> > to the newly-allocated space beside each xi.

Let us look more closely at the details of requesting and using storage. AA will serve as a good example. In order to determine how much storage is needed, the STL program for AA calls upon the SN node of the expression to be copied (i.e., <A B<C D> >) with the STL-primitive operators SIZE_UP, which counts the number of L cells occupied by the expression and returns that number to the TA. Then the TA calls on the operand node, which calls on each xi with the STL-primitive operator INSERT, with parameter [f fsize]* . Assume that fsize, the number of L cells required by the expression to be inserted, is 4, as it is for <A B<C D>>. Then each xi gets INSERT to execute, with the parameter list [f 4]* . The f in this parameter list is simply the FFP atom f, the name by which the STL program refers to AA's parameter expression.

INSERT performs a symbolic insertion of its parameters around the node in which it is executed (i.e., in the SN node corresponding to xi, for each i). By a symbolic insertion, we mean the storing at some location of a few symbols that represent some FFP text that is intended eventually to be moved there. In the present case, we want to have (<A B<C D>>xi) replace xi. As an intermediate step, therefore, we insert [f 4] immediately to the left of xi and immediately to the right of xi. The and are pseudo application brackets. Eventually, they become real application brackets, but not until the RA is about to finish executing. Pseudo application brackets act like real application brackets in that they require the use of the LAP and RAP registers, but they act like sequence brackets in the parsing process that builds the SN-CP network, so that they can be treated as text inside an RA.

The expression [f 4] is a symbolic expression representing the real expression <A B<C D>>. It consists of a name, f, and a size, 4. The square brackets in this context merely delimit the symbolic expression—they have nothing to do with pipelines.

Figure 68:
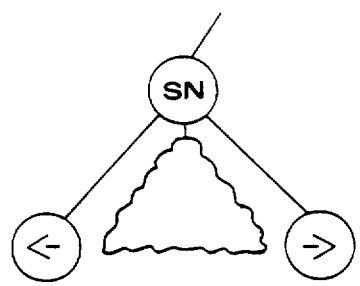
FIG. 68 is a schematic representation of an SN-CP network below an SN node.

The * in the parameter list represents the node in which INSERT is executed. In other words, it divides the parameter list into the part that gets inserted on the left of xi and the part that gets inserted on the right. All of this symbolic insertion information is stored, by INSERT, in special insertion registers in the L cells at the boundaries of the xi expression. If xi is an FFP atom, then its SN node lies in an L cell, and all of the symbolic insertion information is stored there. If xi is an FFP sequence, then its SN node need not lie in an L cell, but the SN-CP network below it looks something like the one shown in FIG. 68.

The <- and -> nodes do lie in L cells, and they bound the xi expression. The [0 f 4] has to be inserted immediately to the left of <-, and the has to be inserted immediately to the right of ->. CALL_LEFT and CALL_RIGHT can be used to cause these insertions to be performed. These are STL-primitive operators that cause a call to be made on the left and right syntactic bracket nodes, respectively. (See Tolle's dissertation, previously referenced.)

No further information is given here about the insertion registers, either, except that there will be some small limit to the number of them in each L cell, and thus to the number of different expressions that can be inserted at a given place by an STL program at once.

Figure 69:
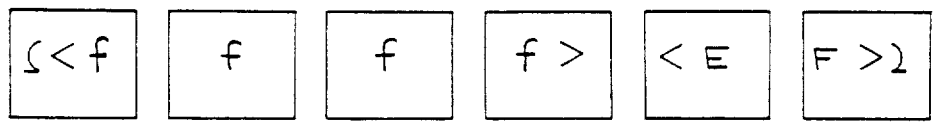
FIG. 69 is a schematic representation of some L cells after storage management.

The storage management process checks the insertion registers of all L cells in a molten zone, and, as described in the next chapter, moves FFP text so as to provide L cells where they are needed. Each symbolic expression of the form [f n] causes n L cells to be allocated, containing a sequence of n atoms, one per L cell: <f f ... f>. In the present case, room is also provided for the psuedo application brackets. If x1 is <E F>, then after storage management the L cells near x1 might look like those shown in FIG. 69.

Figure 37:
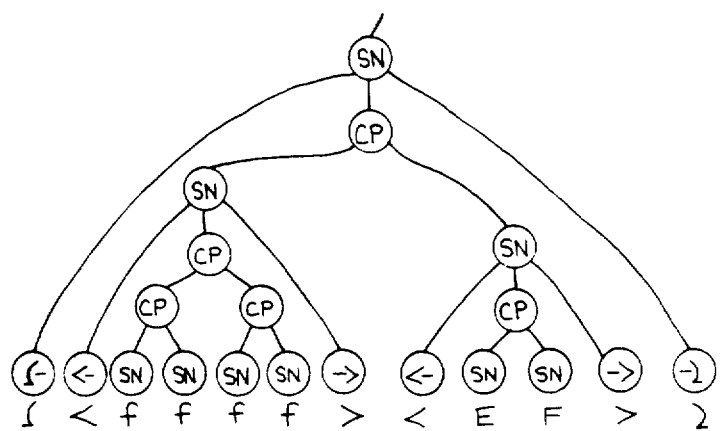
FIG. 37 is a schematic representation of an example of an SN-CP network after the repartitioning and reparsing that follow the allocation of storage for an RA.

After repartitioning and reparsing, the SN-CP network might look like the one shown in FIG. 37.

Two persistent registers were mentioned earlier but not explained: nodename and dummy_node. The first of these is set to f in the SN node corresponding to the newly-allocated space. The second of these is a one-bit register, set to true in that same node, to indicate that it is not the real f node (the one that sees the text to be copied), but just a dummy one, so far. The parsing process can set both of these registers, the appropriate information having been associated with the '<' and '>' via the symbolic insertion prior to storage management. The STL program for AA can set nodename to f and dummy_node to false in the real f node.

Then, after storage management and re-parsing, the STL program for AA merely has to call upon the real f node once again, this time with WRAPR, and then distribute the resulting flowing copy of f to all the dummy f nodes, telling them to store f over themselves. We assume that there is an STL-primitive operator, STORE_COMPACT, that can store any flowing FFP expression compactly over a one-level sequence <f ... f> of sufficient size. Although it is not necessary in the case of AA, in general it is necessary for part of the SN-CP network to be re-built to reflect the syntax of the expression stored by STORE_COMPACT, so that further computation can be done by the RA on the newly-inserted text. This process, termed local re-parsing, could be handled by the STORE_COMPACT operator. We give no further details here, except to mention that it requires some facilities outside the normal use of CALL_SONS.

The nodename and dummy_node registers are not strictly necessary, but having them allows us to write a particularly simple MOVE operator that can (1) find all the expressions that are to be moved, (2) broadcast them to the entire RA, and (3) cause them to be stored over the proper dummy expressions.

Once <A B<C D>> has been stored next to each xi, the STL program for AA can 1. call on the (- and -) nodes and the real f node and the AA node to erase the corresponding text, since it is no longer needed.
2. call upon all the and nodes to convert the pseudo application brackets to real ones.
3. wait for the next polling signal to come down to the TA.

When the next polling signal comes down to the TA, the TA can reply that its RA has finished executing, and can become part of a molten zone.

The specification of the insertion of literal symbols and of multiple copies of an expression also fits nicely into the framework of insertion registers.

7. Storage Management

7.1 Overview

Some RAs require the allocation of additional storage (L cells). Since the storage used by an RA has to be contiguous (possibly with interspersed empty cells), it is generally necessary for an RA to obtain the cooperation of neighboring RAs in order to get more storage.

The question, then, is how to get the RAs to cooperate for this purpose. Perhaps the simplest solution is to divide the machine's activities into major cycles, during each of which all the RAs in the machine are located and are allowed to execute until all of them either finish or need more storage. Then global storage management (involving every cell of the machine) is performed, satisfying as many of the RAs as possible, and the next cycle begins. This simple solution has been rejected in both Machine I and Machine II, because some RAs take much longer than others to execute. It seems wasteful to wait for the slowest RAs to finish before locating some new ones to execute.

One central characteristic of both machines is that the FFP program has its natural "home" in the L array. The execution of an RA takes place partly in T and partly in L, but the ultimate result of the execution is to replace the RA, in L, by another FFP expression. This characteristic both simplifies and complicates the storage management problem. It simplifies it by restricting it to a problem of allocating space in L alone—no explicit consideration has to be given to allocating T cells. Once the L cells have been allocated to an RA, there is a collection of T cells and parts of T cell naturally corresponding to the RA (as determined by the partitioning process). On the other hand, this characteristic complicates things because it forces all the FFP text to be resident in the L array before storage management can be performed.

In Machine I, therefore, the machine's activities are divided into major cycles of sufficient duration to execute all the "simple" RAs—those that require little data movement. At the end of each cycle, each RA that has not yet finished is interrupted, any data items that the RAs are moving through the tree are sent back down to their origins in the L array, and then global storage management is performed.

This solution seems to be inapplicable to Machine II, because of the much greater accumulation of complex information in the tree of Machine II. There is no apparent, simple way to flush that data back to the L array, other than to allow the RA to finish executing.

The solution adopted in Machine II uses a global machine cycle to coordinate the concurrent execution of multiple, disjoint instances of local storage management. In each cycle, as explained in Chapter 4, a polling signal comes down from the top of the machine, to determine which RAs are willing to participate in storage management on this cycle. Those that are willing are merged into molten zones. These are segments of the L array that can undergo local storage management. Any RA that is still executing and does not yet need storage simply refuses to participate, and continues executing without interference from the rest of the machine.

In each molten zone, a sequence of several activities takes place, as explained in Chapter 4:

1. The molten zone is located.
2. Any completed user-programs in the zone are returned to the user (i.e., removed from the machine).
3. The syntactic brackets in the zone are compacted.
4. Decisions are made about bringing in new user-programs and about denying some storage requests.
5. Every FFP symbol in the zone is told where it should move.
6. The FFP symbols in the zone are moved, through the tree, to their destinations, so as to provide storage where it is needed.
7. New user-programs are brought in and stored in the zone, if appropriate.
8. The zone is partitioned.
9. The RAs in the zone are parsed, and they start (or resume) executing.

The present chapter discusses some of the details of these activities.

The primary disadvantage of the local storage management of Machine II is that an RA's storage request is satisfied only if there is adequate space available in the RS's own molten zone; RAs will sometimes be temporarily delayed (i.e., denied their requests) even though the machine as a whole has ample space available.

On the other hand, in Machine II no RA is ever interrupted and set back in its progress for purposes of storage management. More importantly, in contrast with Machine I, Machine II is often able to perform complex computations (such as multiplying matrices and solving simultaneous linear equations) without having to request any storage.

7.2 Finding the molten zones

Figure 70:
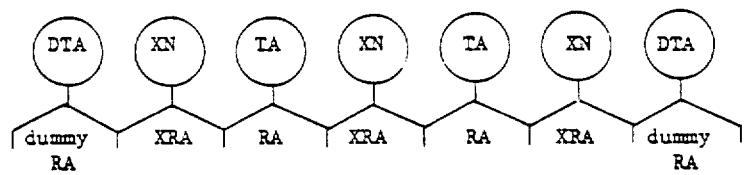
FIG. 70 is an illustration of the natural left-to-right ordering of the TAs, the DTAs, and those XNs that see entire XRAs.

The partitioning process described in Chapter 3 embeds a TA-Mediator network in the machine, establishing a one-to-one correspondence between RAs and TAs. Each TA sees precisely one entire RA. The two endmost L cells of the machine both embed a DTA Node ("dummy TA" node), which may be thought of as corresponding to a dummy RA at the edge of the machine. Between any pair of neighboring RAs is a possibly empty string of text symbols called an XRA ("external to RA"). Corresponding to each XRA is an XN node that sees precisely that XRA. The TAs, the DTAs, and those XNs that see entire XRAs have a natural left-to-right ordering, as illustrated in FIG. 70. Jointly, these nodes see all the FFP text in the L array.

Figure 71:
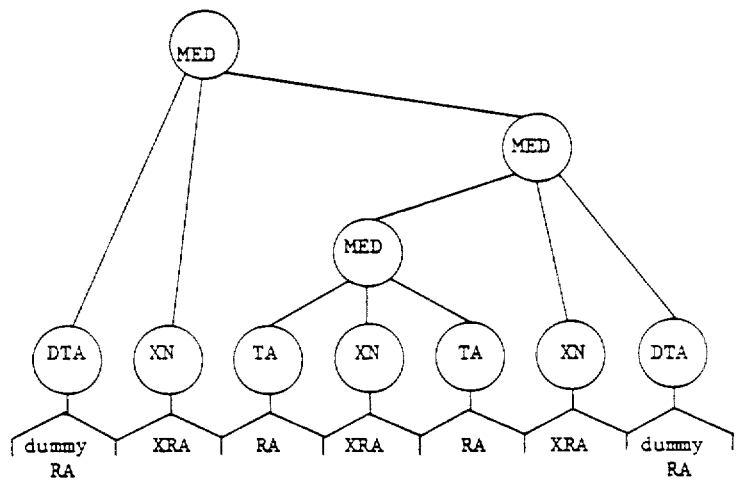
FIG. 71 illustrates the relationships among TAs, DTAs, XNs and MEDs.

The partitioning process embeds these nodes and also a tree of MED nodes above them. Each MED node has three sons. The left son is a TA or a DTA or a MED node. So is the right son. The middle son is an XN node that sees an entire XRA. FIG. 71 illustrates these relationships.

(We ignore here the XN nodes embedded to the left of the left DTA and to the right of the right one.)

The root of the TA-Mediator network is a MED node embedded in the root T cell of the machine. It is this MED node that initiates the polling signal at the start of the storage management cycle. The signal spreads to all the TAs and DTAs, each of which responds quickly with an indication of whether it is willing to participate in storage management.

The problem addressed in the present section is how to use the responses to the polling signal to find the molten zones—those segments of the L array that are willing to undergo storage management.

The objective is to make the molten zones as large as possible, so that each instance of local storage management is as nearly global as possible. Every XRA is therefore considered eligible for inclusion in a molten zone.

The finding of molten zones can be viewed as a refining of the TA-Mediator network: a process that embeds one or two nodes in each of the MED nodes and two or three channels within certain of the M channels. The process is conceptually similar to the embedding of the SN-CP network (described in Chapter 5), which refined the I channels and the IN nodes. The terminology is therefore also similar.

The finding of molten zones requires the introduction of four new node types and two new channel types. The new nodes are as follows:

1. QN2—"Molten (or liquid)" node, with 2 subtrees
2. QN3—"Molten (or liquid)" node, with 3 subtrees
3. ZN—"Frozen" node
4. TQ—"Top of molten zone" node.

The new channels are as follows:
1. Q—"Molten (or liquid)" channel
2. Z—"Frozen" channel.

The QN2 and QN3 nodes are referred to generically as QN nodes. The embedded network of QN, ZN, and TQ nodes, connected by Q and Z channels, is referred to as the TQ-QN network of the molten zone.

Each TA node, upon receiving the polling signal, responds by sending up on its M channel a CCC (current channel configuration) if either Q or Z. A response of Q indicates willingness to become part of a molten zone; a response of Z indicates unwillingness to become part of a molten zone. Each DTA sends up CCC of Z. When CCC travels up an M channel, the corresponding Q and/or Z channels of the CCC get embedded within the M channel. The MED node above receives the CCC.

When a MED node has received a CCC from both its right son and its left son, it combines them in accordance with the patterns of Chart K, thereby embedding the indicated node. It then updates the CCC by embedding an upward channel from the newly-embedded node, as indicated in Chart L. The basic idea of the process is that adjacent molten zones, represented by Q or X channels, are merged together until surrounded by two frozen zones, represented by Z channels.

Chart K
Node formed from adjacent channels

| Pattern (downward channels) | Node to be Embedded |
|---|---|
| 1. Q X Q | QN3 |
| 2. Q X | QN2 |
| 3. X Q | QN2 |
| 4. Z X Z | ZN |
| 5. Z Q Z | TQ |

Chart L
Channels leading upward from a node

| Node | Upward Channel |
|---|---|
| 1. QN2 | Q |
| 2. QN3 | Q |
| 3. ZN | Z |
| 4. TQ | Z |

The algorithm used to perform the embedding is so similar to the PARTITION and PARSE algorithms that we forgo giving it here. One important difference between this process and the parsing process of Chapter 5 is this: each MED node has a middle downward channel of type X (leading down to an XRA), and thus an X is always inserted between the two initial CCCs received from the left and right sons of the MED.

Figure 38:
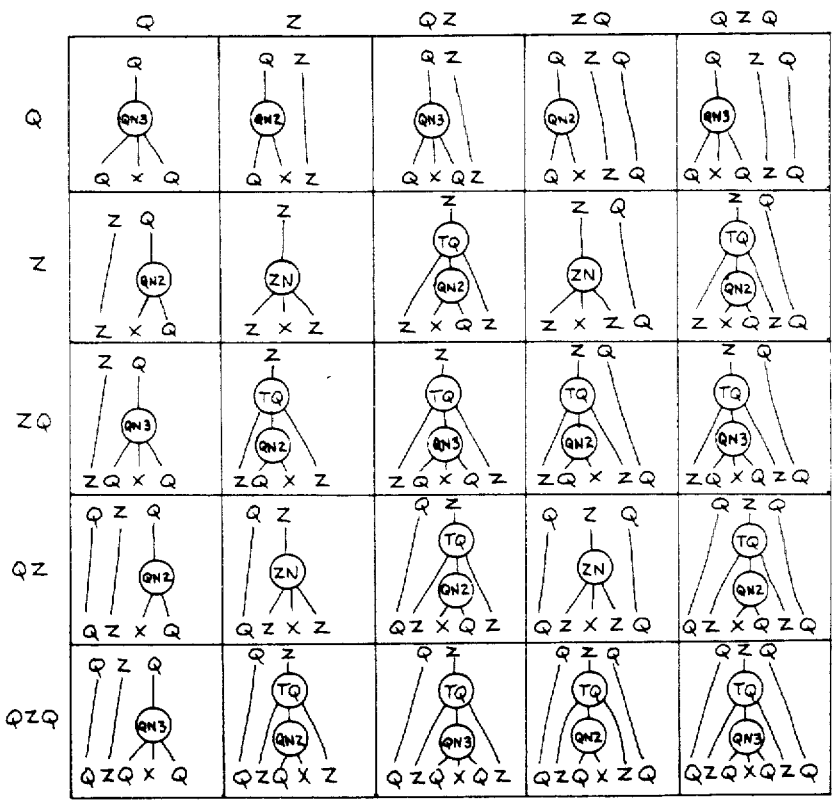
FIG. 38 is a schematic representation of all the configurations that a Mediator node can take on during the process of finding the molten zones.

FIG. 38 shows all the possible pairs of inputs to a MED, and the resulting embeddings of nodes and channels in the MED. The only ambiguity arises with the pattern Q X Q, which matches three of the patterns in Chart K. We assume that the first pattern, the entire Q X Q, is used.

As a result of this process, the molten zones are located, a one-to-one correspondence being established between the molten zones and the TQ nodes. Each TQ node sees, through its middle channel, a tree whose internal nodes are QNs and whose leaf nodes are TAs and XNs that see XRAs, all of which are willing to go through storage management. Each TQ, upon being embedded, takes charge of the storage management process in its own molten zone.

Figure 39:
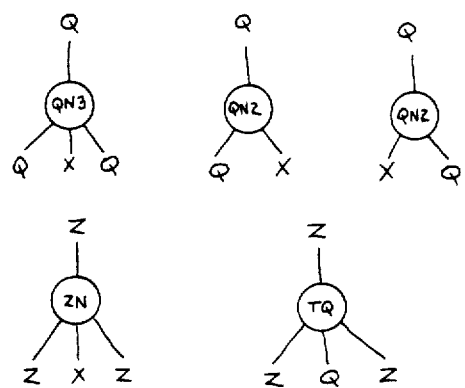
FIG. 39 is a schematic representation of all the possible channels that can come into and out of the nodes of the TQ-QN network.

FIG. 39 shows the channels that can lead into and out of each node.

Figure 40:
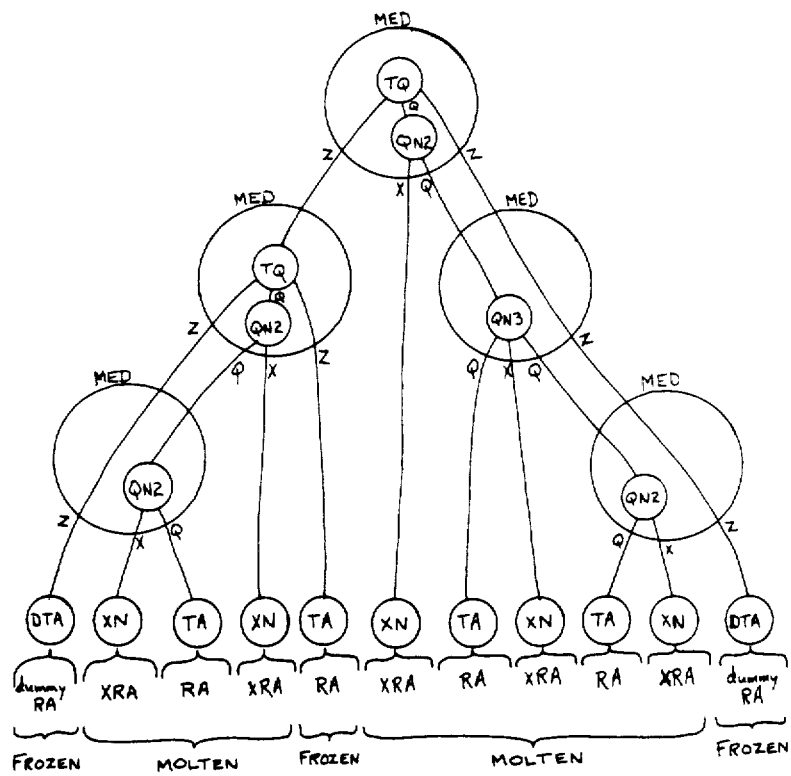
FIG. 40 is a schematic representation of an example of molten zones.

FIG. 40 shows an example of molten zones. There are four TAs in the machine. All but the second from the left are willing to go through storage management.

7.3 User-program removal

Once the molten zones have been located, the TQ of each molten zone supervises the rest of the storage management process. The first thing it does is to remove the completed user-programs from the molten zone. Recall that each user-program is enclosed in special application brackets. We can assume, therefore, that each TA whose RA is an entire user-program is aware of its special status, since the partitioning process can inform each TA of the type of application brackets it has. The TQ node of the molten zone simply calls on each TA in the zone to execute WRAPR if the TA represents a completed user-program, and the TQ sends the resulting expressions to an I/O port, where they are received by the processor P. (See Chapter 4.) Each completed user-program is then erased in the L array, thus freeing whatever space it occupied there. The embedded nodes of the molten zone stay in place, though, and are used in the following stages of storage management, as described below.

7.4 Compaction of brackets (an option foregone)

Since the erasure of FFP text by an RA can make the remaining text non-compact, it may be desirable to re-compact the text in each molten zone before making decisions about storage requests. This can be done immediately after the completed user-programs have been removed from the molten zone.

In this process, information is swept upward from the L cells of the molten zone. The purpose is to coalesce adjacent syntactic brackets of each type and then to store them back into appropriate L cells. If, for instance, there are three adjacent left sequence brackets, stored in separate L cells, then they should be combined into a single L cell, by storing a 3 in its LSEQ register, thus emptying two L cells. Only brackets are re-positioned in this process——the FFP atoms are not moved. It is possible to do the compaction in time proportional to the height of the molten zone.

The compaction is not essential to the proper functioning of the machine; it merely provides more empty L cells than would otherwise be available. If compaction is performed, it generally makes obsolete the molten zone's TA-Mediator network and TQ-QN network, thus complicating the later stages of storage management. (That is, those networks would have to be re-built prior to the later stages of storage management.) Since the compaction is not essential for the machine, we forego further consideration of its implementation and assume in the rest of the chapter that the FFP text in the L array is still accurately reflected by the TA-Mediator network and the TQ-QN network in the molten zone.

7.5 Insertion or denial decisions

After the removal of completed user-programs and (optionally) the compaction of brackets, the molten zone may have more than enough empty L cells to satisfy all the requests of all the RAs in the zone. In this case, there may be opportunity for the insertion of new user-programs into the machine.

It is possible, on the other hand, that the molten zone has too few empty L cells to satisfy all the storage requests of all the RAs in the zone. If this is the case, then all of the requests of some of the RAs are denied during this storage management cycle, in order that the remaining RAs can have their requests entirely satisfied, and thus can proceed with their execution. The RAs whose requests are denied simply have to wait until the next storage management cycle, when they again have a chance to make their requests.

A single upsweep is used to count the number of empty L cells in the molten zone and to collect information about the number of requested L cells in the various subtrees of the TQ-QN network. We discuss the two counting operations separately:

1. The number of empty L cells.

Recall that each L cell, whether empty or not, contains exactly one IN leaf node. It is therefore convenient to use the IN nodes to count the empty L cells. Each IN leaf node sends up 1 if its L cell is empty of FFP text, or 0 if its L cell contains FFP text. The SN, CP, FN, FC, <-, an -> nodes do not participate. The MED nodes do not participate, but the nodes embedded within them do. The DTA nodes and the ZN nodes never participate, since they are never part of a molten zone. The other leaf nodes in the molten zone (XN, (-, and -)) send up 0.

Each non-leaf node of type XN, IN, TA, QN2, and QN3 adds together the two or three numbers it receives and sends the sum upward. The TQ node of the molten zone thus receives a single number, #empty, the number of empty L cells in the zone.

2. The number of requested L cells.

As in computing #empty, it is convenient in counting the number of requested L cells to use the IN nodes. The IN leaf node in each L cell counts the total number of L cells required to satisfy all the insertion requests in that L cell, and sends that number, #req, upward on its I channel.

Figure 72:
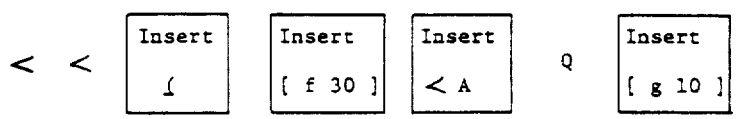
FIG. 72 is an example of FFP text and insertion request seen by an IN leaf node residing by itself in an L cell.

Let us consider a particular example. Suppose that an IN leaf node, residing by itself in an L cell, sees the arrangement of FFP text and insertion requests shown in FIG. 72.

The original text in the L cell, before the execution of the RA produced the insertion requests, was: <<Q. There are four insertion requests. The first (starting at the left) requests enough space to insert a left pseudo application bracket:  . The second requests enough space for a sequence of 30 atoms: <f ... f>. The third requests space for a left sequence bracket and an atom: <A. The fourth requests space for a sequence of 10 atoms: <g ... g>.

We assume that a left pseudo application bracket must, after storage management, end up as the sole occupant of a LAP register in some L cell. (Note: the LAP and RAP registers must have a bit to indicate whether their occupant—when lap=1 or rap=1—is pseudo or not. If it is, the    or    acts like a sequence bracket during partitioning and parsing.)

We see, then, that the text represented in this one L cell requires 43 L cells when the symbolic insertions are expanded. See FIG. 73.

One of the 43 needed cells is the one already occupied; thus the IN node requests 42 more, by sending up a #req value of 42.

The SN, CP, FN, FC, <, and -> nodes do not participate in this upsweep. The MED nodes, the DTA nodes, and the ZN nodes do not participate, either. The other leaf nodes in the molten zone (XN, (-, and -)) send up 0. Each IN non-leaf node adds together the two numbers it receives and sends the sum on upward. Each XN node receives two 0 values and sends up 0. Each TA node receives #req on its I channel and 0 on its other two downward channels. The #req value it receives is the total number of L cells requested by its RA. The TA sends two numbers up its Q channel: #req and 0.

Each Q channel, in fact, carries up two numbers, which we denote by m and rest:

m—the minimum positive number of L cells requested by any TA in the subtree under this channel. (If all TAs in the subtree request 0 cells, then m=0.)

rest—the sum of all the other L cells requested by TAs in the subtree under this channel.

Thus, m+rest=#req, the total number of L cells requested by all the TAs in the subtree under this channel. (A TA that has finished executing its RA will request 0 cells.)

Chart M shows the algorithms executed in the TA, QN2, QN3, and TQ nodes to compute the number of requested L cells. As shown in the chart, a QN2 node receives two numbers and simply passes them on upward. A QN3 node receives two numbers on each of its two downward Q channels: ml and restl on the left channel, and mr and restr on the right channel. It sends up a pair of numbers, m and rest, as shown in Chart M. Eventually, the TQ node receives its m and rest values, and sets #req=m+rest.

Figure 41:
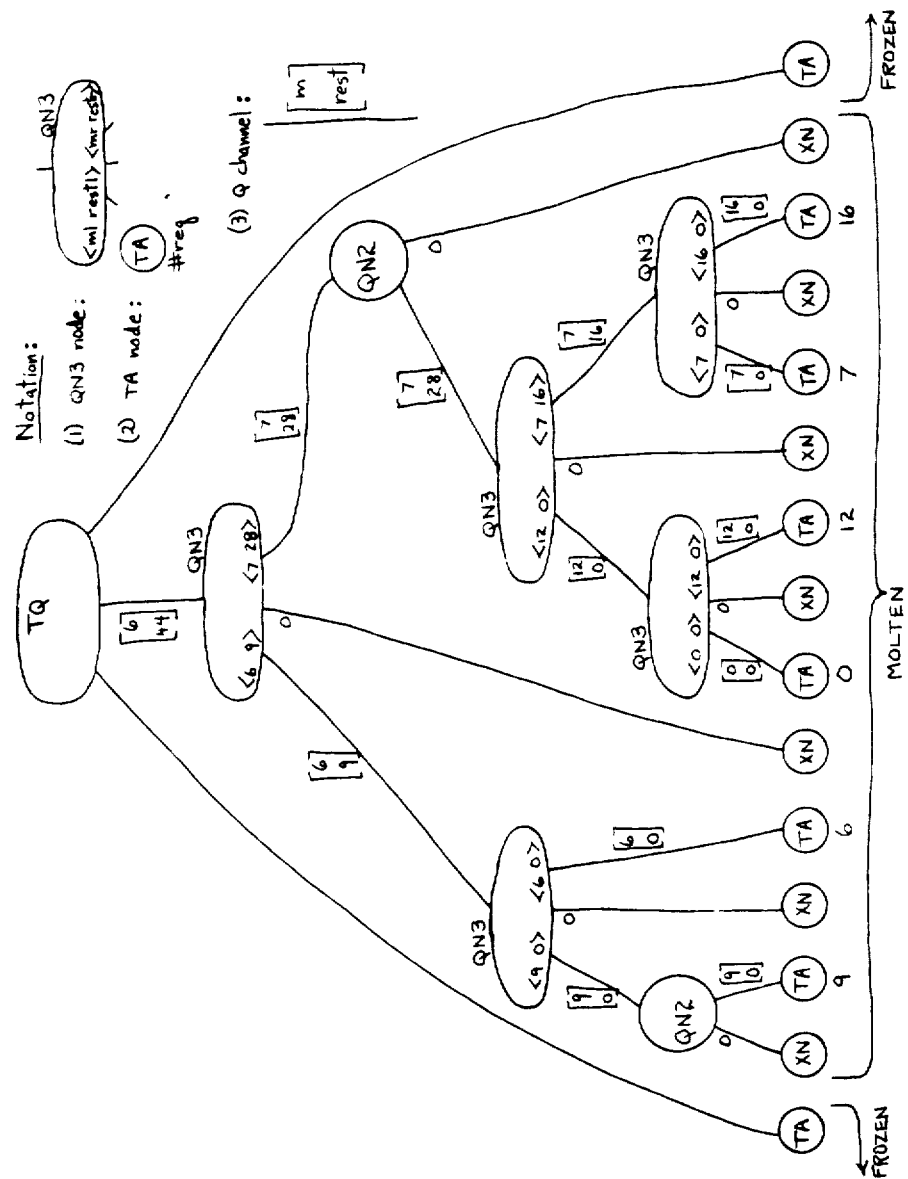
FIG. 41 is an schematic representation of an example of computing the number of requested L cells in a molten zone.

FIG. 41 shows an example of the quantities sent up and stored by the algorithm that computes the number of requested L cells. There are several RAs in the molten zone, requesting various amounts of storage. For the sake of simplicity, only the TAs, the QNs, the TQ, and the highest-level XNs are shown. The number below each TA is the number of L cells requested by that TA's RA, as computed by the IN nodes below the TA.

| Chart M |
|---|
| Upsweep computing the number of requested L cells |

| | |
|---|---|
| TA: | Ignore the values received on the application bracket channels. |
| | Receive #req on the I channel; store for later use. |
| | Send up #req. |
| | Send up 0. |
| QN2: | Ignore the value received on the X channel. |
| | Receive m on the Q channel. |
| | Send up m. |
| | Receive rest on the Q channel. |
| | Send up rest. |
| QN3: | Ignore the value received on the X channel. |
| | Receive ml on left Q channel; store for later use. |
| | Receive restl on left Q channel; store for later use. |
| | Receive mr on right Q channel; store for later use. |
| | Receive restr on right Q channel; store for later use. |
| | If ml > 0 and mr > 0 then send up m = min( ml,mr ) |
| | Else send up m = max( ml,mr ). |
| | Send up ml + restl + mr + restr − m. |
| TQ: | Receive m on the Q channel. |
| | Receive rest on the Q channel. |
| | Store #req = m + rest. |

In the TQ node, if #req=#empty, then all requests can be satisfied, but there is no additional room for insertion of new user programs. If #req<#empty, then all requests can be satisfied, and it is possible that some new user-programs can be inserted in the molten zone. Section 7.5.1 discusses this possibility. If #req>#empty, then not all the requests can be satisfied—one or more have to be denied. Section 7.5.2. discusses a Denial Algorithm for choosing which requests to deny.

7.5.1. Insertion decisions

Whether new user-programs can be inserted depends on
1. whether or not the molten zone lies entirely within a single user-program
2. the amount of extra space available in the molten zone (i.e., #empty-#req)
3. the sizes of the new user-programs that are waiting to be brought into the machine.

The molten zone lies entirely within a single user-program if and only if (prior to removal of the completed user-programs) there is no user-program application bracket anywhere in the molten zone. If the molten zone lies entirely within a single user-program, then no new user-programs can be inserted there. Otherwise, if there is sufficient space available in the molten zone, new user-programs can be inserted between old ones.

The processor P, outside of Machine II, collects information about the sizes of new user-programs. In each storage management cycle, Machine II informs P of the amount of space available for the insertion of new user-programs in each molten zone. P decides which user-programs should be inserted in which molten zones. The TQ node of each molten zone is then told the sizes of the new user-programs that it will have to insert. The TQ node numbers the user-programs, assigning to each of them a distinct name of the form UPROGi, where i is a positive integer. It then sends these names and their corresponding insertion-size numbers down through the TQ-QN network, which distributes them to appropriate places in the L array, outside of the present user-programs in the zone. If, for instance, three new user-programs of sizes 20, 100, and 50, respectively, are to be inserted in the molten zone, then the TQ node sends down the three pairs [UPROG1,20], [UPROG2,100], and [UPROG3,50]. Each of these items, having been placed in some L cell in the molten zone, causes an insertion request to be made at that place. The question of deciding exactly where to place these insertion-size numbers is left for future work. (A clever placement could reduce the amount of time required in the text movement phase of storage management, discussed in Section 7.7). Section 7.6 describes how the molten zones then compute where to move their FFP text so as to provide empty L cells where needed.

7.5.2 Denial decisions

Suppose that #empty<#req, so that some RAs have to have their requests denied. Which requests should be denied? Finding an optimal solution—one that comes closest to using all the available Lells in the molten zone—is NP-complete: it is a version of the knapsack problem. (The book by Michael R. Garey and David S. Johnson entitled *Computers and intractability: a guide to the theory of NP-completeness*, W. H. Freeman and Company, San Francisco, 1979, discusses the knapsack problem and NP-completeness.) We settle for a fast algorithm that will sometimes produce a less-than-optimal solution.

The Denial Algorithm described here takes time proportional to the height of the molten zone, independent of the number of RAs, the number of cells requested, and the number of cells available. It is guaranteed to satisfy the requests of at least one RA, if any algorithm can. It requires one downsweep of information through the molten zone.

The downsweep begins with the TQ node, which sends a single number—the number of empty L cells in the molten zone, #empty—down its Q channel. Each QN3 node and each QN2 node, in turn, sends a single number down each of its downward Q channels, using the algorithms shown in Chart N. The number received by a TA is the number of empty L cells that will be allocated to that TA's RA. If the number is less than the number requested by the TA, then that TA's request will be denied; otherwise, that TA's request will be satisfied. The TA informs all the FFP text symbols in its RA what the decision was: request approved or request denied.

Let A ("Available number of L cells") denote the number that comes down to a node on its Q channel. Then a QN2 node simply passes A on down its downward Q channel. A QN3 node splits A into two non-negative parts, sending one part down each of its two downward Q channels.

As an example, suppose that ml=90, restl=140, mr=20, and restr=100 at some QN3 node. If A>=350 at the QN3 node, then the node would send 230 to the left and 120 to the right, thus satisfying all requests below it. If A=185, then the QN3 node would determine that restl+mr=140+20=160 is the largest sum not exceeding A. Thus the QN3 node would decide to send at least 140 to the left and at least 20 to the right. That leaves A−160=25 more empty cells that might be usable. They are not usable on the left, though, since the minimum request on the left is ml=90. Thus the QN3 node would send 140 to the left and 20+25=45 to the right.

Figure 42:
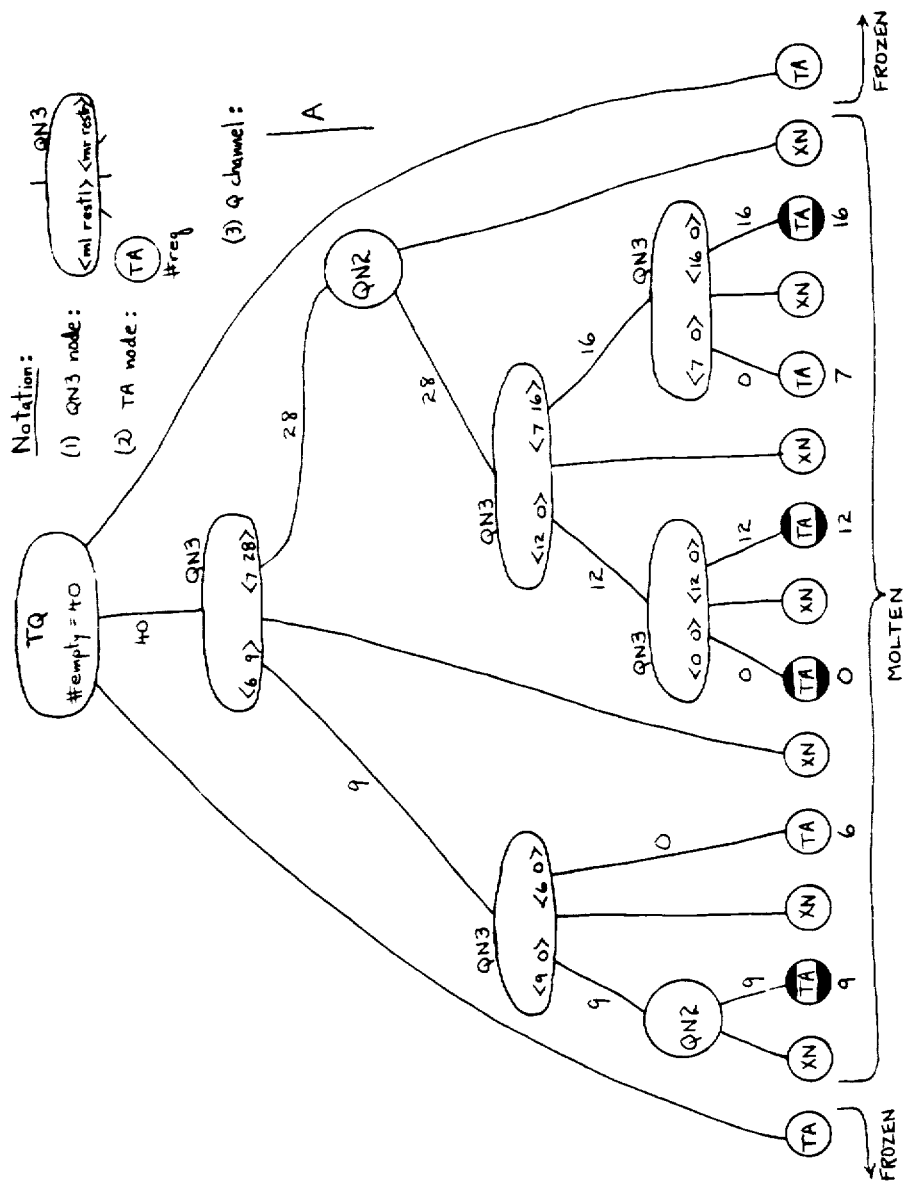
FIG. 42 is a schematic representation of an example of denial decisions made in a molten zone.

FIG. 42 shows the denial decisions made in a molten zone with several RAs requesting various amounts of storage.

| Chart N |
|---------|
| The denial algorithm, performed on a downsweep |

| | |
|---|---|
| QN2: | Receive A from above. |
| | Send A down the Q channel. |
| QN3: | Receive A from above. |
| | Choose the subset of ml,mr,restl,restr with the largest sum not exceeding A. |
| | Satisfy that subset, by sending the appropriate portion of A down each Q channel. (Any of A that is "left over" can be sent down one channel or the other.) |

7.6 Destination computation

After the insertion decisions or the denial decisions have been made, there are enough empty L cells in the molten zone to satisfy all the un-denied insertion requests and all the user-program insertion requests in the molten zone. The next questions are (1) Where should each FFP symbol move in order to provide the empty L cells where they are needed? and (2) By what route should each FFP text symbol move to reach its specified destination? The first question is answered in the present section, which discusses an algorithm for computing the destination of each FFP symbol in the molten zone. The second question is answered in Section 7.7. Both questions are concerned with the allocation of space in the machine rather than with FFP syntactic structure, and we find that the embedded networks (TA-Mediator, SN-CP, and TQ-QN) have served their purpose and are of no further use in the molten zone, except to demarcate its boundaries.

The destination computation is accomplished in one upsweep and one downsweep in the molten zone. The upsweep builds a very simple network—a binary tree—and stores four numbers in each of its nodes: l#empty, l#req, r#empty, and r#req. The downsweep then stores two more numbers in each node: BL and BR. These numbers, whose significance will be explained shortly, are then used by the leaf nodes of the newly-embedded network to compute the destination of each FFP symbol in the molten zone. We discuss the upsweep, the downsweep, and the actual destination computation separately.

7.6.1 The upsweep: embedding the BN network

The network embedded on the upsweep is called the BN network, in reference to one of its two kinds of node, the BN ("binary") node. The other kind of node is the TQ node, the same one already embedded at the top of the molten zone. The channels of the BN network are all of type B ("binary").

The upsweep begins in the L cells of the molten zone. Each L cell embeds a single BN node. In all except the two endmost L cells of the molten zone, the BN node sees the entire L cell.

Each BN node sends up a B channel, carrying a pair of numbers, #empty and #req. As before, #empty is the number of empty L cells seen, and #req is the number of L cells requested. (The requests that were denied are not counted, of course.) When a B channel meets another B channel in the same molten zone, they are combined to form a BN node. This happens only in the T cells. The #empty and #req values that are carried on the left channel are stored in the BN node as l#empty and l#req; those that are carried on the right channel are stored as r#empty and r#req. The two #empty values are added, and the two #req values are added, and the two sums are sent up on the B channel that emanates from the new BN node. Eventually, a BN node is embedded in the T cell that contains the TQ node of the molten zone, and the upsweep terminates as it reaches the TQ node.

Figure 43:
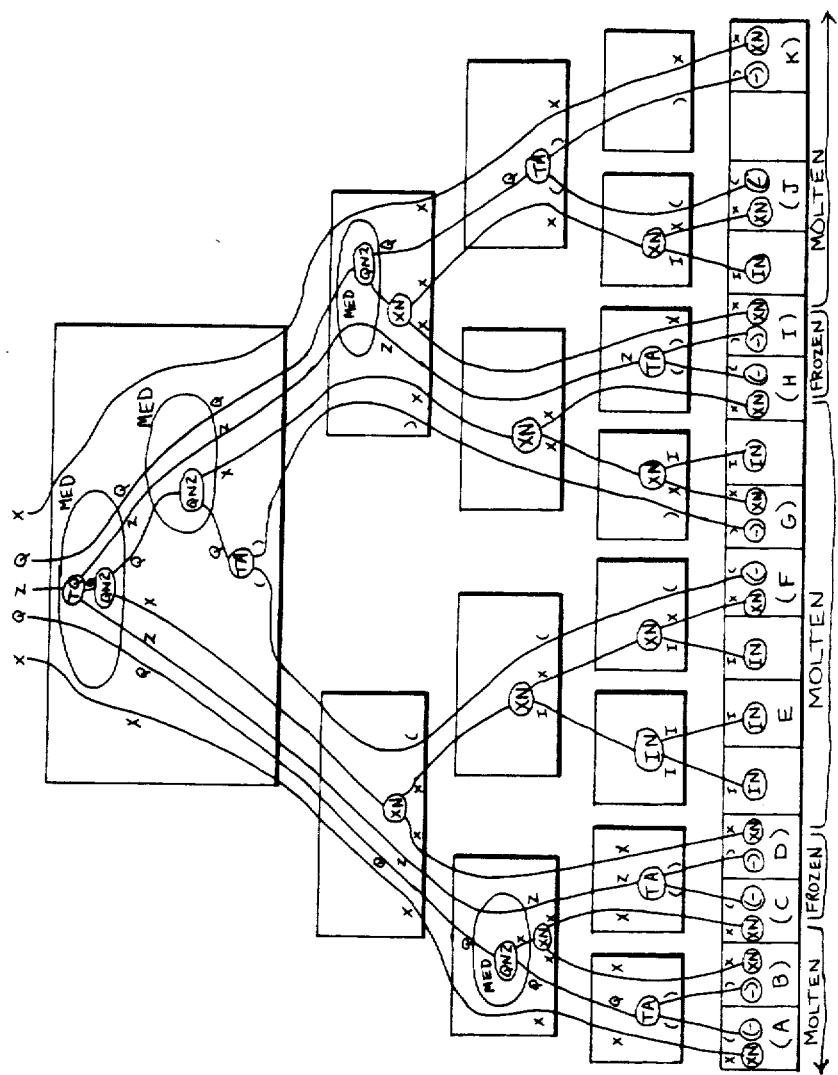
FIG. 43 is a schematic representation of an example of molten and frozen zones before the BN networks are embedded.

FIG. 43 shows the major components of a TQ-QN network embedded in a small subtree of Machine II, prior to the upsweep that embeds the BN network. (The SN-CP network is not shown.) There are five TAs in the subtree. Two of them, the second and fourth, are unwilling to go through storage management, and thus are in frozen zones. The other three lie in molten zones. Only the middle molten zone happens to lie entirely within the subtree shown in the figure; the others extend beyond its boundaries.

Figure 44:
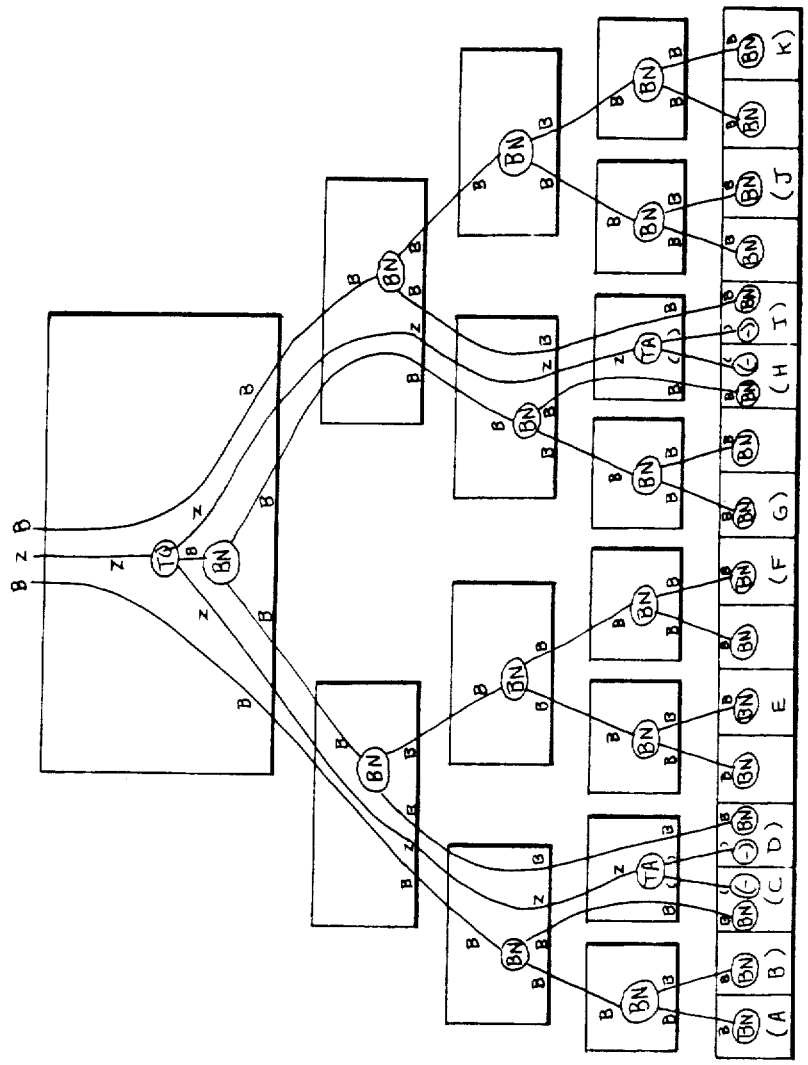
FIG. 44 is a schematic representation of the BN networks that get embedded by the molten zones of FIG. 43.

FIG. 44 shows the situation in the same subtree after the BN networks have been embedded in the three molten zones. (There is no need for the three molten zones to embed their BN networks simultaneously.) Notice that at most one BN node gets embedded in any T cell, although as many as four B channels may enter a T cell from below (two from each subtree).

7.6.2 The downsweep: computing BL and BR

The next downsweep is quite similar to a corresponding downsweep in Machine I's storage management preparation, and we borrow some of the terminology as well as the algorithm itself from Magó's paper, previously referenced. The main difference between the two algorithms is that the downsweep is global in Machine I and is performed by entire cells, while in Machine II it is localized to individual molten zones and is performed by the BN nodes.

Let us use the term cell-packet to denote a collection of FFP symbols that are to be stored in a single L cell, using the PC representation described in Chapter 2. Among other possibilities, a cell-packet might consist of several sequence brackets surrounding an FFP atom. The downsweep deposits in each BN node in the molten zone two numbers, each of which holds information concerning the segment of the L array seen by the BN node:

1. BL (boundary condition on the left) is the number of cell-packets to be moved into the segment from its left during the text movement phase of storage management.
2. BR (boundary condition on the right) is the number of cell-packets to be moved into the segment from its right during the text movement phase of storage management.

BL and BR can be positive, zero, or negative. If either is negative, the direction of movement across the corresponding boundary is reversed.

The downsweep starts at the TQ node, which sends the pair [0,0] to its BN son. Each non-leaf BN node receives a pair [BL,BR] and sends a pair [BL2,BR2] to its left son and [BL3,BR3] to its right son. The algorithm used by a non-leaf BN node is shown in Chart O. When a leaf BN node receives its pair [BL,BR], it stores them and performs the calculations described in Section 7.6.3.

| Chart O |
|---|
| Algorithm for computing BL and BR |
| Receive BL and BR from above. |
| BL2 := BL. |
| BR3 := BR. |
| need2 := BL2 + l#req − l#empty. |
| need3 := BR3 + r#req − r#empty. |
| If need2 <= 0 and need3 <= 0 then BR2 := 0 |
| Else if \|need2\| >= \|need3\| then BR2 := need3 |
| Else BR2 := −need2. |
| BL3 := −BR2. |
| Send BL2 and BR2 to left son. |
| Send BL3 and BR3 to right son. |

No cell-packets should be moved across the boundaries of the molten zone, of course; hence the zero values of BL and BR sent to the topmost BN node by the TQ node. The algorithm minimizes the number of cell-packets to be moved across the BN node's subtree boundary. In the algorithm, need2 represents the number of L cells that are needed to satisfy all the requests in the left subtree, under the assumption the BL cell-packets are to be moved into the subtree from the left, and that there are 1# req requests for L cells in the subtree and 1# empty empty L cells in the subtree. The value of need3 has a similar meaning with respect to the right subtree.

If need2 and need3 are both negative or zero, then both subtrees have enough empty L cells, so no cell-packets are moved between them. If one is positive, then the other must be negative and must be at least as great in absolute value. In this case, min(|need2|,-|need3|) cell-packets will move across the subtree boundary in the appropriate direction.

Figure 45:
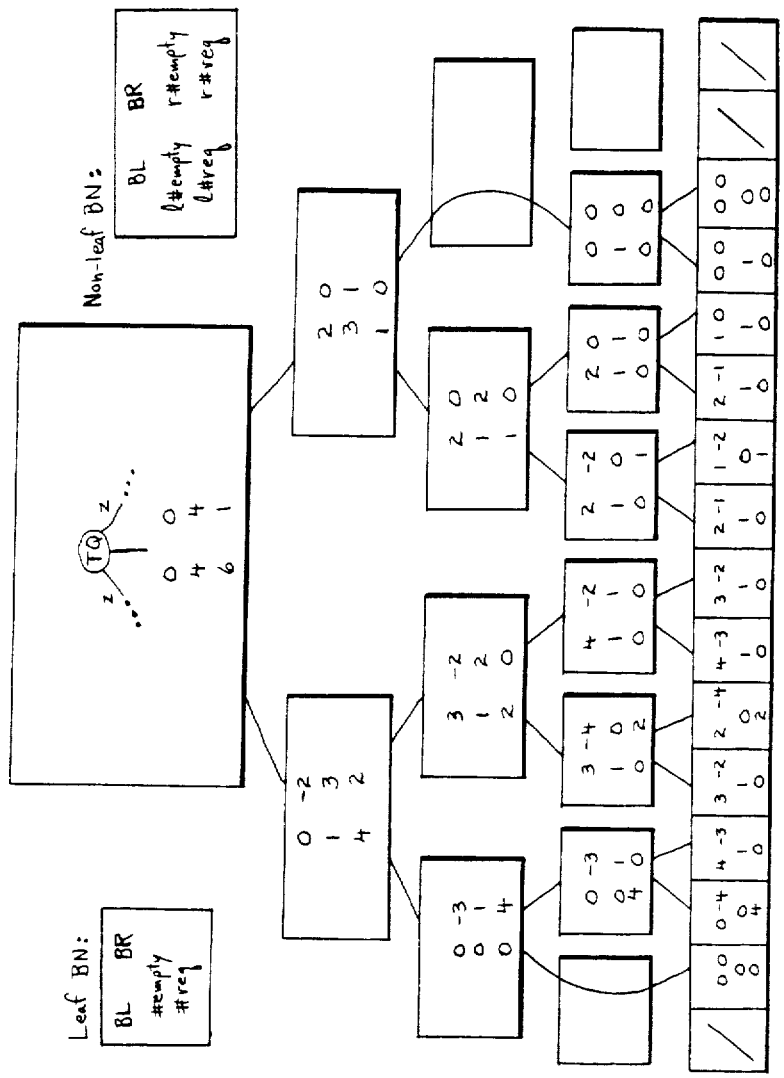
FIG. 45 is a schematic representation of an example of the computation by a BN network of 1#empty, 1#req, r#empty, r#req, BL, and BR.

FIG. 45 shows a example of the BL and BR values computed by such a downsweep, as well as the 1#empty, 1#req, r#empty, and r#req values computed on the prior upsweep. The molten zone extends from the second to the fourteenth L cell of the subtree. Seven cells are requested. Eight cells are empty.

7.6.3 The destination computation in the leaf BN nodes

A leaf BN node, having received its BL and BR values, finds itself in exactly one of the folowing situations:
1. There is no FFP text and no insertion request seen by the BN node. In this case, BL+BR=0 or 1.
2. There is some FFP text, but no insertion request, seen by the BN node. In this case, BL+BR=0.
3. There is some FFP text and one or more insertion requests seen by the BN node, but all the requests were denied by the Denial Algorithm. In this case, BL+BR=0.
4. There is no FFP text seen by the BN node, but there is at least one insertion request (which is necessarily a new user-program insertion request). In this case, BL+BR<=-1.
5. There is some FFP text and one or more insertion requests seen by the BN node, and all the requests were approved. In this case, BL+BR <=0.

We assume that the L cells of the machine are numbered sequentially from the left end of the machine (e.g., from 0 to $2^{**}n - 1$), that each L cell knows its own number, and that each T cell knows the range of numbers of the L cells in each of its two subtrees. We denote the number of an L cell by cell #.

Using its BL and BR values and the cell # of its L cell, the leaf BN node produces a number of travel-packets corresponding to its FFP text and insertion requests. There are two kinds of travel-packets. The simpler, more common, kind has two components: a cell-packet and a destination range. The cell-packet is a collection of text that is to be stored in one L cell. Ordinarily, a cell-packet is simply an FFP atom or a few syntactic brackets surrounding an FFP atom. It is possible, though, for a cell-packet to include insertion requests that have been denied and that therefore need to be kept together with their surrounding text in a single L cell until the next storage management cycle. The destination range is a pair [destlow,desthigh] of cell numbers, with destlow<=desthigh. The destination range specifies the L cells in which the cell-packet should be stored.

The other kind of travel-packet has three components and is always associated with an insertion request for a new user-program. Its first component is a cell-packet that is an atom of the form UPROGi—the name assigned to the user-program by the TQ node when the insertion decision was made. We assume the UPROGi is somehow distinguishable from an ordinary FFP atom. The second component is the destination range, as described above. The third component is the sequence range, a pair [seqlow,seqhigh] of positive integers, with seqlow<=seqhigh. The sequence range is used to associate a different sequence number with each instance of the cell-packet (UPROGi) deposited in an L cell during the text movement phase of storage management. The sequence range for the travel-packet associated with an insertion request for n cells for UPROGi would be [1,n]. Section 7.7 describes how a travel-packet moves through the machine, distributing its cell-packet to the L cells specified by its destination range and, in the case of a travel-packet for a new user-program, setting sequence numbers, too.

Let us consider a particular example of the destination computations that a BN node might be required to perform. Suppose that a BN node, residing by itself in an L cell whose cell# is 100, sees the arrangement of FFP text and (approved) insertion requests shown in FIG. 74.

As we discussed earlier, this cell would have requested 42 L cells. Suppose that BL=-37 and BR=-5. (BR+Br is necessarily -42 for this cell.) This means that the equivalent of 37 cell-packets should move to the left out of the cell, and 5 should move to the right out of the cell, and 1 should remain in the cell. In this example, nine travel-packets are prepared by the BN node:

| | Cell packet | Destination range | |
|---|---|---|---|
| 1. | < < | 63 | 63 |
| 2. | < f | 64 | 64 |
| 3. | f | 65 | 92 |
| 4. | f > | 93 | 93 |
| 5. | < A | 94 | 94 |
| 6. | Q | 95 | 95 |
| 7. | < g | 96 | 96 |
| 8. | g | 97 | 104 |
| 9. | g > | 105 | 105 |

The rules for computing the destination ranges are as follows. For the leftmost travel-packet, destlow=-cell#+ BL. For each travel-packet, desthigh=destlow−1+(number of cells required by the travel-packet). For all except the leftmost travel-packet, destlow=1+(desthigh of previous travel-packet).

7.7 Text movement

As the travel-packets are produced in the leaf BN nodes, they are sent up into the BN network. Recall that each T cell (and hence each non-leaf BN node) knows the range of cell # values for the L cells in each of its two subtrees. Each travel-packet moves through the BN network, splitting as necessary to reach every L cell in its destination range. When a leaf BN node receives a travel-packet from above, it stores the corresponding cell-packet in its L cell. Whenever a travel-packet arrives at a non-leaf BN node, the node compares the destination range of the travel-packet with the range of cell#s seen by each of the BN node'a subtrees and the range of cell#s outside of the BN node'a subtrees, to determine where the travel-packet should be sent. Various rules can be devised for controlling this process. One of the objectives is to have each cell-packet move upward in the BN network just high enough to "see" its destination below it, and then to move downward, splitting as needed to reach each L cell in its destination range. A further objective, in the case of a new user-program travel-packet, is for the cell-packet it distributes to be labelled from 1 to n in its destination range. If, for instance, UPROG1 has a destination range of [14,18] and a sequence range of [1,5], then we want an arrangement to text to appear in L cells 14 through 18 as shown in FIG. 75.

Here, S# is an L cell register capable of holding an integer.

Figure 46:
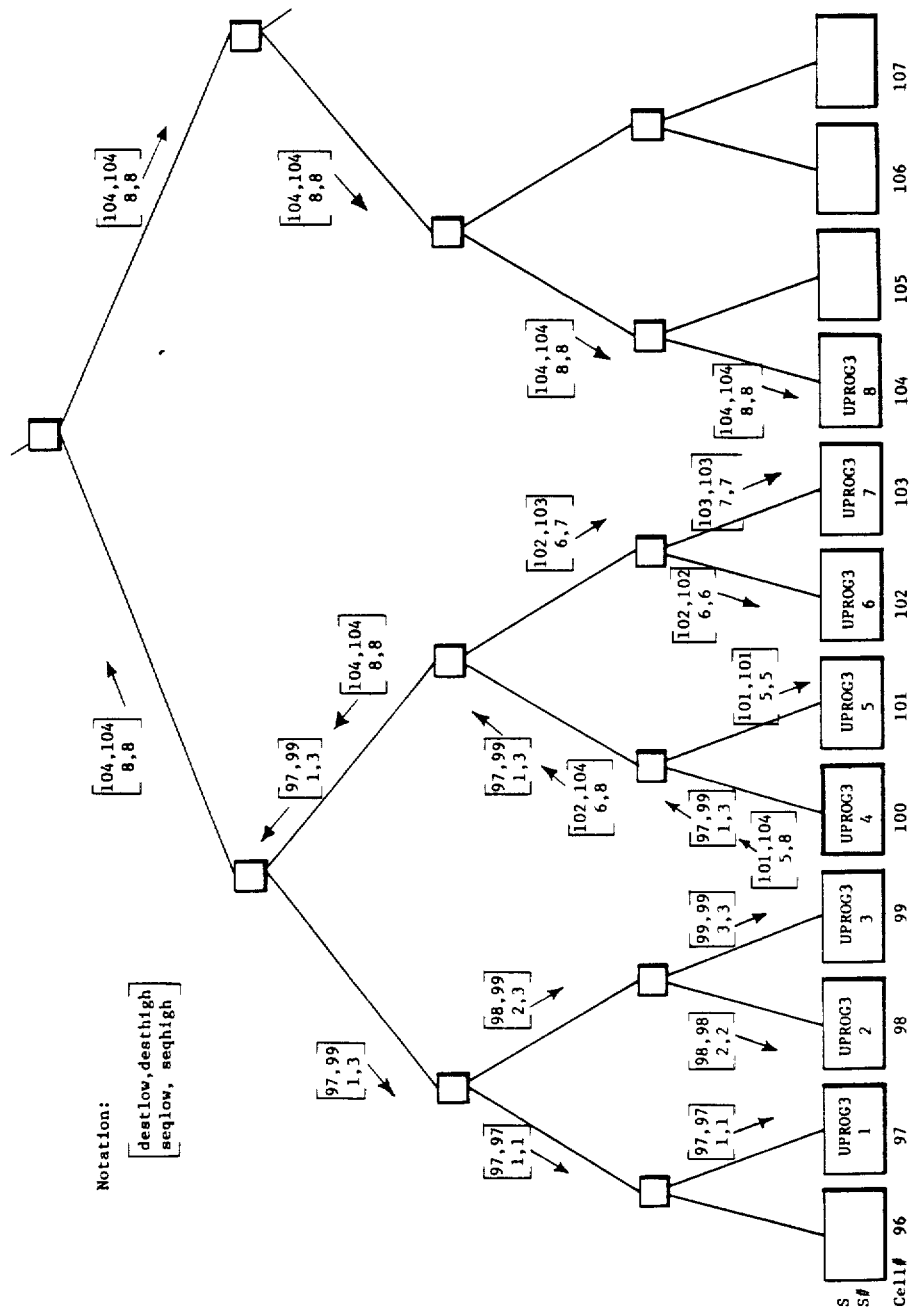
FIG. 46 is a schematic representation of an example of text movement in a molten zone.

Rather than specify the details of an algorithm for the text movement, we illustrate the idea by an example. FIG. 46 shows how the travel-packet [UPROG3,[97,104],[1,8]], originating in cell# 100, could move through the BN network to its destination. The destination range is [97,104] and the sequence range is [1,8]. The travel-packet is split by the BN node in cell# 100 into three travel-packets:

| [UPROG3,[97,99],[1,3]] | [UPROG3,[100,100],[4,4]] |
|---|---|
| [UPROG3,[101,104],[5,8]] | |

The first and third are sent upward. The second stays in cell# 100, which stores the UPROG3 in the S register and the 4 in the S# register. The channels in FIG. 46 are labelled with the destination ranges and sequence ranges of the travel-packets they carry, with an arrow to indicate the direction of movement.

In the storage management process of Machine I, a similar text movement takes place, but it is done entirely within the L array and requires that adjacent L cells be connected directly to each other. Machine II does not need such connections.

Moving the text through the T cells, as Machine II does, has another advantage: if there are enough empty L cells near the requesting places, then the time required to allocate L cells for a large expression is proportional to the height of the machine rather than to the number of L cells allocated. (This is true for a small expression, too, which is a disadvantage but never a very severe one.)

7.8 New user-program insertion

After the text movement, the TQ node can signal that it is ready to insert new user-programs into the molten zone. The outside processor P then makes the chosen user-programs available to the TQ node, which broadcasts them, preceding each by its UPROGi name, to all the L cells in the molten zone. Each L cell with UPROGi in its S register and j in its S# register waits for user-program i and then counts the arriving cell-packets until the j-th, which it then stores as the new contents of the L cell.

7.9 Partitioning and parsing

After the new user-programs (if any) have been inserted, the molten zone goes through the partitioning process described in Chapter 3, building a new TA-Mediator network that merges with the TA-Mediator networks of the two adjoining frozen zones. As each TA is found, it recognizes the status of its RA:

1. New RA.
2. Old RA whose storage requests have been satisfied.
3. Old RA whose storage requests have been denied.

In the first situation, the TA initiates the parsing process as described in Chapter 5 and, when that is completed, executes the RA. In the second situation, the TA initiates the parsing process and, when that is completed, resumes execution of the STL program where it was suspended. In the third situation, the TA simply waits for the next storage management cycle and then again asks for storage.

When all the molten zones have completed their storage management and partitioning, the topmost MED node in the machine initiates the next storage management cycle by sending down a polling signal, as described in Chapter 4.

Although the invention has been described with reference to a preferred embodiment thereof, it will be understood by those skilled in the art that various changes in the mechanism and apparatus may be made without departing from the spirit or the scope of the invention.

What is claimed is:

1. A method for parallel execution of specified operations upon data having a hierarchical syntactic structure, said structure comprising expressions nested within expressions, said specified operations to be executed on specified ones of said expressions, comprising the steps of:
    1. Entering said data into an assemblage of cells, each cell comprising computational resources and communications resources,
    2. Forming a processing network by apportioning said computational resources to form, in said cells, nodes in correspondence with certain expressions of said data, and apportioning said communications resources to form channels connecting said nodes, said processing network comprising said nodes interconnected by said channels, said processing network having a hierarchical structure corresponding essentially to said hierarchical syntactic structure of said data, each said node comprising computational resources entirely within one of said cells and each said channel comprising communications resources within at least one of said cells, and connecting two said nodes, at least one of which comprises computational resources belonging to the same cell as do certain communications resources forming said channel, and
    3. Executing said operations upon said data by using said apportioned computational resources of said nodes to execute said operations on said expressions in respective correspondence with said nodes, and using said channels for communications among nodes coupled by said channels during said execution.

2. A method according to claim 1 wherein said assemblage of cells is a tree network of cells.

3. A method according claim 2 wherein said data comprises expressions in an applicative language, such as a Formal Functional Programming language wherein certain of said expressions comprise reducible applications, each said reducible application comprising an operator expression and an operand expression and wherein said specified operations to be executed are specified by said operator expressions and wherein said specified ones of expressions on which operations are to be executed are the said operand expressions.

4. A method according to claim 1 wherein said step of executing said operations on each said specified expression comprises the steps of:
    1. Executing operations in a node corresponding to a highest level of said syntactic structure of said specified expression, said operations being executed on said specified expression, and said operations causing function calls to be made on nodes in correspondence with said expressions nested within said specified expression at a next lower level of said hierarchy of said processing network,
    2. Executing operations in said nodes at said next lower level of said hierarchy of said processing network, in accordance with information specified in said function calls, said operations being executed on said expressions nested within said specified expression, 3. Recursively executing further operations in nodes at still lower levels of said hierarchy of said processing network, said nodes in correspondence with expressions nested still more deeply within said specified expression, and said operations being executed on said more-deeplynested expressions, and, 4. Recursively returning information from nodes at lower levels to nodes at higher levels of said hierarchy of said processing network in accordance with information specified in said function calls, so as to complete execution of said operations on said specified expression.

5. Apparatus for processing data, said data comprising atomic symbols belonging to a specified set of valid atomic symbols, and instances of syntactic markers belonging to a specified set of valid syntactic markers, said instances of syntactic markers delimiting sequences of said atomic symbols to form disjoint expressions, other instances of said syntactic markers delimiting sequences of said expressions to form further disjoint expressions, said data thereby being stuctured by said syntactic markers into a hierarchy of multiple levels of expressions nested within expressions, each expression at a given level of said hierarchy comprising either one said atomic symbol or a syntactically delimited sequence of disjoint expressions at a next lower level of said hierarchy, said processing to be done in accordance with specified compositions of elementary operations on specified ones of said expressions, said apparatus comprising:

a network of interconnected cells, input means for entering said data into certain of said cells, and output means for removing processed data after said processing, each said cell comprising computational resources adapted to performing said elementary operations, communications resources adapted to sending and receiving data during said processing, and logic means responsive to said syntactically delimited hierarchical structure of said data, said logic means being adapted to communicate with and cooperate with said logic means in other said cells to create a processing network of computational nodes and communications channels in said network of cells by apportioning said computational resources to form said computational nodes and by apportioning said communications resources to form said communications channels interconnecting said nodes, each said node comprising computational resources entirely within one of said cells and each said channel comprising communications resources within at least one of said cells, and connecting two said nodes, at least one of which comprises computational resources belonging to the same cell as do certain communications resources forming said channel, said nodes being of at least two kinds, expression nodes corresponding to individual expressions in said data, and combining nodes corresponding to groups of expressions in said data, said processing network being structured by said interconnecting communications channels into a hierarchy of multiple levels of nodes, each expression node at a given level of said hierarchy being connected by said channels through combining nodes at said given level of said hierarchy to expression nodes at a next lower level of said hierarchy, said hierarchical structure of said processing network corresponding essentially to said hierarchical structure of said data in that each given expression E to be processed in said data corresponds to an expression node N(E) at some level of said hierarchy of said processing network and in that said expressions nested immediately within said given expression E correspond to expression nodes at said next lower level of said hierarchy of said processing network, each said node of said processing network being adapted to cooperate with other said nodes to process said data in accordance with its specified compositions of elementary operations by using said apportioned computational resources to perform said elementary operations on said individual expression or group of expressions corresponding to said node and employing any partially processed data passed to it via communications channels immediately connecting said node to other nodes above and below and by passing resulting partially processed data to other said nodes immediately coupled to said node through said communications channels for further processing in accordance with said specified compositions of elementary operations until said processing is complete.

6. Apparatus according to claim 5 wherein said network of cells is a tree network of cells comprising a root cell, interior cells and leaf cells.

7. Apparatus according to claim 6 wherein said data to be processed is stored in said leaf cells prior to said processing.

8. Apparatus according to claim 7 wherein said data to be processed comprises expressions in an applicative language such as a Formal Functional Programming language, wherein certain of said expressions comprise reducible applications, each said reducible application comprising an operator expression and an operand expression, and wherein said specified compositions of elementary operations are specified by said operator expressions, and wherein said specified ones of said expressions to be processed are said operand expressions.

* * * * *